US00RE40581E

(19) United States
(12) Reissued Patent
Hirano et al.

(10) Patent Number: US RE40,581 E
(45) Date of Reissued Patent: Nov. 25, 2008

(54) PRINTER INCLUDING AN INK CARTRIDGE

(75) Inventors: Seiichi Hirano, Nagano (JP); Susumu Murayama, Nagano (JP); Masanori Yoshida, Torrance, CA (US)

(73) Assignee: Seiko Epson Corporation, Tokyo (JP)

(21) Appl. No.: 11/049,602

(22) Filed: Feb. 2, 2005

Related U.S. Patent Documents

Reissue of:
(64) Patent No.: 6,027,204
Issued: Feb. 22, 2000
Appl. No.: 08/834,151
Filed: Apr. 14, 1997

U.S. Applications:
(60) Continuation of application No. 08/464,036, filed on Jun. 5, 1995, now abandoned, which is a division of application No. 08/119,012, filed on Sep. 9, 1993, now Pat. No. 5,648,807.

(30) Foreign Application Priority Data

| | | |
|---|---|---|
| Sep. 10, 1992 | (JP) | 4-242228 |
| Sep. 10, 1992 | (JP) | 4-242229 |
| Sep. 10, 1992 | (JP) | 4-242230 |
| Oct. 6, 1992 | (JP) | 4-267621 |
| Oct. 8, 1992 | (JP) | 4-270561 |
| Oct. 8, 1992 | (JP) | 4-270562 |
| Oct. 8, 1992 | (JP) | 4-270563 |
| Oct. 8, 1992 | (JP) | 4-270567 |

(51) Int. Cl.
*B41J 2/14* (2006.01)
*B41J 2/16* (2006.01)

(52) U.S. Cl. ..... 347/49; 347/37
(58) Field of Classification Search ..... 347/37, 347/49–50, 84–87
See application file for complete search history.

(56) References Cited

U.S. PATENT DOCUMENTS

| | | | | |
|---|---|---|---|---|
| 1,773,993 A | * | 8/1930 | Barr | |
| 3,934,872 A | * | 1/1976 | Honkawa | |
| 4,345,754 A | * | 8/1982 | Willenbring | |
| 4,708,504 A | * | 11/1987 | Asakura | 400/637 |
| 4,709,247 A | * | 11/1987 | Piatt et al. | 347/87 |
| 4,736,213 A | * | 4/1988 | Piatt et al. | |
| 4,772,007 A | * | 9/1988 | Kashimura | 271/22 |
| 4,844,633 A | * | 7/1989 | Greenberg | |
| 4,849,772 A | * | 7/1989 | Broeck et al. | 346/139 |

(Continued)

FOREIGN PATENT DOCUMENTS

| | | | |
|---|---|---|---|
| DE | 1 88 160 | * | 5/1906 |
| DE | 28 04 116 | * | 8/1978 |
| DE | 27 38 080 | * | 1/1979 |
| DE | 28 54 695 | * | 7/1979 |
| DE | 29 09 458 | * | 10/1980 |
| DE | 32 38 061 | * | 4/1984 |
| DE | 36 12 299 | * | 10/1986 |
| DE | 37 08 601 | * | 10/1987 |
| DE | 3806976 | * | 9/1988 |

(Continued)

OTHER PUBLICATIONS

Xerox Disclosure Journal, vol. 18, No. 4, Jul./Aug. 1993, p. 437.*

*Primary Examiner*—Juanita D Stephens
(74) *Attorney, Agent, or Firm*—Stroock & Stroock & Lavan LLP

(57) ABSTRACT

An ink jet printer including a carriage which moves along a print area, a head mounted on the carriage, an ink cartridge mounted on the carriage for supplying ink to the head, a lever on the carriage for mounting or demounting the ink cartridge with respect to the carriage and a stopper for stopping the movement of the carriage by coming into contact with the lever when an operation of mounting the ink cartridge by the lever has not been completely effected. The ink jet printer may also include a resilient member for supporting the ink cartridge on the carriage.

16 Claims, 54 Drawing Sheets

U.S. PATENT DOCUMENTS

| | | | | | |
|---|---|---|---|---|---|
| 4,990,938 | A | * | 2/1991 | Brandon et al. | 347/87 |
| 5,016,867 | A | * | 5/1991 | Kamath | |
| 5,026,185 | A | * | 6/1991 | Kusabuka | |
| 5,034,756 | A | * | 7/1991 | Taira | 347/232 |
| 5,096,182 | A | * | 3/1992 | Kashimura | |
| 5,136,308 | A | * | 8/1992 | Saito et al. | 346/139 R |
| 5,391,151 | A | | 2/1995 | Wilmot | 604/139 |
| 5,515,094 | A | | 5/1996 | Tanaka et al. | 347/104 |
| 5,534,899 | A | * | 7/1996 | Uchikata et al. | 347/49 |
| 5,579,039 | A | * | 11/1996 | Kurata et al. | 347/49 |

FOREIGN PATENT DOCUMENTS

| | | | | | |
|---|---|---|---|---|---|
| DE | 39 25 162 | | * | 2/1990 | |
| DE | 40 23 402 | | * | 1/1991 | |
| DE | 38 25 752 | | * | 2/1991 | |
| DE | 41 35 308 | | * | 4/1992 | |
| DE | 33 39 138 | | * | 5/1995 | |
| DE | 43 30 798 | | * | 11/1995 | |
| EP | 0 339 977 | | * | 11/1989 | |
| EP | 0 379 151 | | * | 7/1990 | |
| EP | 0 386 737 | | * | 9/1990 | |
| EP | 0 395 003 | | * | 10/1990 | |
| EP | 0 397 090 | | * | 11/1990 | |
| EP | 0 407 610 | | * | 1/1991 | |
| EP | 469536 | | * | 2/1991 | 347/87 |
| EP | 0 420 400 | | * | 4/1991 | |
| EP | 0 422 794 | | * | 4/1991 | |
| EP | 0 423 475 | | * | 4/1991 | |
| EP | 0 424 968 | | * | 5/1991 | |
| EP | 0 436 919 | | * | 7/1991 | |
| EP | 0 464 785 | | * | 1/1992 | |
| EP | 0 472 218 | | * | 2/1992 | |
| EP | 0 478 300 | | * | 4/1992 | |
| EP | 0 496 642 | | * | 7/1992 | |
| EP | 0521658 | | * | 1/1993 | 347/104 |
| EP | 0 530 777 | | * | 3/1993 | |
| EP | 0 546 832 | | * | 6/1993 | |
| EP | 0 580 399 | | * | 1/1994 | |
| EP | 0 622 219 | | * | 11/1994 | |
| GB | 1 206 965 | | * | 9/1970 | |
| GB | 2 061 882 | | * | 5/1980 | |
| GB | 2 046 671 | | * | 11/1980 | |
| GB | 2 247 647 | | * | 3/1992 | |
| JP | 57-166263 | | * | 10/1982 | |
| JP | 58-109357 | | * | 6/1983 | |
| JP | 59-188467 | | * | 10/1984 | |
| JP | 59-230941 | | * | 12/1984 | |
| JP | 60-212369 | | * | 10/1985 | |
| JP | 61-25867 | | * | 2/1986 | |
| JP | 61-177265 | | * | 8/1986 | |
| JP | 61-220874 | | * | 10/1986 | |
| JP | 63-74825 | | * | 4/1988 | |
| JP | 64-43446 | | * | 2/1989 | |
| JP | 1-053936 | | * | 3/1989 | |
| JP | 1-184174 | | * | 7/1989 | |
| JP | 1-222982 | | * | 9/1989 | |
| JP | 1-267252 | | * | 10/1989 | |
| JP | 1-301350 | | * | 12/1989 | |
| JP | 401301350 | A | * | 12/1989 | 347/87 |
| JP | 2-41277 | | * | 2/1990 | |
| JP | 2039945 | | * | 2/1990 | |
| JP | 3-200648 | | * | 2/1991 | |
| JP | 3-101949 | | * | 4/1991 | |
| JP | 3-101980 | | * | 4/1991 | |
| JP | 3-143865 | | * | 5/1991 | |
| JP | 3-272952 | | * | 12/1991 | |
| JP | 04-007185 | | | 1/1992 | |
| JP | 404007185 | | * | 1/1992 | 347/8 |
| JP | 4-134865 | | * | 5/1992 | |
| JP | 4-148741 | | * | 5/1992 | |
| JP | 5-31912 | | * | 2/1993 | 347/104 |
| JP | 5-177830 | | * | 7/1993 | 347/37 |
| WO | 88/06527 | | * | 9/1988 | |
| WO | WO 91/10570 | | * | 7/1991 | |

* cited by examiner

PRINTER INCLUDING AN INK CARTRIDGE

Matter enclosed in heavy brackets [ ] appears in the original patent but forms no part of this reissue specification; matter printed in italics indicates the additions made by reissue.

This *application is a continuation of application Ser. No. 09/976,668 now RE38,926 E, which is a reissue of U.S. Pat. No. 6,027,204, which* is a continuation of application Ser. No. 08/464,036, now abandoned, filed on Jun. 5, 1995 for PRINTER INCLUDING AN INK CARTRIDGE, which was a divisional application of application Ser. No. 08/119,012, now U.S. Pat. No. 5,648,807, filed on Sep. 9, 1993.

*More than one reissue application has been filed for the reissue of U.S. Pat. No. 6,027,204. The reissue applications are application Ser. No. 11/049,602 (the present application) and application Ser. No. 09/976,668, now RE38,926 E all of which are continuing reissues of U.S. Pat. No. 6,027,204.*

BACKGROUND OF THE INVENTION

The present invention relates generally to printers, and, in particular, to improvements in an automatic-paper-feeder portion of a printer having an automatic paper feeder incorporated therein.

Further, the present invention relates to improvements in a driving mechanism for individually feeding sheets of paper.

Still further, the present invention relates to improvements in ink jet printers, and specifically to improvements in the construction and arrangement of the print area thereof, to improvements in the construction of the mounting the ink cartridge on the carriage thereof, and to improvements for reducing the width of ink jet printers in the direction of a row.

Further, the present invention relates generally to a method of discharging paper in an ink jet printer, and, in particular, to an improved technique of the discharging paper in which the discharged paper is neither damaged nor smeared.

FIG. 56 depicts a conventional printer described in Japanese Utility Model Unexamined Publication No. 272952/1991. An automatic paper feeder is constructed and arranged having a paper feed cassette 2002, which is a paper stacker, detachably mounted in a printer body 2001 so a dead space DS is formed between the bottom of paper feed cassette 2002 and the bottom of body 2001.

FIGS. 57–59 depict a second conventional printer described in Japanese Patent Utility Model Publication No. 74825/1988 having a stacker section 2004 on which paper P is stacked, incorporated in a printer case 2003 constructed and arranged so a dead space DS is formed between the bottom of printer case 2003 and stacker section 2004.

As illustrated above, it is difficult to make the printers compact because of the dead space within the printer casings.

In the conventional printer construction of FIGS. 57–59, the stacker section is arranged as follows. If a paper discharge support 2101 rotates in a counterclockwise direction as viewed in FIGS. 58 and 59, an operating arm 2102 rotates therewith causing an intermediate lever 2103 to rotate in the clockwise direction as viewed in FIGS. 58 and 59. An engaging lever 2104 is rotated in said counterclockwise direction by the rotation of intermediate lever 2103, and a pressure-plate operating lever 2106 rotates in the same direction as engaging lever 2104 since they are both mounted for rotation with lever shaft 2105. A pressure plate member 2107 moves downward as viewed in FIG. 57 by the rotation of pressure-plate operating lever 2106 to allow paper P to be inserted between pressure plate member 2107 and a separation pawl 2108, thereby making it possible to accommodate paper P in a feeding holder 2109.

However, in such a conventional printer, if paper discharge support 2101 rotates in the counterclockwise direction, pressure plate member 2107 moves downward, but separation pawl 2108 does not move. Therefore, if a plurality of sheets of paper are inserted, the edges of the top sheets may enter above separation pawl 2108. Hence, this printer construction has a problem with the feeding-in operation.

In the above construction, intermediate lever 2103 and engaging lever 2104 are necessary, resulting in a complicated printer construction.

FIG. 60 depicts a mechanism for driving a paper feed-in roller in a conventional printer described in Japanese Utility Model Unexamined Publication No. 184174/1989. In FIG. 60, a transmission arm 2502 is supported on an apparatus body and can rotate about a fulcrum 2501. A drive gear 2503 is axially supported on fulcrum 2501. Further, a transmission gear 2505 for transmitting rotation from drive gear 2503 to a roller gear 2504 is axially supported at one side of transmission arm 2502. As a left end 2502' of transmission arm 2502 is pressed down by the movement of a carriage (not shown) against a return spring 2506, transmission gear 2505 engages roller gear 2504, and drives a paper feed-in roller (not shown) fixed on shaft 2507, which also rotatably supports roller gear 2504.

The conventional mechanism employing the structures described above has the following problem.

Since transmission arm 2502 is not resilient, if left end 2502' of transmission arm 2502 is pressed too hard by the carriage, the force of transmission gear 2505 against roller gear 2504 is too much, and gears 2504 and 2505 will not rotate smoothly.

FIGS. 61–63 depict a conventional ink jet printer described in Japanese Utility Model Unexamined Publication No. 1101980/1991. Described is an ink jet head 2201 and a paper feed roller 2202 for feeding paper P to a print area 2201a where printing is performed. A transport roller 2203, roller 2202 which is disposed downstream of paper feed roller 2202 relative to print area 2201a, rotates at a higher peripheral speed than paper feed roller 2202 and pulls paper P past paper feed roller 2202. A paper holding plate 2204 holds paper P against paper feed roller 2202. In a printer having the above construction, paper P is printed in print area 2201a while paper P floats.

However, with this type of printer, "blind striking" may occur in which ink is ejected from ink jet head 2201 despite the fact there is no paper P in print area 2201a.

Blind striking occurs after the paper is detected by a paper detecting sensor disposed upstream of the print area but the paper fails to reach the print area due to a failure in paper feed, or the like. If the paper is detected by the paper detecting sensor, ink jet head 2201 operates on the assumption that the paper is present in the print area.

As shown in FIGS. 61–63, because there is nothing interposed between ink jet head 2201 and paper feed roller 2202, when "blind striking" occurs, the ink ejected from ink jet head 2201 adheres to paper feed roller 2202, thereby staining later sheets of paper P. This has been a serious problem with conventional printers having this construction.

Furthermore, a distal end of paper holding plate 2204 in the conventional printer shown in FIGS. 61–63 functions to restrict the printing surface of the paper P. As noted above, in this conventional printer paper holding plate 2204 presses paper P paper feed roller 2202. However, with inherent surface irregularities in paper feed roller 2202, paper holding plate 2204 is pivotably displaced due to the effect of these irregularities and the pressure exerted on paper P by paper holding plate 2204 varies. This results in the gap between the printing surface and ink jet head 2201 varying, which adversely affects the print quality. In addition, since a plurality of paper holding plates 2204 are provided in the axial direction of paper feed roller 2202, as shown in FIG. 61, paper holding plates 2204 are affected by the surface irregularities of paper feed roller 2202 at different locations in the axial direction thereof, and will pivot at different angles and at different instances, which will also adversely affect the print quality.

Further, ink jet printers print by discharging ink onto paper. If the printed paper is discharged by means of, for instance, a pair of rubber rollers, the ink that is not dry will adhere to the rubber rollers on the printed surface side, thereby smearing the ink on the printed surface of the paper.

Accordingly, FIG. 64 illustrates an ink jet printer described in Japanese Utility Model Unexamined Publication No. 41277/1990 that has been proposed to overcome this problem. Paper P1, printed on by an ink jet head H, is discharged using a paper discharge roller 2401 made of a resilient material, such as rubber, and a plurality of star wheels 2402 which rotate with the paper nipped between star wheels 2402 and paper discharge roller 2401. Star wheels 2402 are urged toward paper discharge roller 2401 by means of respective shafts 2403 each having a resiliency or spring characteristic.

However, the conventional printer employing the structure described above has the following problem.

Star wheels 2402 are urged toward paper discharge roller 2401 by shafts 2403 each having a spring characteristic. If there are variations in the spring characteristic (i.e., on the urging force) of shafts 2403, the variations appear directly as variations in the pressing force of star wheels 2402 upon paper discharge roller 2401.

If the pressing force of star wheel 2402 upon paper discharge roller 2401 is small, it becomes impossible to obtain a transporting force for the paper. Conversely, if the pressing force is too large, perforations can form in the paper, and the printed surface, therefore, is liable to be damaged.

Since the ink jet printer prints onto paper by the ejection of ink, when printing is performed continuously on a plurality of sheets of paper, a subsequent sheet of paper may be discharged before the ink on the printed paper dries. If the subsequent sheet of paper contacts the preceding sheet of paper, the ink on the printed surface will smear.

Japanese Utility Model Unexamined Publication No. 134865/1992 describes a discharged paper stacker that overcomes this problem. The construction thereof is described with reference to FIGS. 65–68. FIG. 65 illustrates a discharged-paper tray 2306 having a V-shape or concave shape. FIG. 66 shows how printed sheets of paper P1 are stacked in the concave shape thereby delaying the time until subsequently discharged paper P2 contacts printer paper P1. In addition, FIG. 67 illustrates a technique in which paper P2 is discharged and is set in a convex shape to delay the time until paper P2 slidably contacts printed paper P1. In this arrangement, central interior roller 2304' is of a larger diameter than outer interior rollers 2304 while central exterior roller 2305' is of smaller diameter than outer exterior rollers 2305. Furthermore, FIG. 68 describes a technique in which paper P2 is discharged and is set in a corrugated shape to further delay the time until paper P2 contacts printed paper P1. In this construction, interior rollers 2304" have projecting peripheral hubs while exterior rollers 2305" are thin and aligned with the central region of interior rollers 2304" between the hubs.

However, these conventional techniques employing the structures described above have the following problems.

First, even if discharged-paper tray 2306 is formed in a concave shape, if paper P1 is very stiff, paper P1 will not conform and stack in the desired concave shape. As a result, the time until subsequently discharged paper P2 slidably contacts printed paper P1 is not delayed, and the printed surface of printed paper P1 will smear. Also, because the shape of discharged-paper tray 2306 is concave, the space occupied by discharged-paper tray is larger than desired.

Furthermore, the print quality utilizing the techniques shown in FIGS. 67 and 68 is poor. Paper discharge rollers 2304 and 2305 cause paper P2 to be set directly in the convex shape or in the corrugated shape. This results in paper P2 retaining the aforesaid shapes while in the printing section, thereby adversely affecting the print quality.

Ink jet printers having an ink cartridge mounted on a carriage have heretofore been proposed. These printers are more compact than a printer not having the ink cartridge mounted on the carriage and where ink is supplied to the ink jet head located above the carriage through a pipe from an ink tank.

Japanese Utility Model Unexamined Publication No. 101949/1991 describes a printer in which the operation of mounting or demounting of the ink cartridge with respect to the carriage can be performed simply by the operation of a lever.

However, this type of conventional printer is constructed and arranged so that the carriage can reciprocate even in a case where the operation of mounting the ink cartridge has not been performed completely.

For this reason, in the event that the carriage reciprocates in the state in which the mounting of the ink cartridge has been performed incompletely, there is the possibility of the ink cartridge coming off the carriage, thereby possibly staining paper or the path of the paper in the printer.

In addition, since no shock-absorbing member is interposed between the carriage and the ink cartridge, when the carriage suddenly reverses direction, any inertial force of the ink cartridge is directly transmitted to the carriage, causing vibrations to the carriage and excess noise.

Ink jet printers generally have a print area where printing is performed on recording paper by the head mounted on the carriage which reciprocates in the direction of a row, and a nonprint area located outside the print area where printing is not performed. In such ink jet printers, if printing is not performed for a predetermined time, the ink at the tip of the nozzle of the head becomes dry, and causes the nozzle to clog. To prevent this, it is necessary to perform a so-called "capping" operation and cover the ink jet head with a cap. However, if clogging has occurred, it is necessary to clear the ink path by forcibly sucking the ink from the nozzle using a sucking mechanism. The capping and sucking operations are performed when the carriage is in the nonprint area. Further, when the printing operation is continuously performed, the paper is fed for the portion of the interlinear space when the carriage is in the print area.

The driving for paper feed and the driving of the suction mechanism are conventionally performed by separate drive motors although printers in which the driving of the respective mechanisms is performed by one drive motor have become popular in recent years.

FIGS. 69–71 are schematic diagrams respectively illustrating the print area and the nonprint area in different types of conventional ink jet printers with the frame of the printer indicated as F.

FIG. 69 describes an ink jet printer having nonprint areas a1 and a2 on both sides of a print area P. When the carriage is in nonprint area a1, the paper feeding-in operation and the paper feeding operation are performed. When the carriage is in nonprint area a2, the capping operation is performed. Also, when the carriage is in nonprint area a2, the paper feeding operation and the suction operation are performed simultaneously.

FIG. 70 describes an ink jet printer having three nonprint areas a1, a2, and a3 on one side of print area P. When the carriage is in print area P and a first nonprint area a1, the paper feeding operation is performed. When the carriage is in nonprint area a2, the paper feeding-in operation is performed. When the carriage is in nonprint area a3, the suction operation is performed. In addition, the capping operation is performed when the carriage is in any one of the nonprint areas a1, a2, and a3.

Similarly, the ink jet printer shown in FIG. 71 has three nonprint areas a1, a2, and a3 on one side of the print area P. When the carriage is in the first nonprint area a1, the paper feeding-in operation is performed. When the carriage is in nonprint area a2, the paper discharging operation is performed. When the carriage is in nonprint area a3, the suction operation is performed. In addition, the paper feeding operation is performed when the carriage is in any one of the nonprint areas a1, a2, and a3.

The conventional ink jet printers employing the structures described above have the following problems.

As illustrated in FIG. 69, only two nonprint areas are provided for the ink jet printer so the width of the printer in the direction of the row can be made small. Nevertheless, since both the paper feeding operation and the suction operation are performed simultaneously in nonprint area a2, a problem arises when the recording paper is continuously fed during the suction operation. Particularly, in a case where the recording paper is continuous-form paper, the recording paper is fed by the portion in which the suction operation was performed, which is very inconvenient. In addition, if the paper feeding operation is performed in a state in which capping is provided, the suction operation is performed even if the head is not clogged, resulting in wasted ink.

The ink jet printer shown in FIG. 70 does not have the above-mentioned problems, but, since there are as many as three nonprint areas, the width of the printer in the direction of the row becomes large.

The ink jet printer shown in FIG. 71 is also provided with three nonprint areas, so the width of the printer in the direction of the row is large. Moreover, since both the paper feeding operation and the suction operation are performed simultaneously in nonprint area a3, a problem similar to that of the printer shown in FIG. 69 will result.

By the arrangement in accordance with the invention, the foregoing deficiencies in the prior art are overcome. Specifically, a compact printer is provided. The printer paper feed mechanism permits an accurate feed-in operation with a simple mechanism which prevents the paper's insertion above the separation pawl. Further, the smooth operation of the mechanism for driving the feed-in roller is assured. The ink jet printer in accordance with the invention is designed so that the paper is not stained even if blind striking occurs and to keep constant the gap between the printing surface of the paper and the head. Further, the ink jet printer transports paper reliably without staining the printed surface by, at least in part, delaying the time until paper which is discharged next is brought into sliding contact with the printed paper, while preventing the configuration of the paper from affecting the printing section. Still further, means is provided to prevent the ink cartridge from coming off the carriage. The cartridge mounting mechanism is adapted to reduce vibration and noise. Still further, the width in the direction of the row for ink jet printer is reduced while the paper feeding and suction operations are selectively effected.

SUMMARY OF THE INVENTION

Generally speaking, in accordance with the invention, a printer in accordance with one aspect of the present invention includes an automatic paper feeder having a stacker section capable of setting a plurality of sheets of paper therein, wherein a bottom of said stacker section is formed by a bottom itself of a printer case.

The printer in accordance with another aspect of the present invention includes a stacker section capable of setting a plurality of sheets of paper therein; a hopper disposed in said stacker section to urge the paper upwardly; a pair of swinging members each having a separation pawl-located above a corner of a leading end of the paper and a pressing-down portion for pressing down said hopper, each of said swinging members being supported swingably about a shaft located between said separation pawl and said pressing-down portion; and an operation lever having a pair of actuating portions capable of pressing downward said swinging members, said operation lever being supported rotatably above said stacker section.

The printer in accordance with still another aspect of the present invention includes a feed-in roller for feeding sheets of paper one by one; a carriage for printing the sheet fed by said feed-in roller; a feed-in gear for rotating said feed-in roller; and a movable gear supported rotatably by a rotatable lever and capable of assuming a first position in which said movable gear meshes with said feed-in gear to rotate said feed-in gear and a second position in which said movable gear does not mesh with said feed-in gear, wherein a spring member having one end supported by said lever and another end supported by a frame of said printer, and an actuating portion is provided on said carriage to rotate said lever toward the first position in which said movable gear meshes with said feed-in gear by pressing and displacing an intermediate portion of said spring member.

The ink jet printer in accordance with a further aspect of the present invention includes a feed roller for feeding paper to a print area where printing is effected by an ink jet head; a transport roller disposed downstream of said feed roller relative to the print area to transport the paper in such a manner as to stretch the paper between the transport roller and said feed roller by rotating the transport roller at a peripheral speed faster than that of said feed roller; and an ink shielding portion disposed so as to form a passage of the paper between the same and said ink jet head over the entire print area.

The ink jet printer in accordance with a still further aspect of the present invention includes a feed roller for feeding paper to a print area where printing is effected by an ink jet head; a transport roller disposed downstream of said feed roller relative to the print area to transport the paper in such a manner as to stretch the paper between the transport roller and said feed roller by rotating the transport roller at a peripheral speed faster than that of said feed roller; and a pressing member for pressing the paper over an entire widthwise length thereof, a pressing portion of said pressing member being disposed at a position between said feed roller and said transport roller and where said pressing portion is in contact with neither of said two rollers.

In accordance with a further aspect of the present invention, there is provided an ink jet printer for discharging paper printed by a printing section having an ink jet head, by means of a plurality of paper discharge rollers and a plurality of star wheels each of which rotates while nipping the paper between the same and said paper discharge roller, said ink jet printer including a shaft for supporting two star wheels as a unit at opposite ends of said shaft; and an urging member for urging a central portion of said shaft toward said paper discharge rollers.

In accordance with a further aspect of the present invention, there is provided a method of discharging paper characterized in that the paper printed by a printing section having an ink jet head is discharged while forcibly urging the paper in a concave shape in which a printed surface is rendered concave as viewed in a discharging direction.

In accordance with a further aspect of the present invention, the method of discharging paper includes the steps of transporting the paper printed by a printing section having an ink jet head in a flat state as viewed in a discharging direction; and discharging the paper while forcibly urging the paper into a concave shape in which a printed surface is rendered concave as viewed in the discharging direction.

The ink jet printer in accordance with a further aspect of the present invention includes a pair of both-side supporting portions for supporting from below both side portions of the paper which has been discharged after being printed on an upper surface thereof by a printing section having an ink jet head, and a pushing-down portion for pushing down a central portion of the paper.

In accordance with a further aspect of the present invention, there is provided an ink jet printer including a carriage which moves along a print area; a head mounted on said carriage; an ink cartridge mounted on said carriage for supplying ink to said head; and a lever provided on said carriage for mounting or demounting said ink cartridge with respect to said carriage, wherein a stopper is provided for stopping the movement of said carriage by coming into contact with said lever when an operation of mounting said ink cartridge by means of said lever has not been effected completely.

In accordance with a further aspect of the present invention, there is provided an ink jet printer including a carriage which moves along a print area; a head mounted on said carriage; and an ink cartridge mounted on said carriage for supplying ink to said head; wherein said ink cartridge is supported on said carriage through a resilient member in a direction of movement of said carriage.

In accordance with a further aspect of the present invention, there is provided an ink jet printer having a print area where the printing of recording paper is effected by a head mounted on a carriage reciprocating in a direction of a row and a nonprint area which is located on both sides of the print area and where the printing by the head is not effected, said ink jet printer including a drive gear capable of assuming a paper-feed driving position which is located in one of the nonprint areas for driving a paper feeding mechanism for feeding the recording paper in a direction essentially perpendicular to the direction of the row and a suction driving position for driving a suction mechanism for sucking ink from said head; changeover means disposed on said carriage for changing over a position of said drive gear; and selecting means located in another one of said nonprint areas for selecting a state of said changeover means when said carriage enters said area.

Accordingly, an object of the present invention is to provide a printer which can be made compact.

Another object of the present invention is to provide a printer which permits an accurate feeding-in operation with a simple mechanism by preventing the paper, which is inserted and set in an automatic paper feeder, from entering above the separation pawl.

Still another object of the present invention is to facilitate the setting of the paper.

A further object of the present invention is to provide a printer which makes it possible to positively ensure the smooth operation of the mechanism for driving the feed-in roller.

A still further object of the present invention is to provide an ink jet printer which will not stain the paper even if blind striking occurs.

An additional object of the present invention is to provide an ink jet printer which is capable of keeping constant the gap between the printing surface of the paper and the head.

Still another object of the present invention is to provide an ink jet printer which is capable of transporting the paper reliably without staining the printed surface.

A further object of the present invention is to prevent the printed surface of the printed paper from becoming stained by reliably delaying the time until paper which is discharged next is brought into sliding contact with the printed paper.

A still further object of the present invention is to prevent the configuration of the paper from affecting the printing section.

Still another object of the present invention is to prevent the ink cartridge from coming off in an ink jet printer of the type in which the operation of mounting or demounting of the ink cartridge is effected by the operation of a lever.

A still further object of the present invention is to reduce the vibrations and the reversing noise caused by the cartridge in the carriage.

A further object of the present invention is to provide a printer which is of reduced width in the direction of the row and to selectively effect the paper feeding operation and the suction operation.

Still a further object of the present invention is to provide an improved method of discharging paper in an ink jet printer.

Another object of the present invention is to provide an improved method of discharging paper that delays the contact of the discharged paper with the paper previously discharged.

Yet a further object of the present invention is to provide an improved method of discharging paper so the discharged paper does not become damaged during the printing and discharging operations.

Still other objects and advantages of the invention will in part be obvious and will in part be apparent from the specification.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 21(b) being a right-hand side elevational view; FIG. 21(c) being a plan view; FIG. 21(d) being a cross-sectional view taken along lines 21d—21d in FIG. 21(a); FIG. 21(e)-being a cross-sectional view taken along lines 21e—21e in FIG. 21(a); FIG. 21(f) being a cross-sectional view taken along lines 21f—21f in FIG. 21(b); and FIG. 21(g) being a cross-sectional view taken along lines 21g—21g in FIG. 21(b);

DESCRIPTION OF THE PREFERRED EMBODIMENTS

A brief overview of the printer in accordance with the invention will first be given with reference to FIGS. 3A and 3B.

Figure 3A:
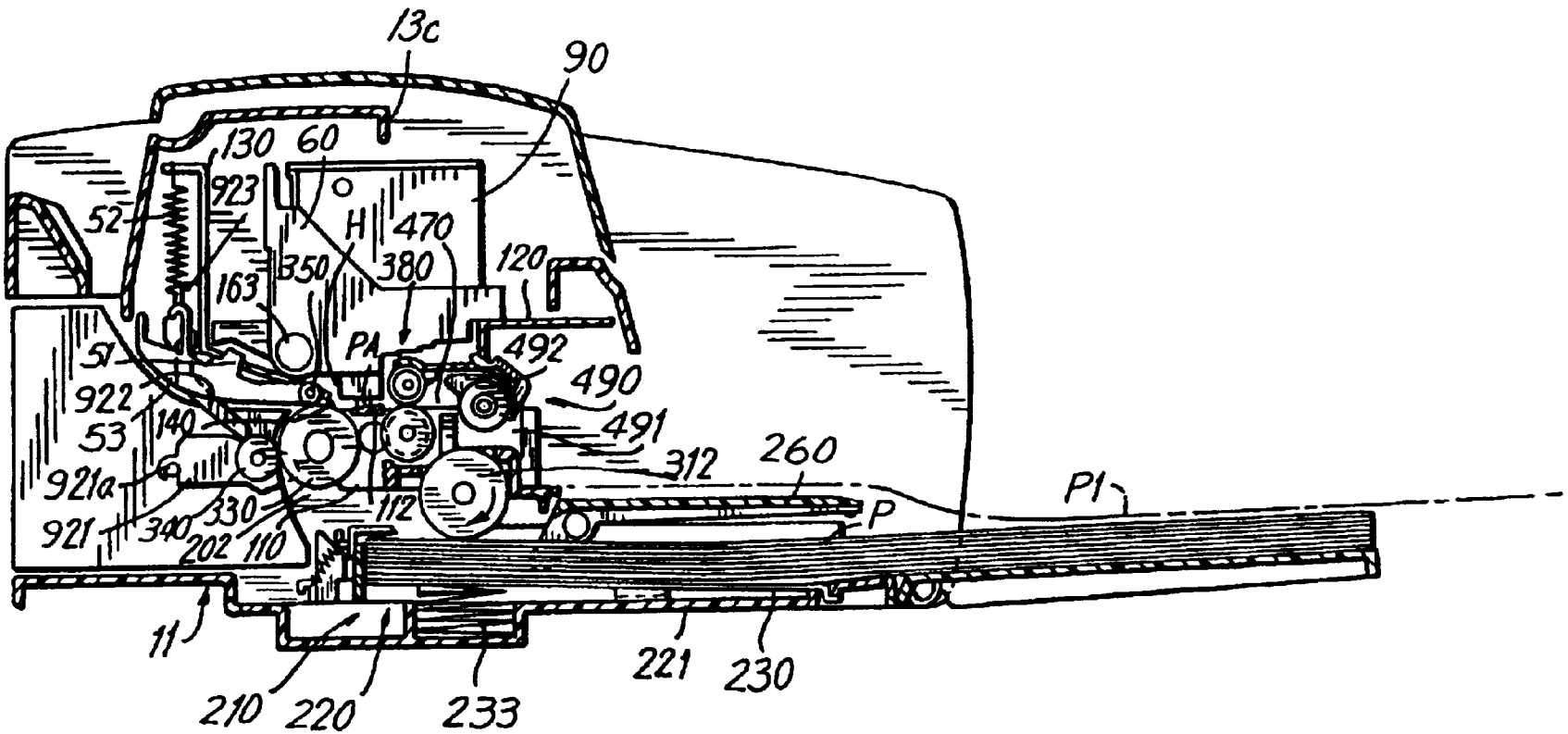
FIG. 3A is a cross-sectional view of the left-hand side of a printer in accordance with a first embodiment of the invention.

FIG. 3A of the drawings illustrates an automatic paper feeder, generally indicated at 210, which includes an automatic feeding path 202 and a first lever 921 for detecting the paper fed to automatic feeding path 202. FIG. 3B is a rear view of FIG. 3A. A gate roller 340 is driven in pressure contact with a paper feed roller 330. Also, a pinch roller 350 is driven in pressure contact with paper feed roller 330. A carriage 60 has an ink cartridge 90 mounted thereon. A transport section, generally indicated at 380, is disposed in a paper discharging path 470. Discharge section 490 discharges the paper while holding the paper in a concave shape when seen in a transporting direction. An operation lever 260 also serves as a discharged-paper tray. An intermediate frame 110 has an ink shielding portion 112 and a pressing member 140.

The sheets of paper P are fed one by one to automatic feeding path 202 by the operation of a paper feed-in roller 312 which will be described later in detail.

Figure 3B:
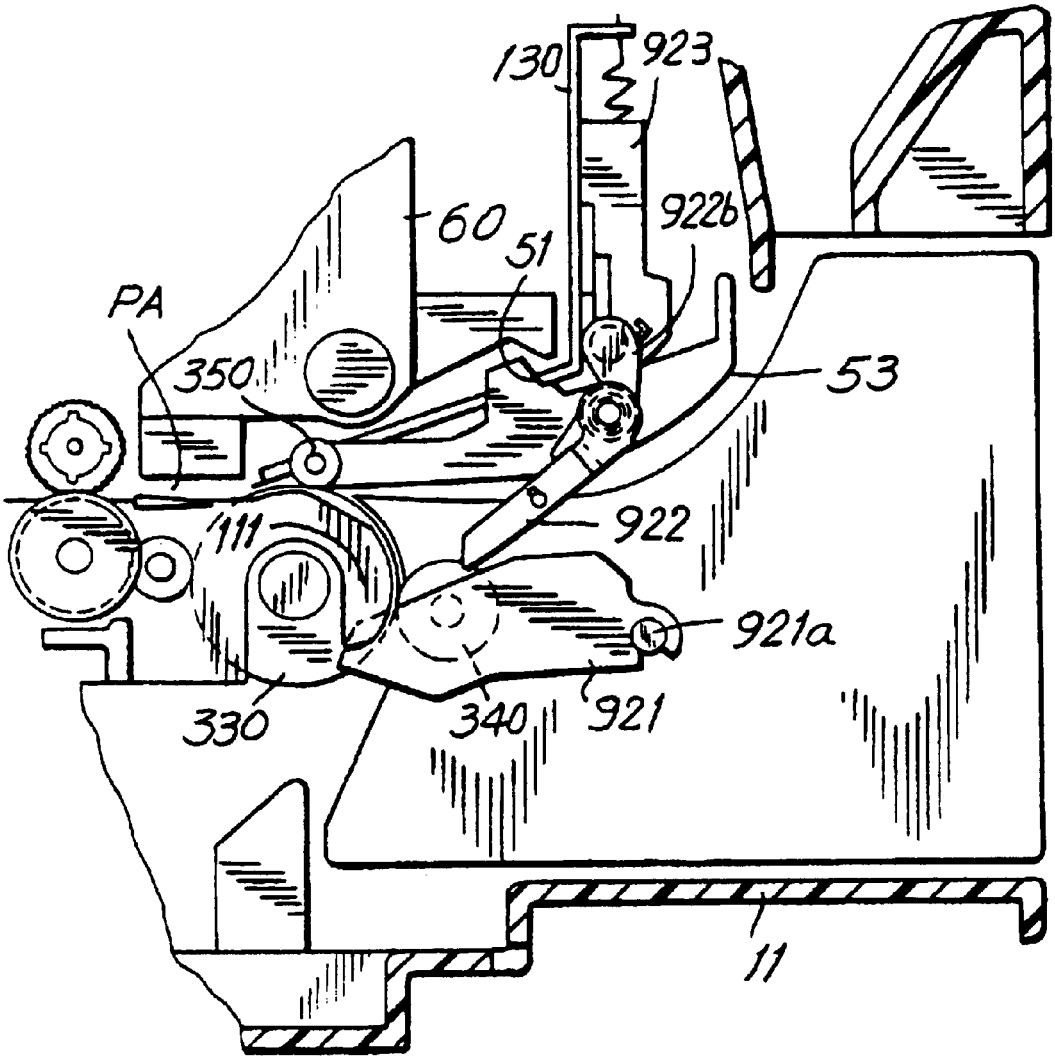
FIG. 3B is a rear view of FIG. 3A.

The paper which has been fed in causes first lever 921 to rotate counterclockwise as viewed in FIGS. 3A, 3B about a shaft 921a. The rotation of first lever 921 causes a second lever 922, also for paper detection, to rotate counterclockwise as viewed in FIG. 3. Furthermore, as a third lever 922b is similarly rotated counterclockwise, a paper detection switch 923 detects the feeding of the paper.

The detected paper, after being subjected to deskewing as will be described later, is wound around paper feed rollers 330, and reaches print area PA via pinch roller 350.

Pinch roller 350 is rotatably attached to a distal end of a paper guide 53 suspended from a rear frame 130 by means of a spring 52 so that paper guide 53 rotates about a fulcrum 51.

Print area PA is formed between an upper surface of intermediate frame 110 and an ink jet head H attached to carriage 60. Carriage 60 reciprocates in a direction perpendicular to the plane of the drawing of FIG. 3A. A guide shaft 163 guides one end of carriage 60. The other end of carriage 60 is guided by an upper frame 120.

The paper printed on in print area PA passes through transport section 380 and is discharged onto discharged-paper tray 260 via discharge section 490 which includes pushing-up portions 491, 491 for pushing up both sides of the paper, and a knurled roller 492 for pushing down a central portion of the paper.

The above-described operation from feeding to discharging is continuously performed in cases where printing is performed on a plurality of sheets of paper. The sheets are fed one by one by automatic paper feeder 210, and the printed sheets of paper P1 are consecutively stacked on discharged-paper tray 260.

Next, a detailed description will be given to each section of the printer.

Figure 4:
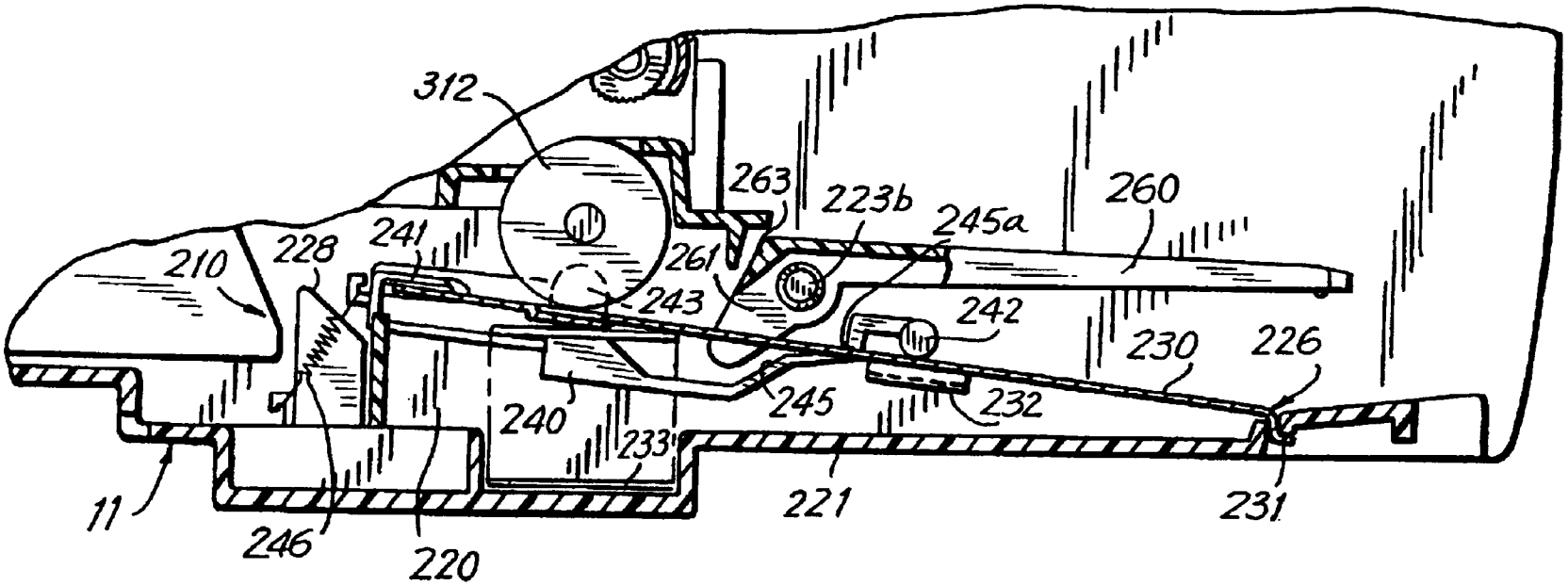
FIG. 4 is an enlarged fragmentary cross-sectional view of the left-hand side of a printer in accordance with a first embodiment of the invention.

As shown in FIGS. 3A, 3B and 4, automatic paper feeder 210 includes a stacker section, generally indicated at 220, a hopper 230, a pair of swinging members 240, 250 (only 240 is shown), the aforementioned operation lever 260, and paper feed-in roller 312.

Figure 5:
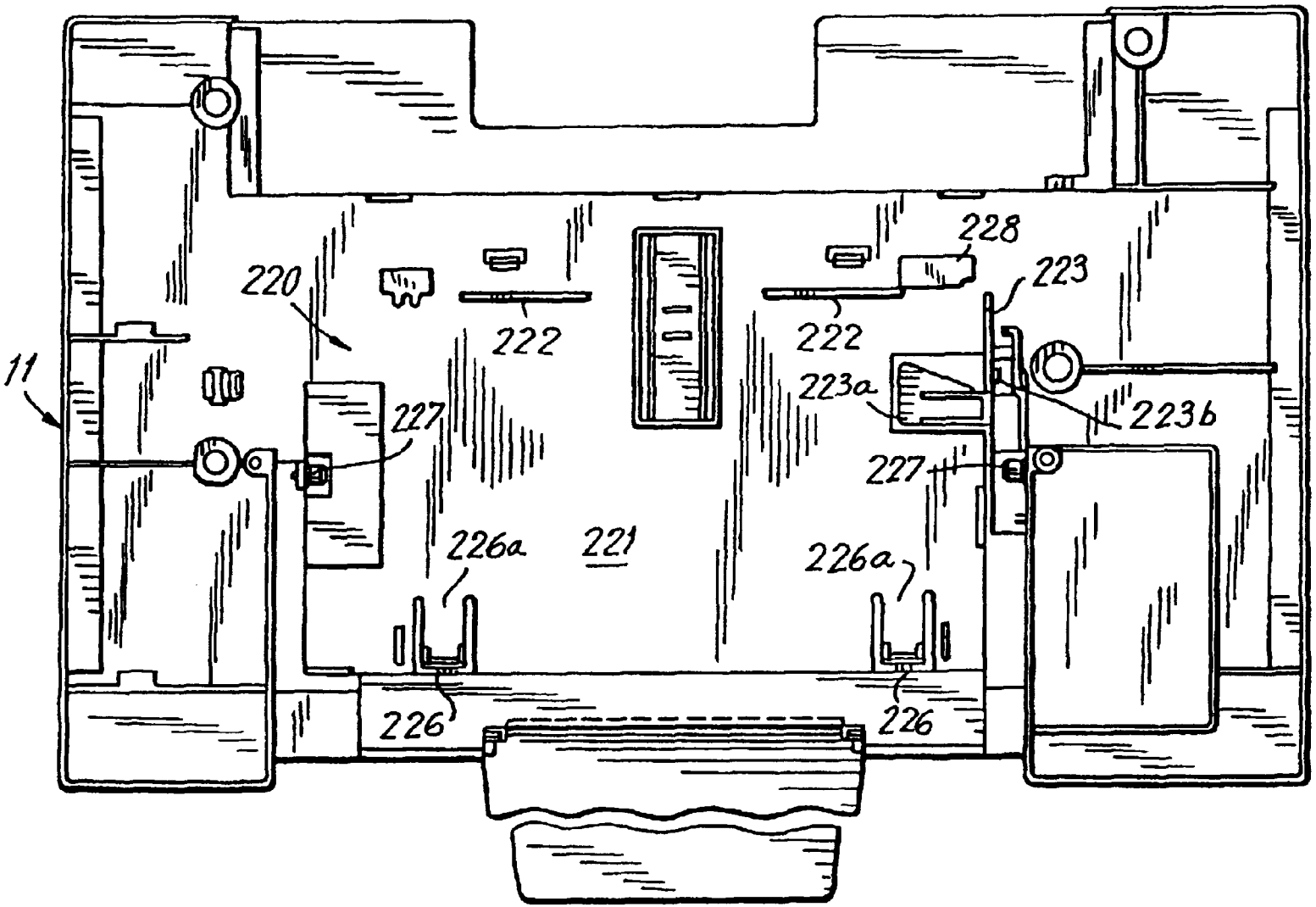
FIG. 5 is plan view of a lower case of a printer in accordance with a first embodiment of the invention.
Figure 6:
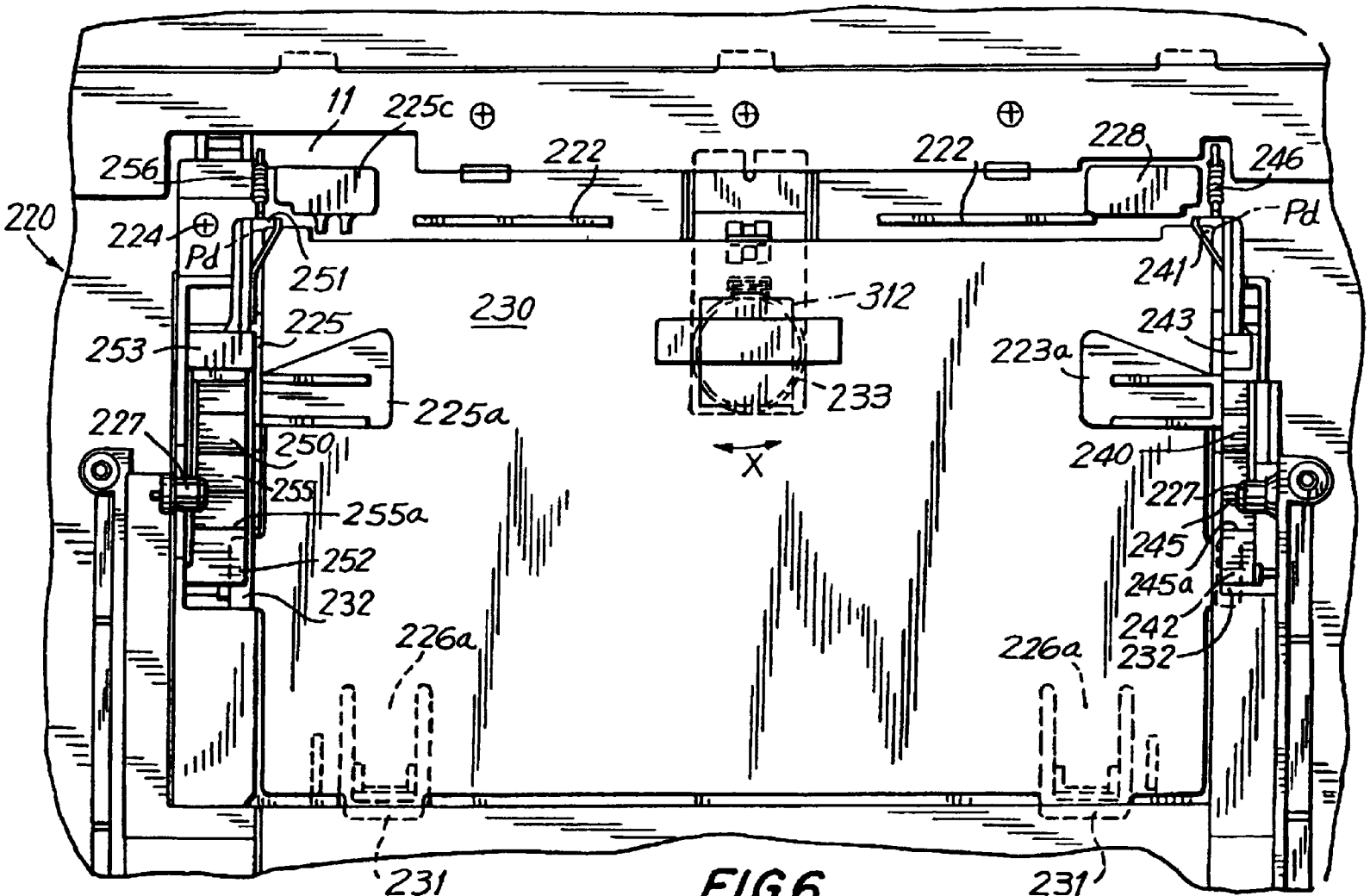
FIG. 6 is an enlarged fragmentary plan view of the lower case of a printer in accordance with a first embodiment of the invention.

Also, as shown in FIGS. 5 and 6, stacker section 220 includes a bottom 221 of a lower case 11 of the printer, aligning members 222, 222 for aligning the tips of the sheets of paper and formed integrally with and projecting upwardly from bottom 221, a right-side holder 223 for holding the right sides of the sheets and similarly formed integrally with and projecting upwardly from bottom 221, and a left-side holder 225 for holding the left sides of the sheets and fixed to bottom 221 by a screw 224. Left-side holder 225 is further illustrated in FIGS. 7(a)–7(c). Left-side holder 225 is not formed integrally with the case so it is possible to change the position of or replace left-side holder 225.

Figure 7A:
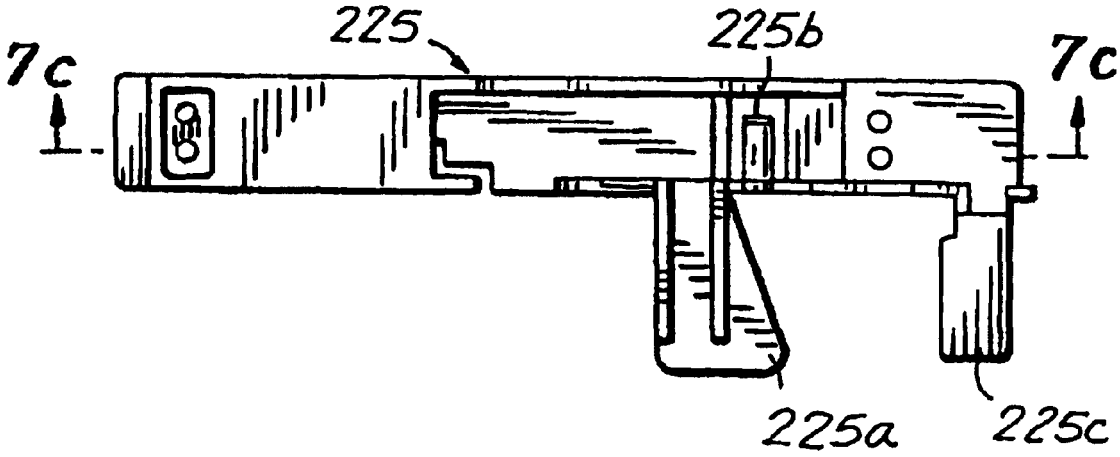
FIGS. 7(a)–7(c) illustrate a left-side holder, FIG. 7(a) being a plan view, FIG. 7(b) being a front elevational view and FIG. 7(c) being a cross-sectional view taken along line 7c—7c in FIG. 7(a)
Figure 7B:
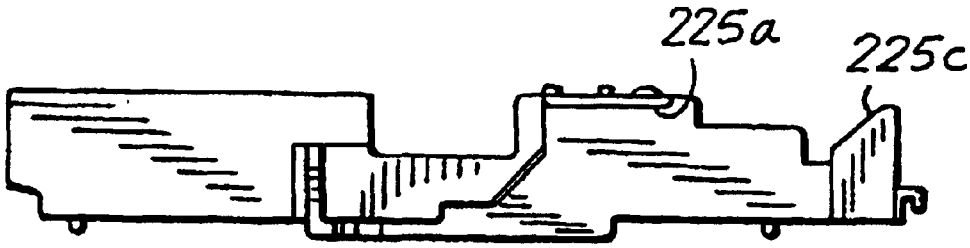
Figure 7C:
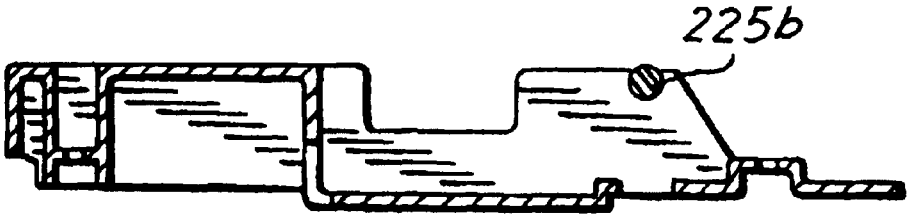

A loop holder 223a for the paper and a support shaft 223b of swinging member 240 are formed integrally on right-side holder 223. FIGS. 7(a) to 7(c) further disclose a hoop holder 225a and a support shaft 225b of a swinging member 250 formed integrally on left-side holder 225.

In addition, as shown in FIGS. 5, 6 and 7(a) to 7(c), a right-side loop canceling wall 228 is formed integrally on bottom 221 of the case, while a left-side loop canceling wall 225c is formed on left-side holder 225.

FIGS. 4 and 6 show hopper 230 formed by an iron blank in the form of a sheet having inserting portions 231, 231 formed integrally and inserted into support holes 226 formed in the bottom 221 of the aforementioned case. Hopper 230 is also formed integrally with receiving portions 232, 232 with respect to the swinging members, as shown in FIGS. 4 and 6. As inserting portions 231, 231 are inserted into support holes 226 in the bottom of the case, the hopper 230 is rotatably mounted in stacker section 220. In each support hole 226, a tongue 226a for resiliently supporting inserting portion 231, is integrally formed with bottom 221, as shown in FIGS. 5 and 6. A compression spring 233 is provided between bottom 221 and hopper 230. Hopper 230 is urged toward paper feed-in roller 312 by the action of compression spring 233.

Figure 8A:
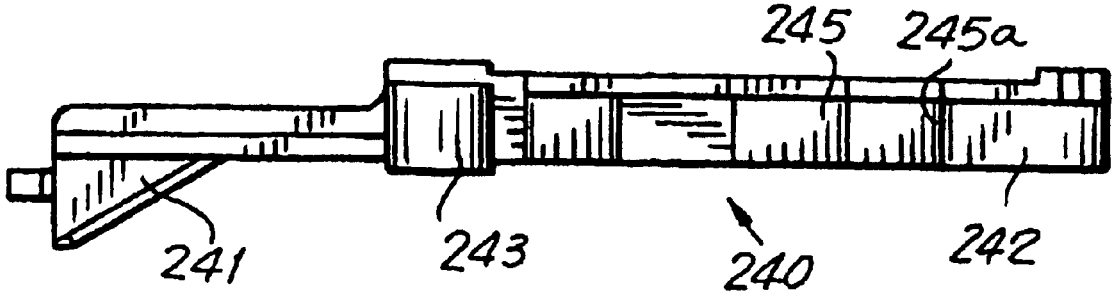
FIGS. 8(a)–8(c) illustrate a swinging member, FIG. 8(a) being a plan view, FIG. 8(b) being a front elevational view, and FIG. 8(c) being a bottom view.
Figure 8B:
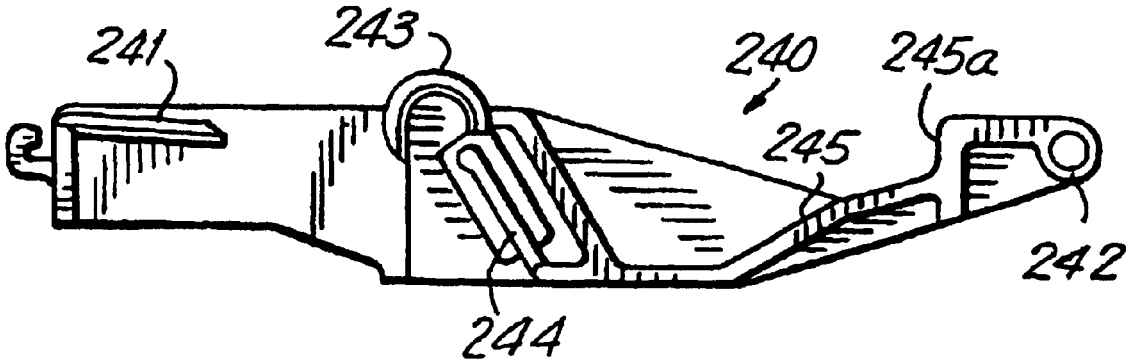
Figure 8C:
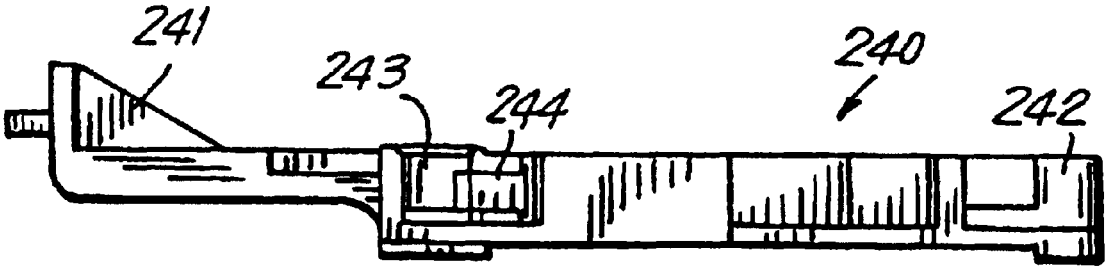

As shown in FIGS. 4, 6, and 8(a) to 8(b), swinging member 240 has a separation pawl 241 located above a corner Pd (see FIG. 6) of a leading end of the paper as well as a pressing-down portion 242 for pressing down the hopper. A bearing portion 243 formed between separation pawl 241 and pressing-down portion 242 is attached to a support shaft 223b formed in the above-described right-side holder 223, and is swingably supported about support shaft 223b. In FIGS. 8(a) to 8(c), a tongue 244 serves as a stopper for preventing bearing portion 243 from coming off support shaft 223b after bearing portion 243 is fitted to support shaft 223b.

Swinging member 240 has a receiving portion 245 which abuts against as actuating portion 261 of operation lever 260. Formed in a rear portion of receiving portion 245 is a holding portion 245a for holding the rotated position of operation lever 260, that is, actuating portion 261, when operation lever 260 is rotated (see FIG. 12).

As shown in FIG. 6, swinging member 250 is arranged substantially symmetrical with swinging member 240 and is similarly constructed. Thus, as shown in FIG. 6, swinging member 250 includes pressing-down portions 252 and 253 and a bearing portion 253, which is attached to support shaft 225b formed in left-side holder 225. Also, as shown in FIG. 6, swinging member 250 includes a receiving portion 255, having a holding portion 255a.

As shown in FIGS. 4 and 6, swinging members 240 and 250 are urged in a counterclockwise direction as viewed in FIG. 4 by means of tensile springs 246, 256, respectively, provided between swinging members 240, 250 and lower case 11.

Figure 9A:
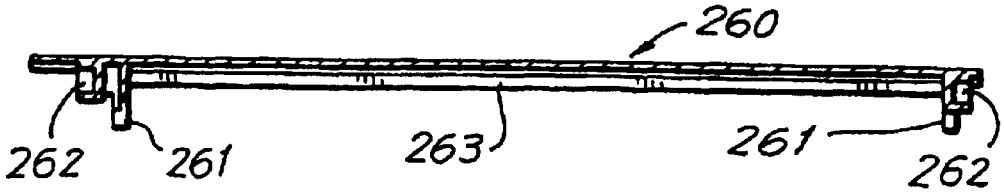
FIGS. 9(a)–9(c) illustrate an operation lever, FIG. 9(a) being a cross-sectional view taken along lines 9a—9a in FIG. 9(b), FIG. 9(b) being a plan view, and FIG. 9(c) being a left-hand side elevational view.
Figure 9B:
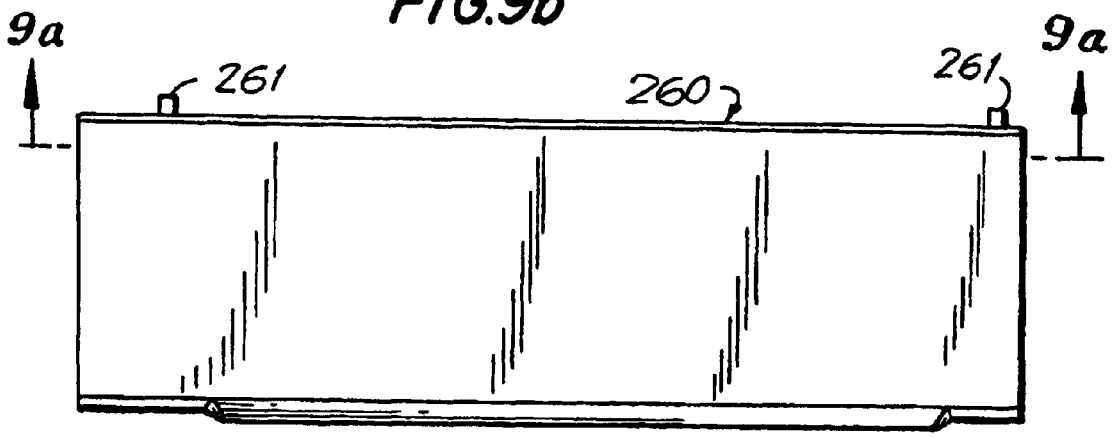
Figure 9C:
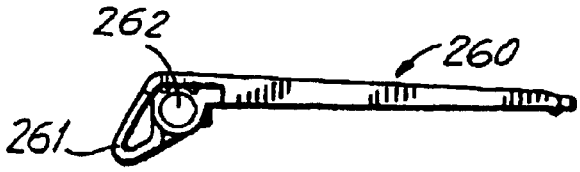

As shown in FIGS. 4, 6, and 9(a) to 9(c), operation lever 260 includes actuating portions 261, 261 capable of pressing down pressing-down portions 242, 252 of swinging members 240, 250. Operation lever 260 is rotatably supported above stacker section 220. In FIGS. 9(a) to 9(c), operation lever 260 is rotatably supported, as bearing portions 262, 262 are fitted to shafts 227, 227. Shafts 227 are formed integrally with lower case 11 (see FIGS. 5 and 6). Further, a restricting portion 263 restricts the number of sheets of paper P inserted by being inserted in stacker section 220 when operation lever 260 is rotated causing swinging members 240, 250 to swing by means of the actuating member 261, as shown in FIGS. 12 and 13.

Figure 10:
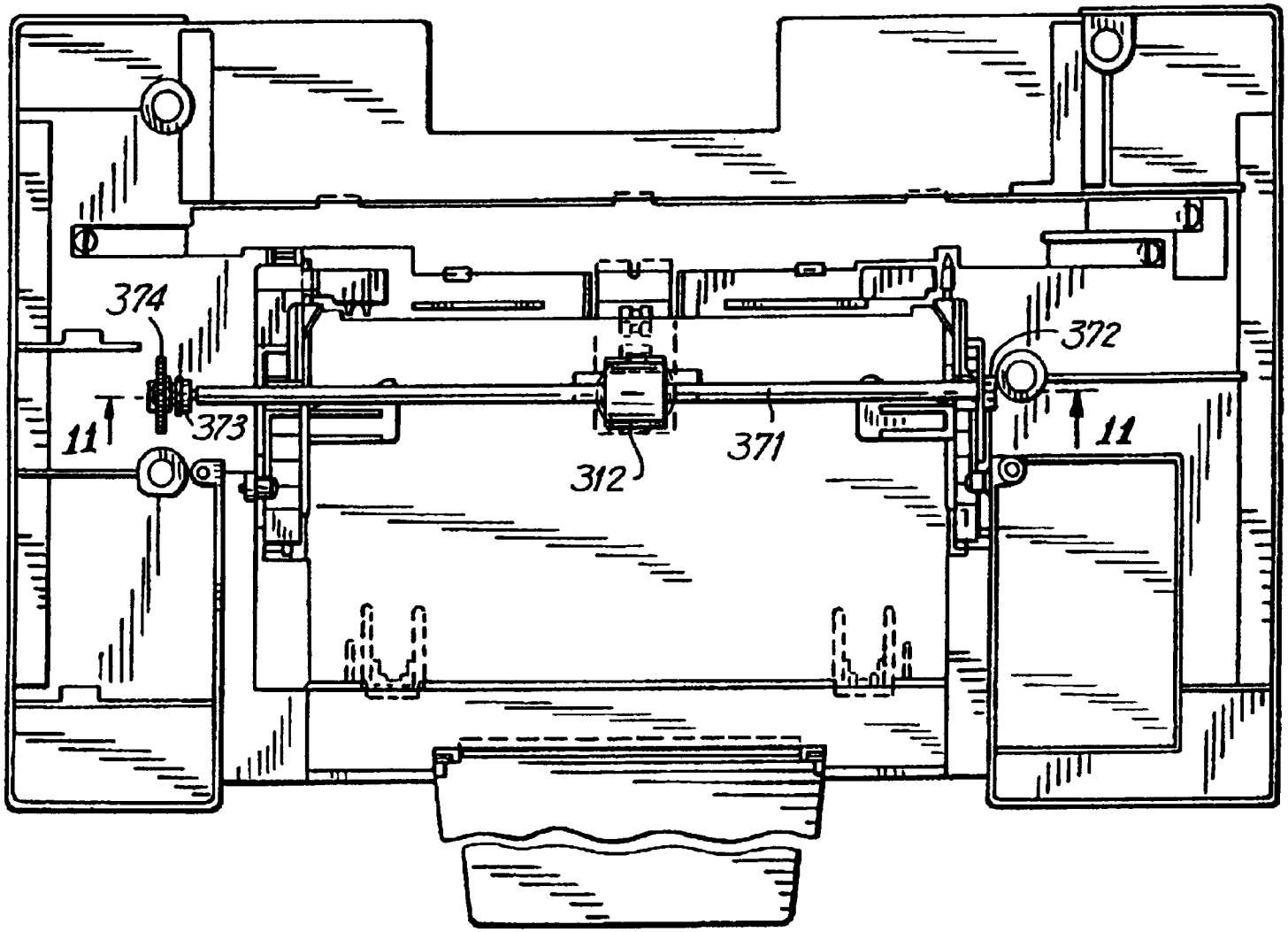
FIG. 10 is a top plan view of the printer in which the upper case is removed.
Figure 11:
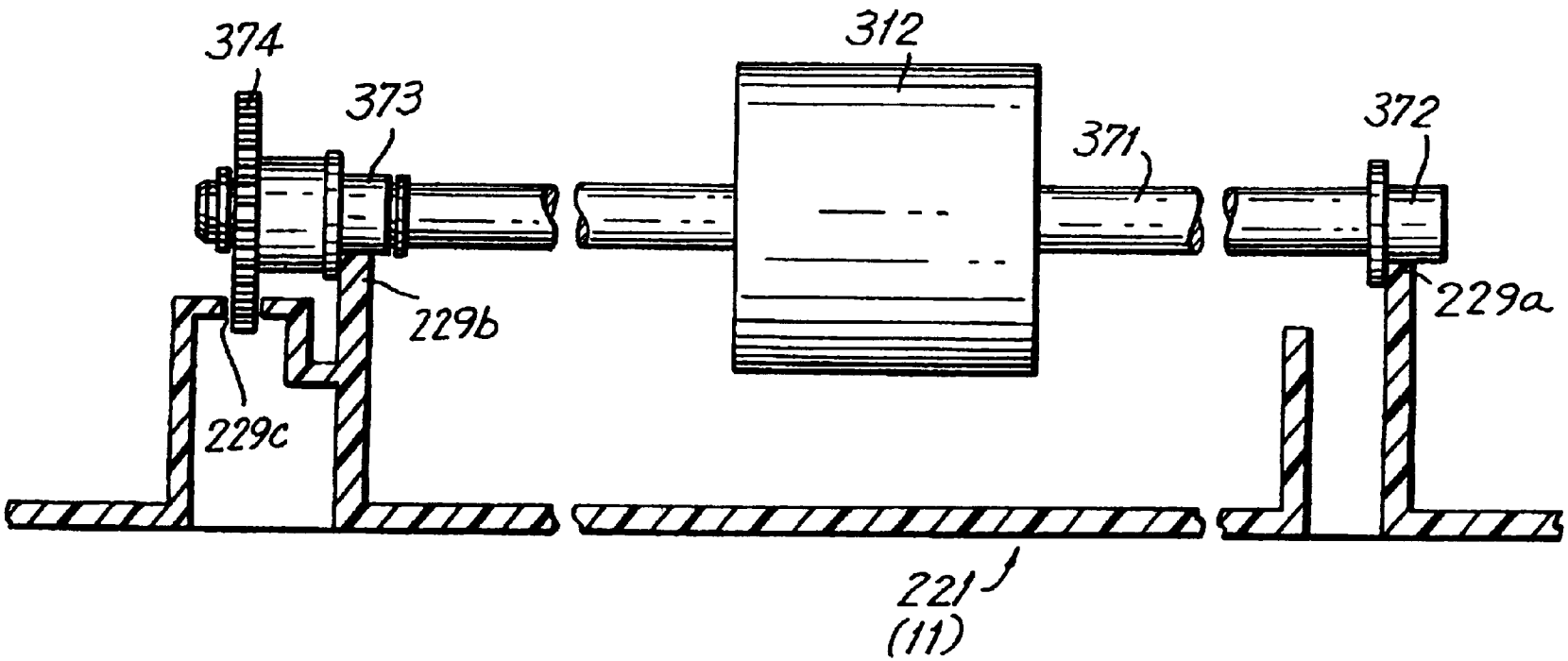
FIG. 11 is a fragmentary cross-sectional view taken along line 11—11 in FIG. 10.

As shown in FIGS. 10 and 11, paper feed-in roller 312, is the only feed-in roller supported on the central portion of a shaft 371. Bearings 372 and 373 are respectively supported by bearing supports 229a, 229b which are formed integrally with bottom 221 of the case. A gear 374 is fixed to shaft 371. As gear 374 is rotationally driven by a driving system, which will be described later, feed-in roller 312 rotates. A temporary positioning hole 229c is utilized when a feed-in roller assembly including feed-in roller 312, shaft 371, bearings 372, 373, and gear 374 is set in lower case 11. The feed-in roller assembly is secured by bearing supports 229a, 229b clamping bearings 372, 373 by means of side frames which will be described later.

Next, a description will be given of the operation of automatic paper feeder 210. It should be noted swinging member 250 operates in the same way as swinging member 240, and therefore a description of the operation of swinging member 250 will be omitted.

Figure 12:
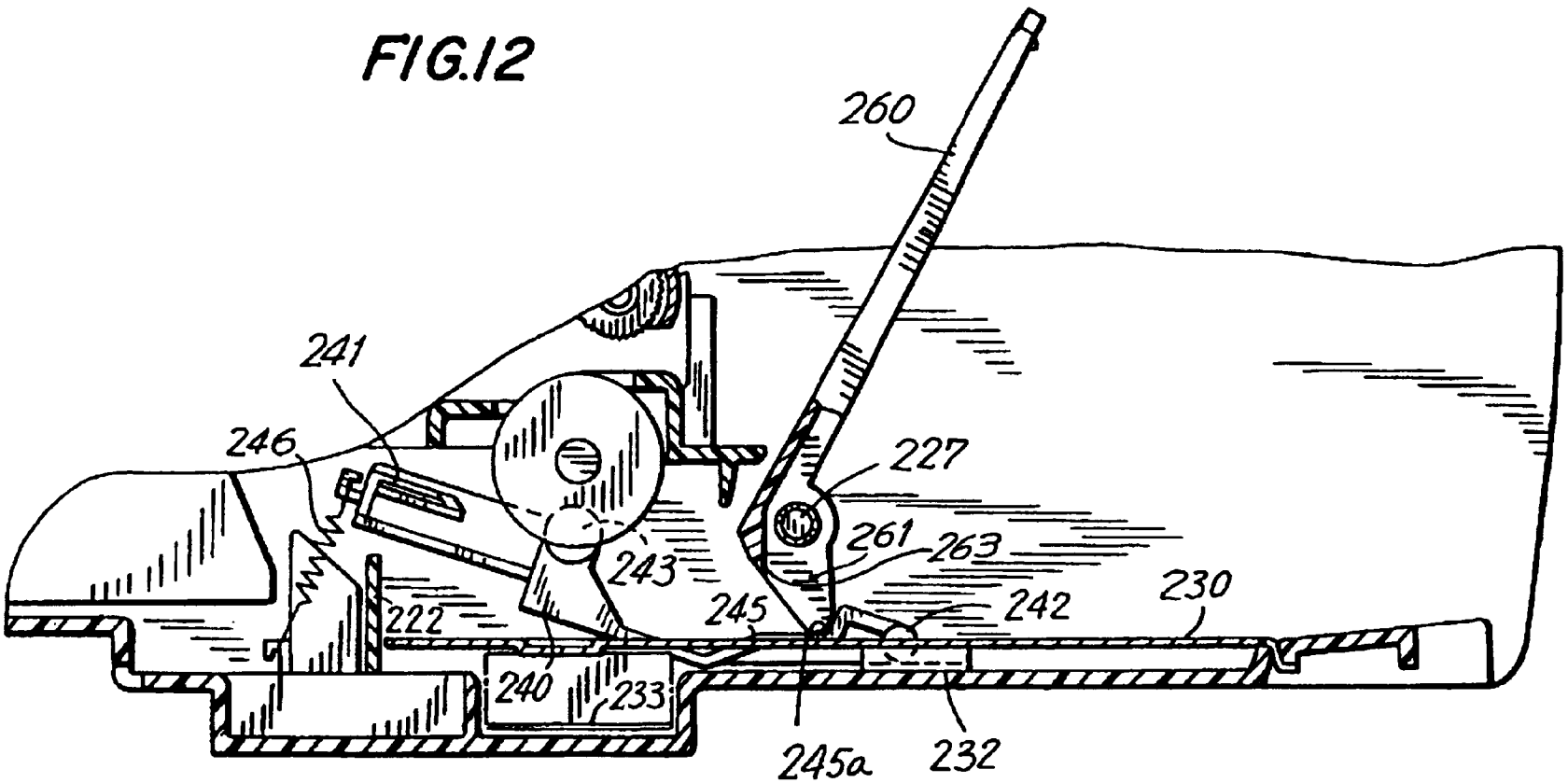
FIG. 12 is an enlarged fragmentary sectional view illustrating the operation of the invention.
Figure 13:
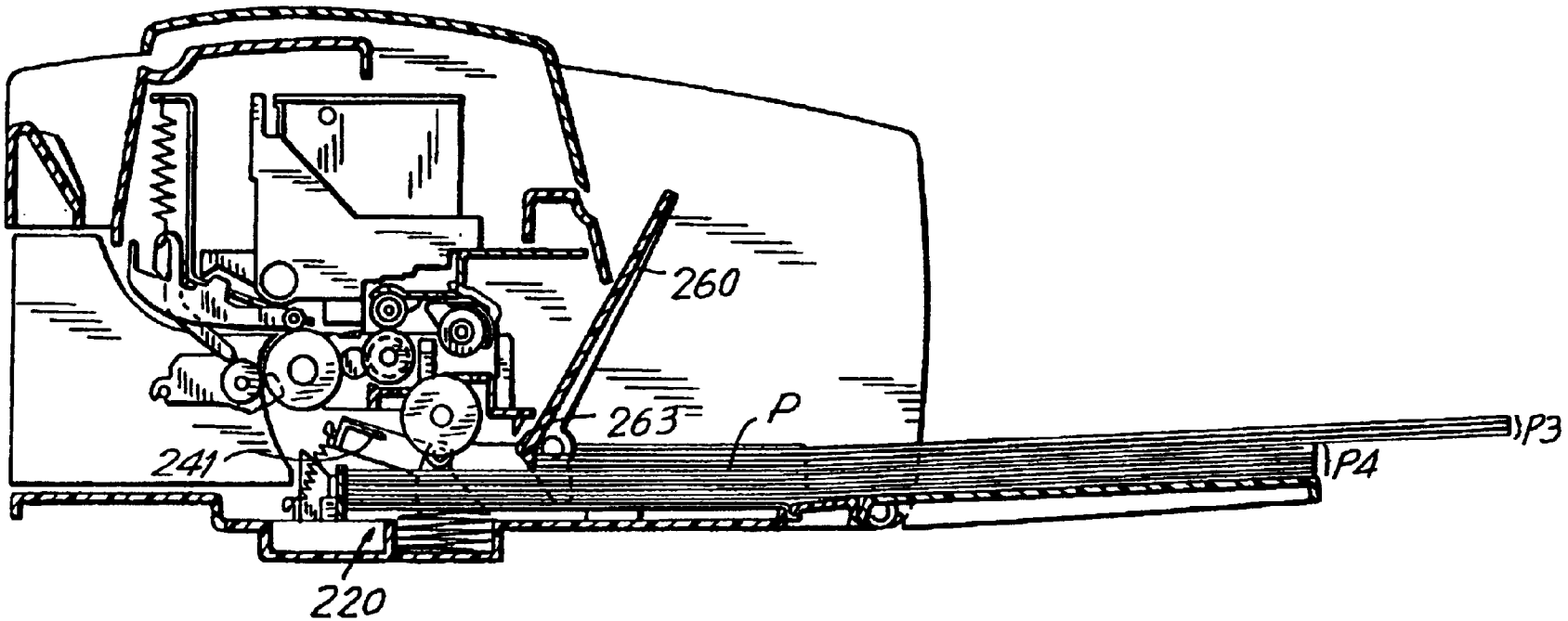
FIG. 13 is a cross-sectional view of the printer illustrating the operation of the invention.

FIG. 12 shows operation lever 260 rotated to its position when the paper is to be loaded into the stacker section. Actuating portion 261 of operation lever 260 abuts against and presses receiving portion 245 of swinging member 240 downward. When receiving portion 245 is pressed downward, pressing-down portion 242 moves downward and abuts against receiving portion 232 of hopper 230, thereby pressing down hopper 230 against the spring force of a compression spring 233. At the same time, as swinging member 240 rotates, separation pawl 241 moves upward. When operation lever 260 rotates in the counterclockwise direction as viewed in FIG. 12, actuating portion 261 engages holding portion 245a, resulting in the rotation of operation lever 260 to the position illustrated in FIG. 12.

Referring to FIG. 13, if a plurality of sheets of paper is inserted into stacker section 220, the leading edges of a group of excess sheets of paper P3 abut against restricting portion 263 of operation lever 260, and their insertion is prevented. Therefore, with restricting portion 263 acting in conjunction with separation pawl 241, only an appropriate number of sheets of paper P4 is inserted into the stacker section 220. There is no paper that can slide over separation pawl 241.

Specifically, if operation lever 260 rotates, hopper 230 is pressed downward, and separation pawl 241 moves upward. Hence, paper P which is set in stacker section 220 is prevented from entering above separation pawl 241, thereby making it possible to obtain an accurate paper feeding-in operation. Also, the mechanism for pressing down hopper 230 and moving separation pawl 241 upward can be obtained simply by using swinging member 240 and operation lever 260 in conjunction with one another.

Additionally, when operation lever 260 is rotated, since the number of sheets inserted in stacker section 220 is restricted by restricting portion 263, the sheets of paper P can be prevented more reliably from entering above separation pawl 241.

Further, since operation lever 260 also serves as the discharged-paper tray, the number of components used is further reduced.

Furthermore, when operation lever 260 is rotated causing actuating portion 261 to swing singing member 240, holding portion 245a of swinging member 240 engages actuating portion 261 to maintain the position of rotation of operation lever 260. Hence, the operation of inserting the paper is facilitated.

Subsequently, the group of excess sheets of paper P3 is removed. Operation lever 260 is returned to its original position, as shown in FIG. 3A, and, since there is no pressing down of pressing-down portion 242 of swinging member 240, hopper 230 moves upward by the force of compression spring 233, allowing the paper to be pressed against feed-in roller 312. At the same time, swinging member 240 returns to its original position, and separation pawl 241, located above a corner of a leading end of the paper, encloses the corner of the paper, urging the paper downward.

Figure 14:
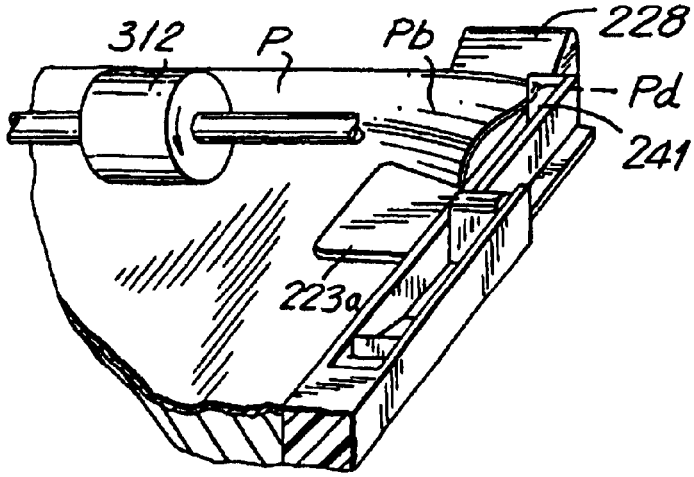
FIGS. 14–16 are fragmentary views sequentially illustrating the operation of the invention.
Figure 15:
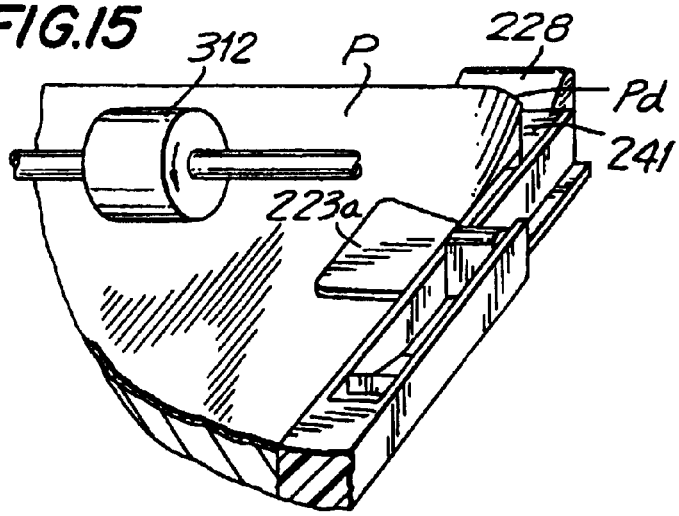
Figure 16:
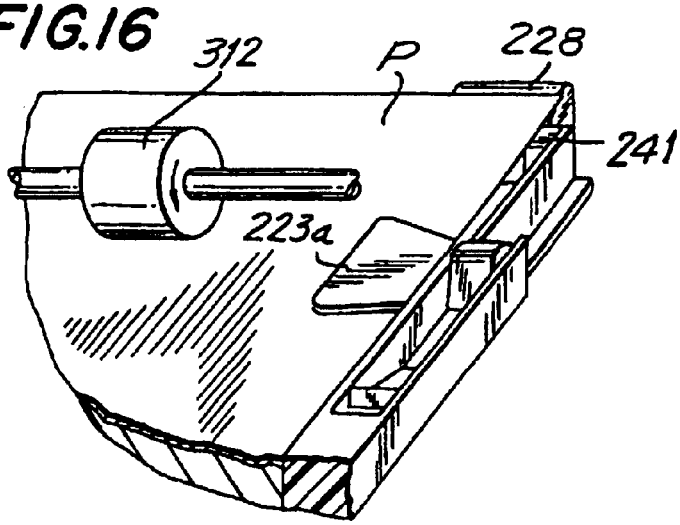

The operation of the printer in this configuration can now be described with reference to FIGS. 14–16. Corner Pd of the leading end of paper P fed by the rotation of feed-in roller 312 abuts against separation pawl 241, thereby forming a loop Pb. The size of loop Pb is restricted by loop holder 223a. If the size of loop Pb reaches a predetermined limit, corner Pd of the leading end of the paper is snapped off and removed from separation pawl 241, as shown in FIG. 15. Corner Pd then contacts loop canceling wall 228, eliminating loop Pb. Thus, the sheets of paper P are separated, and individually (FIG. 16) fed to automatic feeding path 202 (see FIG. 3A). When feed-in roller 312 is rotating, deskewing is performed as more particularly described below as the leading edge of paper P fed in is pressed into each nip between gate roller 340 and paper feed roller 330, which at this time are rotating in a direction opposite to the paper feeding direction. During this period, paper P is pivoted in its plane about a portion of feed-in roller 312 (in the directions of double-headed arrows X in FIGS. 6 and 17). Subsequently, when feed rollers 330 rotate in the paper feeding direction, paper P is wound around paper feed rollers 330 and reaches print area PA via pinch rollers 350. Print area PA is formed between an upper surface of intermediate frame 110 and ink jet head H mounted on carriage 60. Carriage 60 reciprocates in a direction perpendicular to the plane of the drawing of FIG. 3A. The paper printed on in print area PA passes through transport section 380 and discharge section 490 and is discharged onto operation lever 260 serving as the discharged-paper tray. The discharged paper is designated by P1.

Accordingly, a printer constructed and arranged similar to that described above is more compact than conventional printers since the bottom of stacker section 220 of automatic paper feeder 210 is formed by bottom 221 of the printer case. In this way, any dead space is eliminated between the bottom of the printer case and the stacker section.

In addition, since loop holder 223a and loop canceling wall 228 are formed integrally with the printer case, the printer can be made further compact, and, if the paper size is fixed, loop holder 225a and loop canceling wall 225c can also be integral with the printer case and the printer can be made even more compact.

The mechanism for driving paper feed-in roller 312 will now be described with reference to FIGS. 17–22b.

Figure 17:
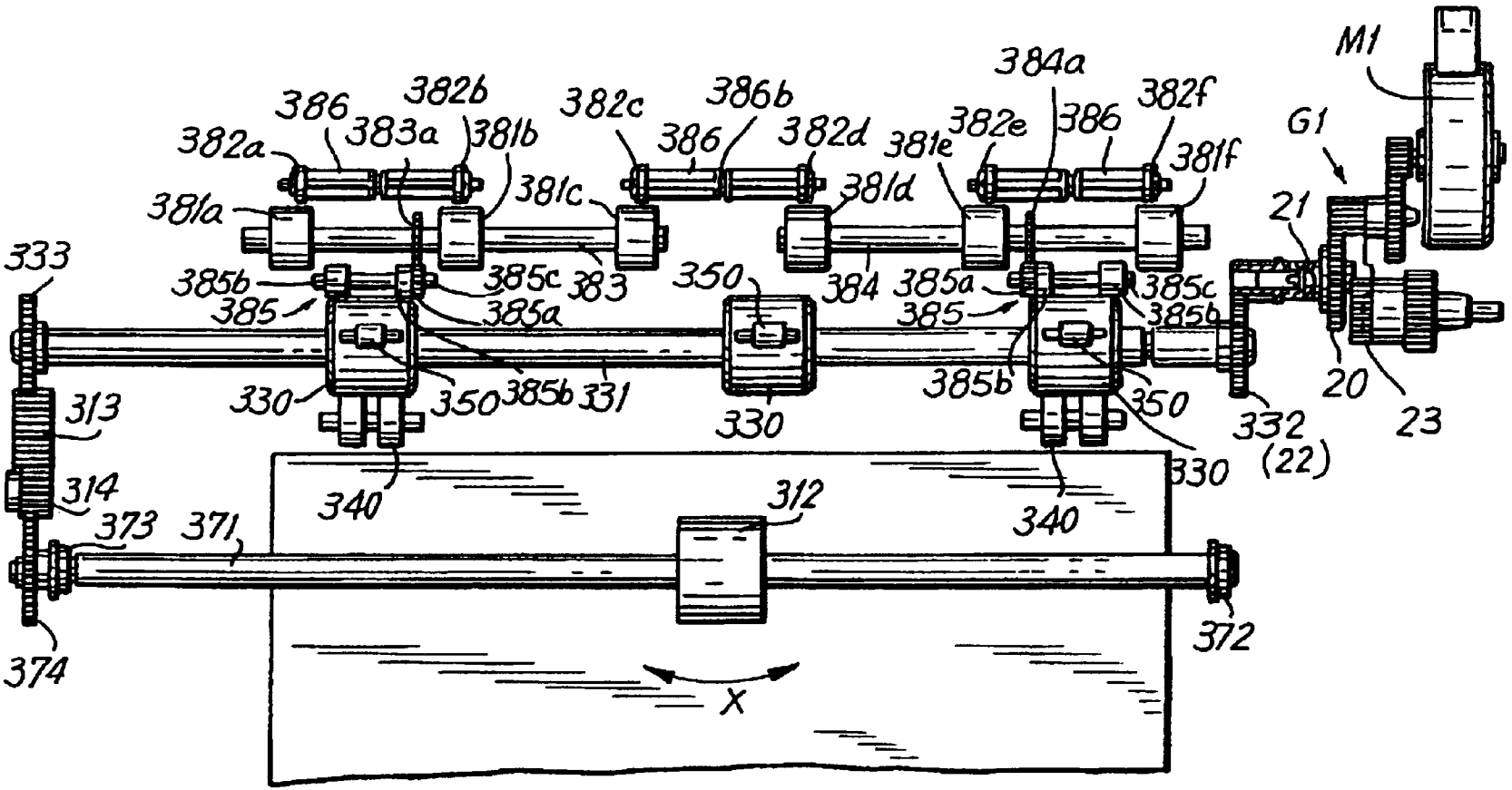
FIG. 17 is a development view of a driving system.

FIG. 17 is a diagram illustrating a developed state of an overall driving system of the printer, including rollers. Accordingly, the positional relationships of the respective rollers and the like in this figure do not necessarily agree with those of the other figures.

Feed-in roller 312 is rotatively driven by a feed motor M1 via a gear train G1, a gear 332 fixed to one end of a feed shaft 331, a gear 333 fixed to the other end thereof, a sun gear 313, a planetary gear 314 serving as a movable gear, as will be described later, and a feed-in gear 374 fixed to a feed-in roller shaft 371 on which feed-in roller 312 is mounted. Planetary gear 314 engages with or disengages from feed-in gear 374, and is adapted to engage with a feed-in gear 374 only when the carriage is located at the feeding-in position.

Figure 18:
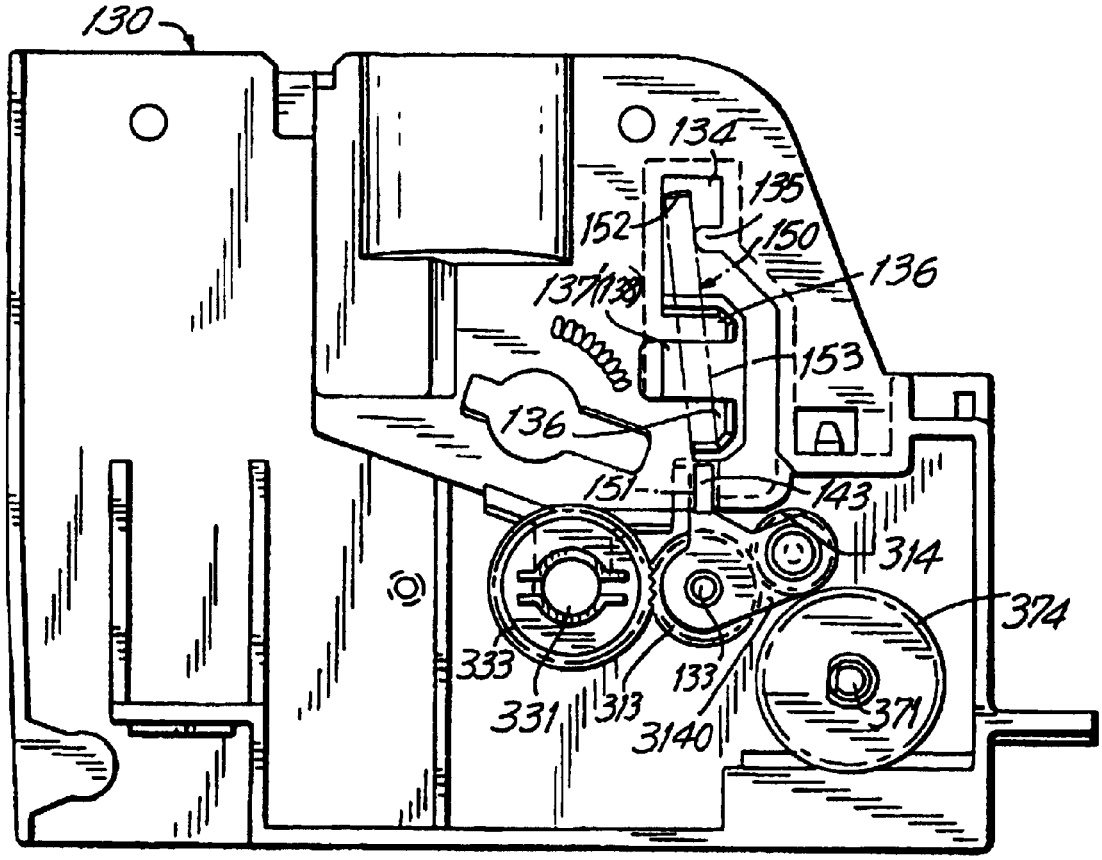
FIG. 18 is an enlarged side elevational view of a portion of the driving system of FIG. 17.

FIG. 18 is a left-hand side elevational view illustrating a left-side frame portion located in the printer case. The left end of feed shaft 331 and feed-in roller shaft 371 are respectively supported by left-side frame 130. Further, FIG. 18 depicts an arm 3140 disposed on an outer side of sun gear 313 and rotatably supported by shaft 133, and which supports planetary gear 314.

Figure 19:
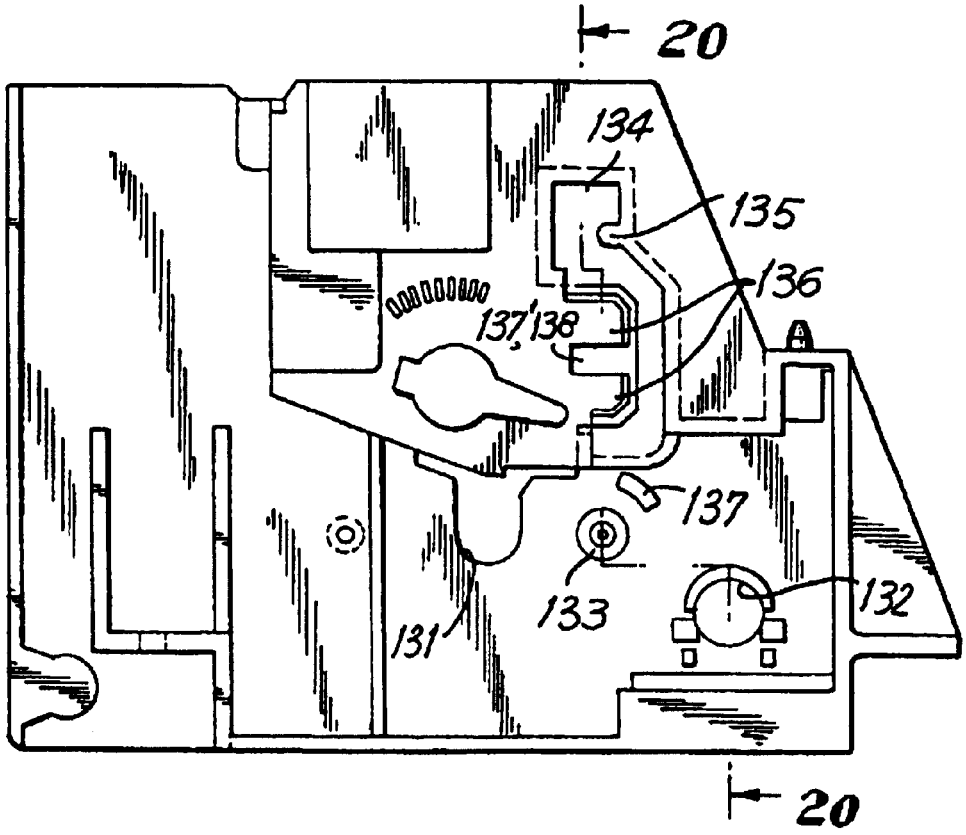
FIG. 19 is a left-hand side elevational view of a left-side frame.
Figure 20:
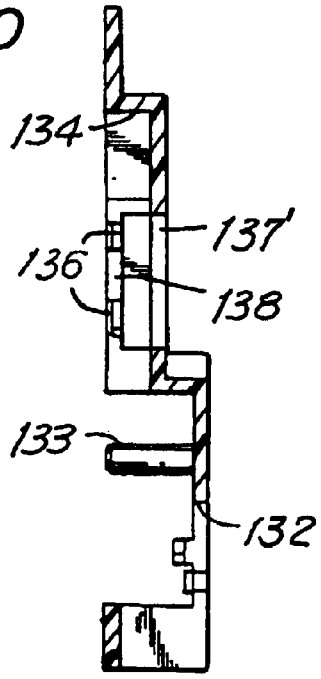
FIG. 20 is a cross-sectional view taken along line 20—20 in FIG. 19.
Figure 21E:
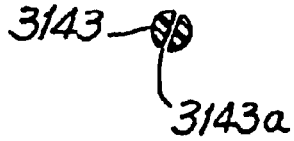
FIGS. 21(a) to 21(g) illustrate an arm, FIG. 21(a) being a left-hand side elevational view.
Figure 21D:
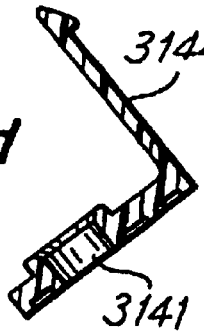
Figure 21A:
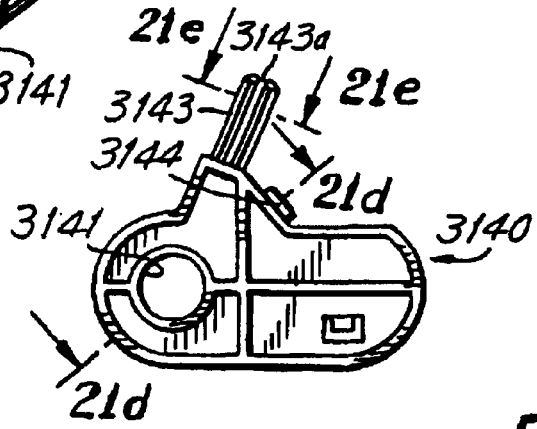
Figure 21G:
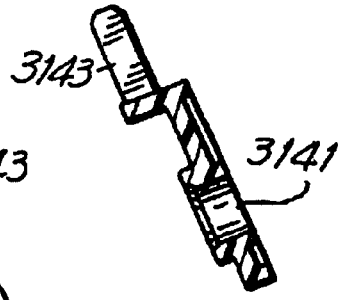
Figure 21B:
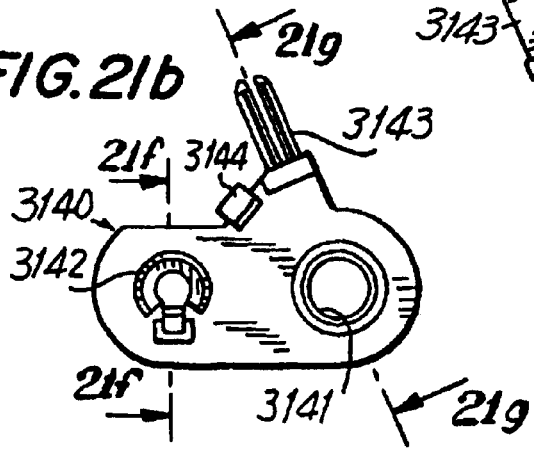
Figure 21F:
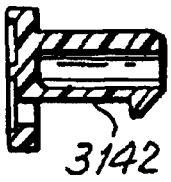
Figure 21C:
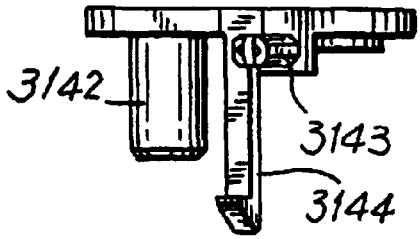

FIGS. 19 and 20 depict a hole 131 for supporting feed shaft 331, a hole 132 for supporting feed-in roller shaft 371. In addition, a shaft 133 for rotatably supporting sun gear 313 and an arm 3140, which will be described below, is disclosed.

FIGS. 21(a) to 21(g) are diagrams further illustrating arm 3140.

Arm 3140 has a hole 3141 rotatably fitted on shaft 133 of the side frame and a shaft 3142 for rotatably supporting planetary gear 314 (see FIG. 18). Reference numeral 3143 denotes a support portion for engaging one end of spring member 150 (see FIGS. 18, 22a, 22b), which is formed in the shape of a pin having a slit 3143a.

Referring to FIGS. 21(a)–(d), a stopper 3144 is formed on arm 3140, and is inserted in a fan-shaped hole 137 (see FIG. 19) formed in side frame 130. Accordingly, arm 3140 of this embodiment is rotatable within the range of hole 137, but arm 3140 is normally held at the position shown in FIG. 18 since spring member 150 tends to extend straight.

Figure 22A:
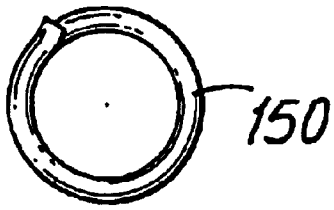
FIGS. 22(a) and (b) illustrate a spring member, FIG. 22(a) being a plan view, and FIG. 22(b) being a fragmentary front elevational view.
Figure 22B:
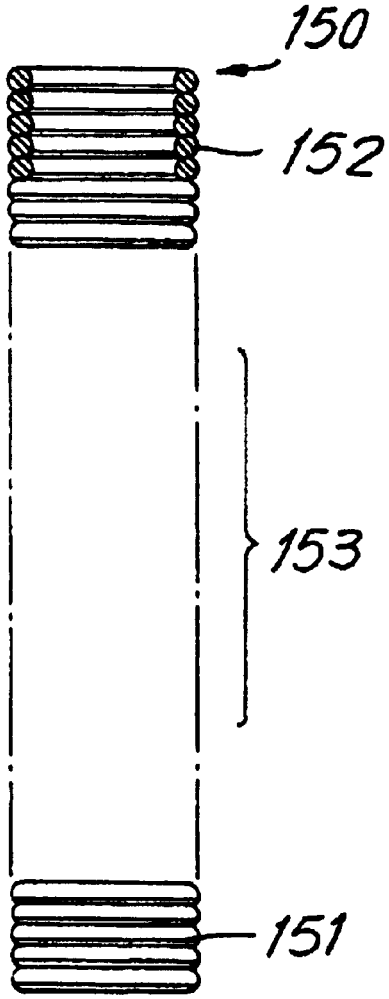

FIGS. 22(a) and 22(b) depict spring member 150 which includes a rod-shaped coil spring, and lower end 151 thereof is fitted over the support portion 3143 of the arm, as shown in FIG. 18. An upper end 152 of spring member 150 is supported and abuts against a projection 135 formed in a recess 134 of side frame 130, as shown in FIGS. 18–20. An intermediate portion 153 of spring member 150 is supported such that two portions thereof are covered by two holding pieces 136, 136 formed on side frame 130 with a space 138 therebetween. At the normal position of spring 150, arm 3140 is held in a position such that planetary gear 314 does not engage feed-in gear 374.

Figure 23:
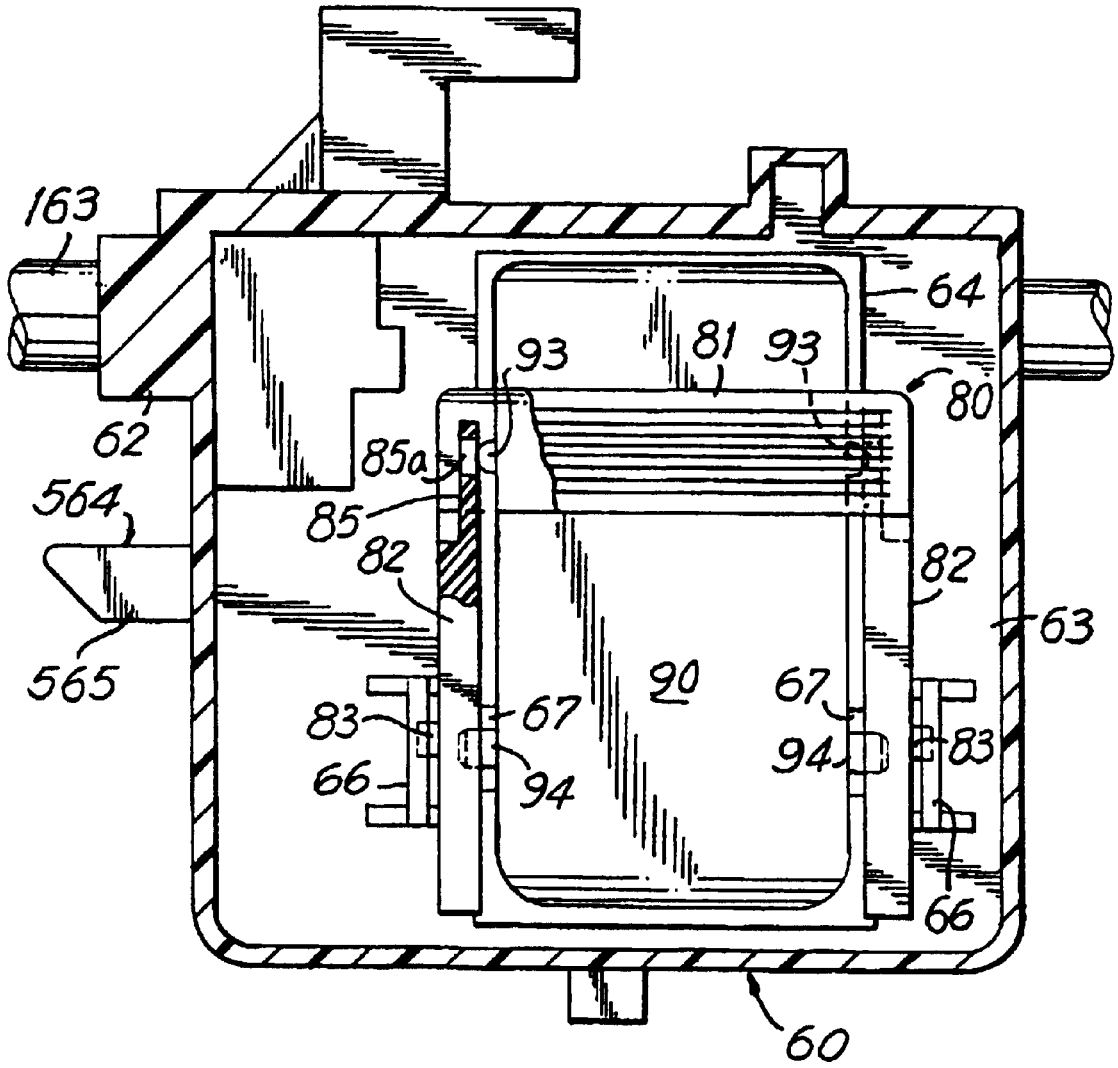
FIG. 23 is a partially cutaway plan view of a carriage.

Reference is now made to FIG. 23 which shows a partially-cutaway plan view of carriage 60. Actuating portion 564 is provided on the left-side surface of carriage 60. Actuating portion 564, a projection-like member, has a tapered surface 565 formed at a distal end thereof. When carriage 60 is brought to the feeding-in position adjacent side frame 130, actuating portion 564 passes through hole 137' formed in side frame 130 and through the space 138 between holding pieces 136, 136, and presses and displaces intermediate portion 153 of spring member 150 to the right as viewed in FIG. 18, allowing arm 3140 to rotate so planetary gear 314 meshes with feed-in gear 374. Because spring member 150 is a rod-like coil spring, the force of actuating portion 564 upon spring member 150 is effected smoothly (see FIG. 24). Spring member 150 is restricted from displacement in other directions by holding pieces 136, 136.

In addition, the meshing (pressing) action of planetary gear 314 with feed-in gear 374 by the rotation of arm 3140 results from actuating portion 564 of carriage 60 pressing against spring member 150, and the operation of the meshing of planetary gear 314 with feed-in gear 374 is effected with the resiliency of spring member 150. Hence, a smooth meshing operation is obtained. Furthermore, sun gear 313 rotates so planetary gear 314 meshes with feed-in gear 374 and planetary gear 314 and feed-in gear 374 do not disengage until the force by actuating portion 564 upon intermediate portion 153 of spring member 150 terminates.

Figure 25:
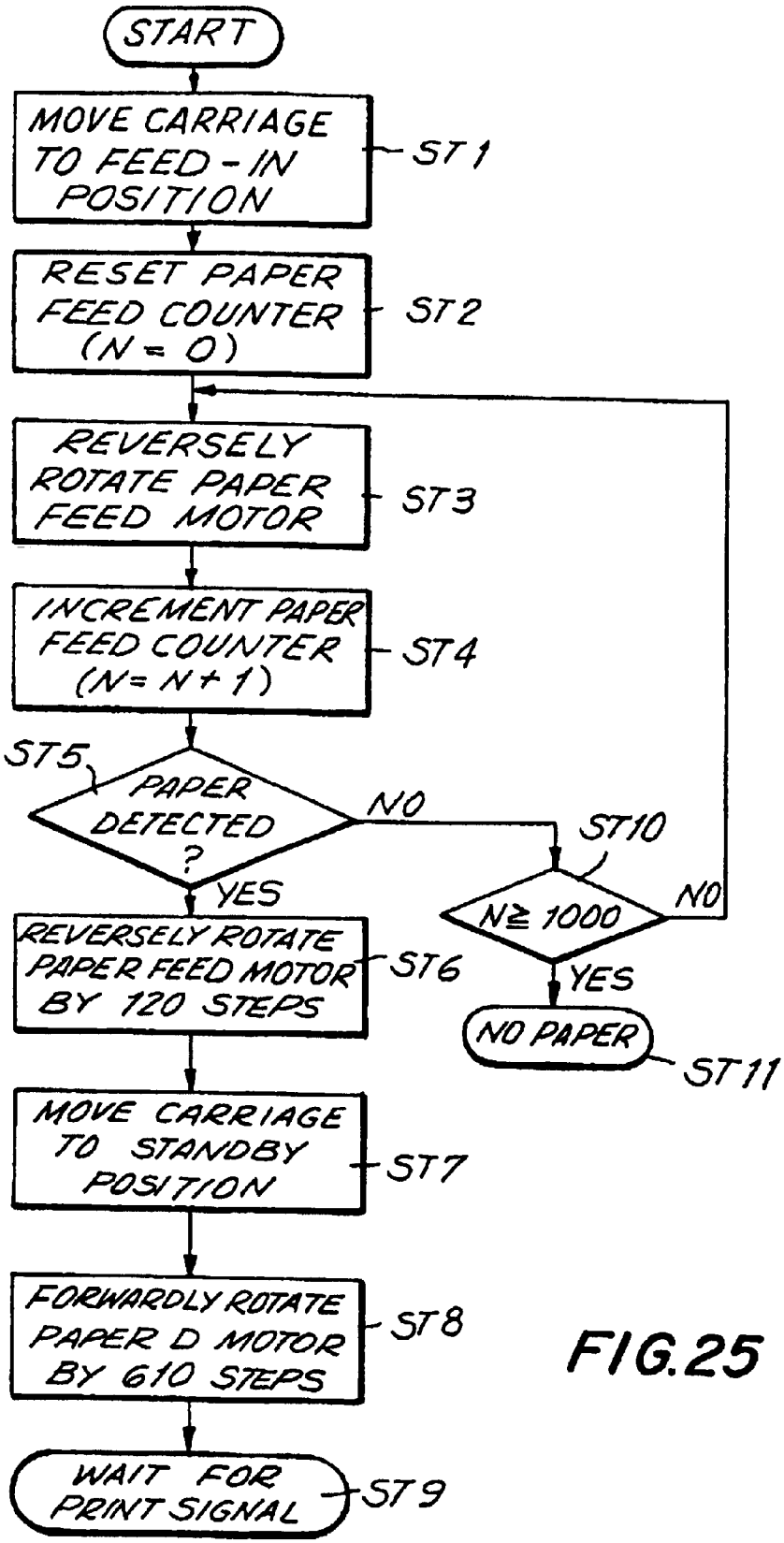
FIG. 25 is a flow chart explaining the operation of the printer.

Reference is now made to FIG. 25 illustrating a flow chart describing the operation of the above driving mechanism.

When a paper feed signal is inputted to the printer from an unillustrated host computer or the like, carriage 60 moves to the feed-in position (step ST1). Upon movement of carriage 60 to the feed-in position, actuating portion 564 presses and displaces intermediate portion 153 of spring member 150, so that arm 3140 rotates (FIG. 24) allowing planetary gear 314 to engage feed-in gear 374.

In Step ST2, a paper feed counter N (counting the number of steps defining the rotary displacement of the feed motor M1) is reset such that N=0.

Next, paper feed motor M1 is rotated in reverse (step ST3) and the paper feed counter begins to count in increments of 1 (Step ST4).

Figure 24:
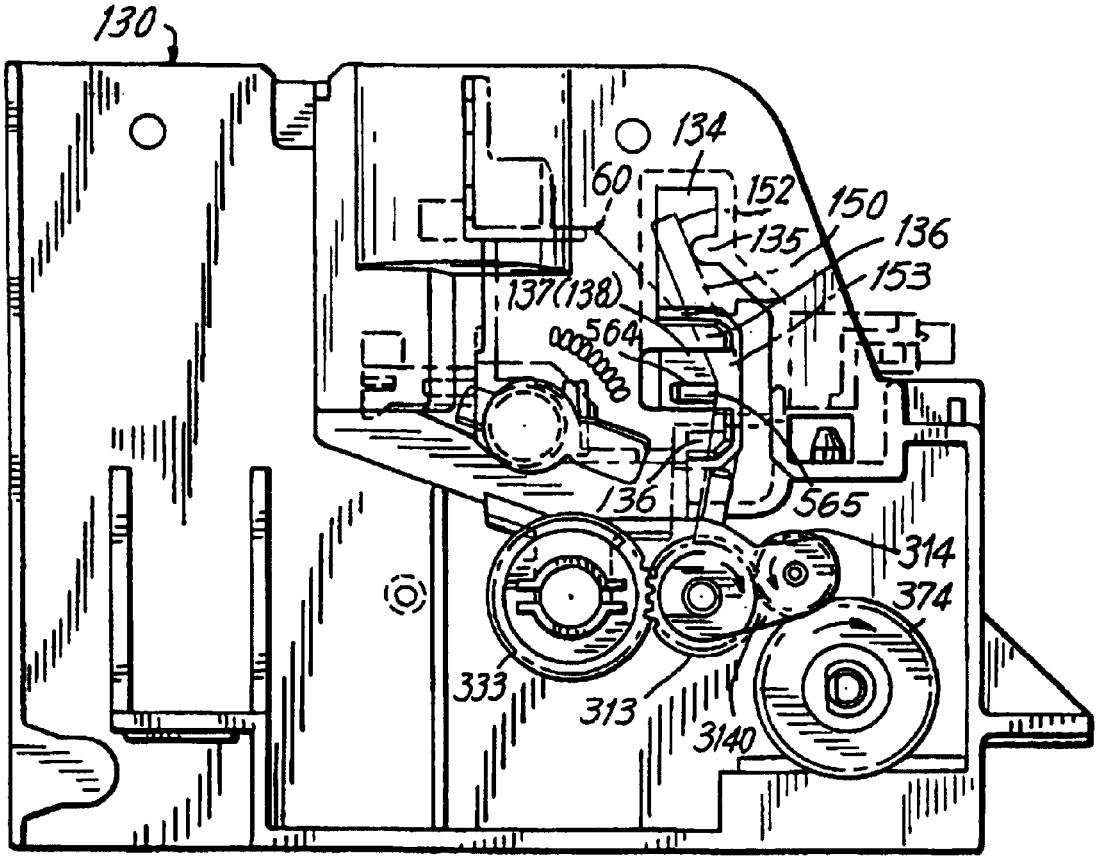
FIG. 24 is a side elevational view of a printer in accordance with the invention illustrating the operation thereof.

The reverse rotation of feed motor M1 causes feed rollers 330 and gear 333 to rotate reversely. As shown in FIG. 24, this rotation is transmitted to feed-in gear 374 via sun gear 313 and planetary gear 314. As a result, feed-in roller 312 rotates in the clockwise direction as viewed in FIG. 24 so that paper P is fed in by the operation of the above-described automatic paper feeder.

Next, a determination is made on the basis of a signal from paper detection switch 923 as to whether or not the paper is actually being fed in (step ST5).

If the paper is being fed in, feed motor M1 is reversely rotated by a predetermined amount (here, by 120 steps) (step ST6).

As a result, the paper is fed further, and deskewing is performed as the leading end of the paper is pressed against each nip between gate roller 340 and paper feed roller 330 rotating in a direction opposite to the paper feeding direction, and the paper is rotated about its portion in contact with feed-in roller 312 (in the direction of double-headed arrow X in FIG. 17).

In Step ST7, carriage 60 is moved to a printing standby position (a position where actuating portion 564 is disengaged from spring member 150).

When actuating portion 564 ceases to press against spring member 150, arm 3140 also returns to its original position (the position shown in FIG. 18) by virtue of the spring action of spring member 150 and there is no engagement of planetary gear 314 with paper-feed gear 374.

In Step ST8, feed motor M1 is rotated forward by a predetermined amount (here, by 610 steps).

As a result, paper feed rollers 330 rotates in a clockwise direction as viewed in FIG. 24, the paper is wound around paper feed rollers 330, and the leading end portion of the paper reaches print area PA via pinch roller 350, thereby assuming the so-called "head-out" state.

In Step ST9, the operation waits for a print signal.

Subsequently, when the print signal is inputted, while carriage 60 reciprocates by the operation of a carriage motor (not shown), ink is ejected from ink jet head H and printing takes place. The printed paper is discharged onto discharged-paper tray 260 via transport section 380 which includes transport rollers 381a–381d (FIG. 1) and star wheels 382a–382d (FIG. 1), as well as discharge section 490 which includes pushing-up portions 491, 491 (FIG. 33) for pushing up both sides of the paper and a knurled roller 492 for pushing down a central portion of paper P1 (FIG. 3A).

As illustrated in step ST5 of FIG. 25, if the paper is not being fed in, a determination is made as to whether or not the number of steps of reverse rotation of feed motor M1 (the number of steps N counted in Step ST4) has reached 1000 (step ST10).

If feed motor M1 has reached 1000 steps, it is determined that there is no paper in automatic paper feeder 210, and in Step ST11, a display is given on a display unit (not shown) to the effect that there is "no paper."

If N has not reached 1000 steps, Step ST3 and subsequent steps are repeated.

In accordance with the driving mechanism of this embodiment, since intermediate portion 153 of spring member 150 is pressed and displaced by actuating portion 564 of carriage 60, arm 3140 rotates and causes planetary gear 314, which is a movable gear, to engage feed-in gear 374. Hence, feed-in roller 312 rotates. Also, the operation of the engagement of planetary gear 314 with feed-in gear 374 is performed with the resiliency of spring member 150. Hence, a smooth meshing operation is obtained, and a smooth and reliable rotating operation of feed-in roller 312 can be obtained.

Spring member 150 has one end 151 supported by arm 3140 and the other end 152 supported by side frame 130. When the pressing of actuating portion 564 of carriage 60 against spring member 150 ceases, spring member 150 returns to its original state. If the pressing of actuating portion 564 of the carriage against intermediate portion 153 of spring member 150 ceases, arm 3140 also returns to its original position by virtue of the returning action of spring member 150. As a result, the engagement of planetary gear 314 with feed-in gear 374 ceases.

Thus, spring member 150 serves to rotate arm 3140 and also serves to return arm 3140 to its original position.

It is understood that various modifications can be made to the actuating mechanism and driving mechanism.

Figure 26:
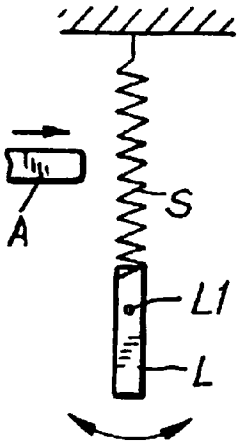
FIG. 26 is a schematic diagram illustrating a lever-actuating mechanism using a spring member.

For example, the actuating mechanism is not limited to the spring member disclosed above. It is possible to use a mechanism and rotate an ordinary lever L, as shown in FIG. 26. In FIG. 26, a lever L is rotatably supported by a shaft L1. In this embodiment, by pressing a spring member S by an actuating member A, lever L will rotate.

The spring member also need not be a rod-like coil spring, and, in its place, a leaf spring may be used. In this case, a smooth operation can be obtained if portions of contact between the leaf spring and the actuating portion are shaped to contact each other smoothly. However, when the spring member is formed of a rod-like coil spring 150, a smooth operation can be obtained without needing to provide such shaping.

Furthermore, in the driving mechanism disclosed above, the movable gear need not be a planetary gear. It suffices if the movable gear assumes at least two positions, one, a position where it engages the feed-in gear by the rotation of the arm to rotate the feed-in gear, and a position where it does not engage the feed-in gear.

Next, a description will be given of print area PA.

Referring back to FIG. 3A, print area PA is formed between an upper surface of ink shielding portion 112 and ink jet head H attached to carriage 60 which reciprocates in a direction perpendicular to the plane of the drawing.

Figure 28:
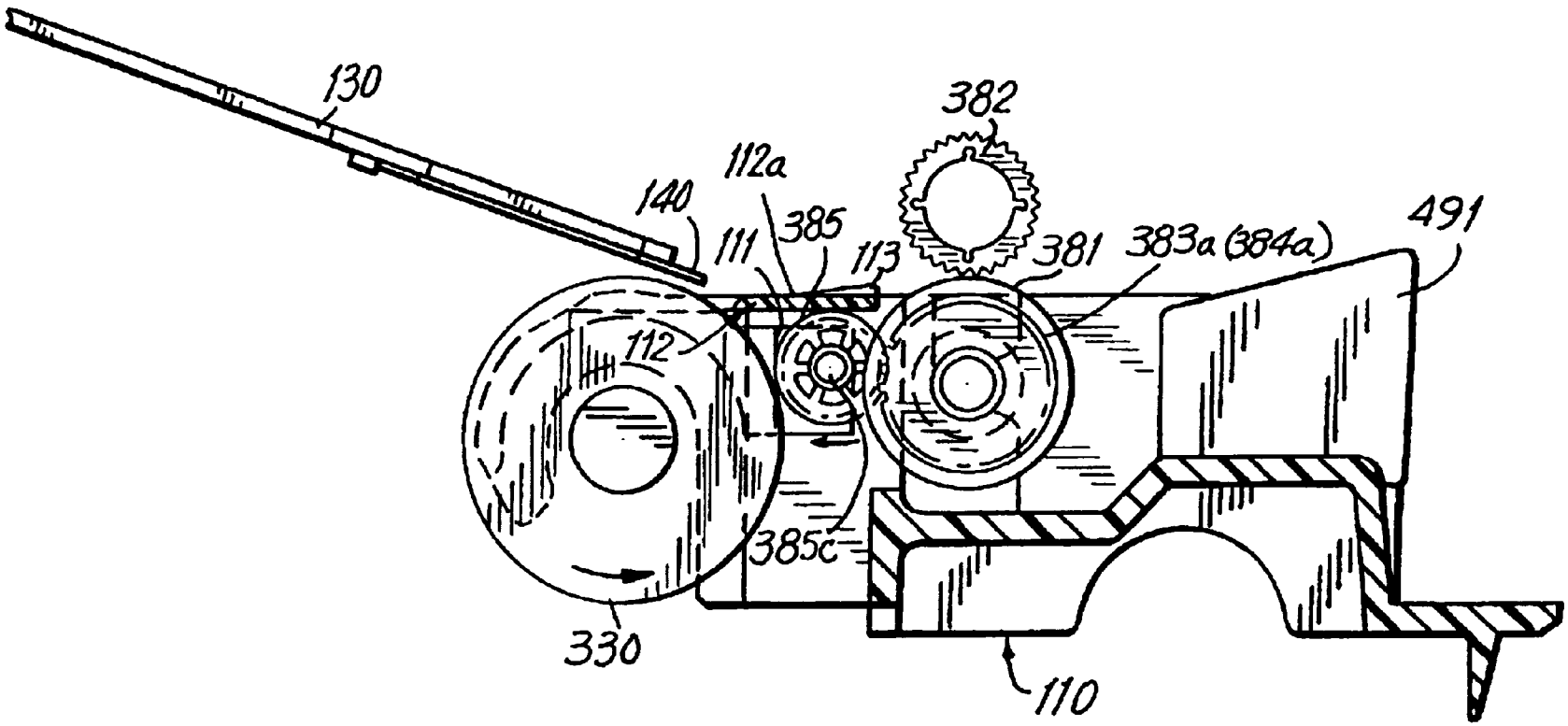
Figure 30:
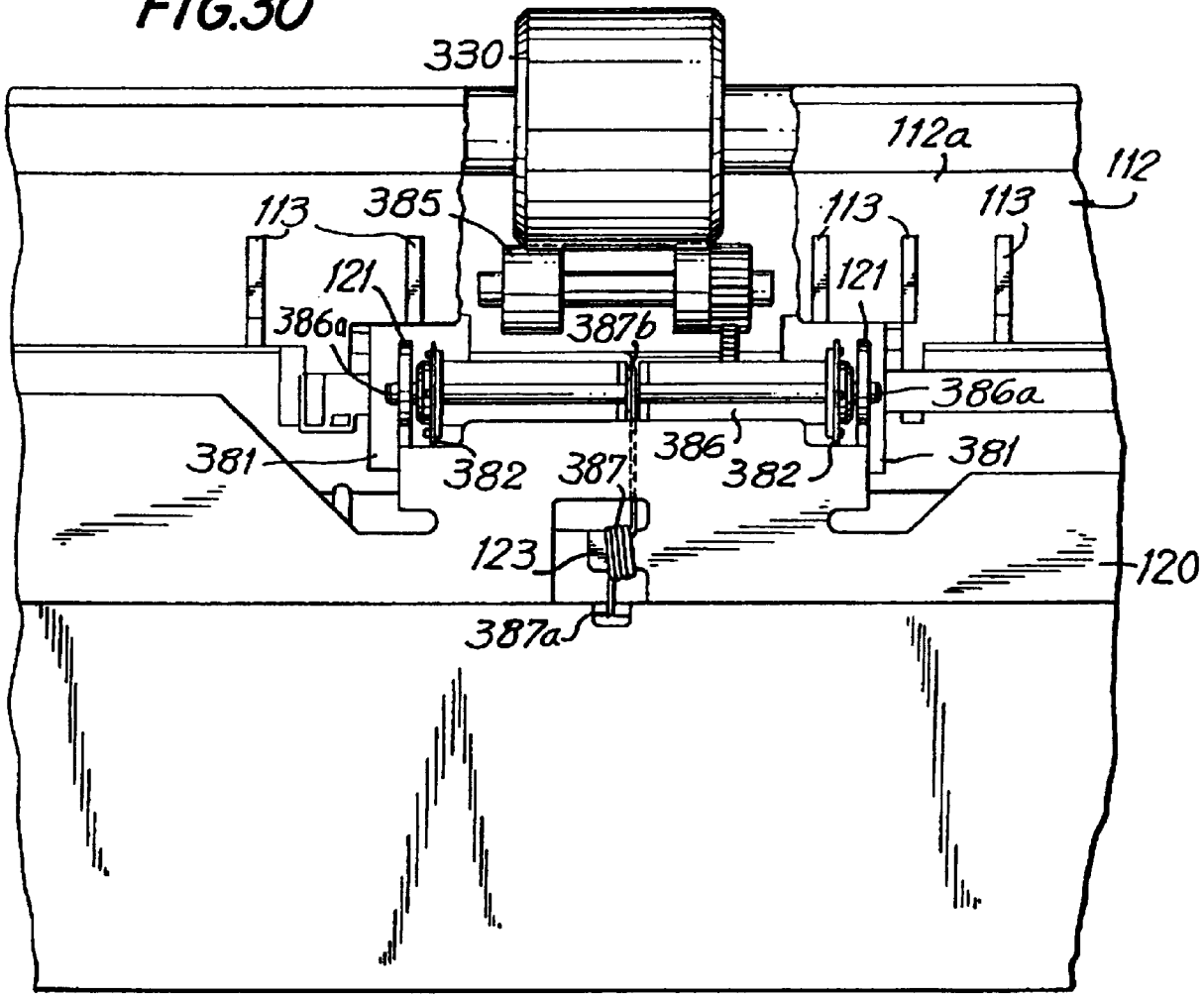
FIG. 30 is a fragmentary enlarged front plan view of the print area.

Ink shielding portion 112 is formed integrally with intermediate frame 110, and is arranged over the entire print area PA which extends in a direction perpendicular to the plane of the drawing of FIG. 3A. FIGS. 28 and 30 depict rib-shaped paper guides 113 that are formed on the upper surface of ink shielding portion 112 downstream of a portion 112a opposing the print area.

Figure 27:
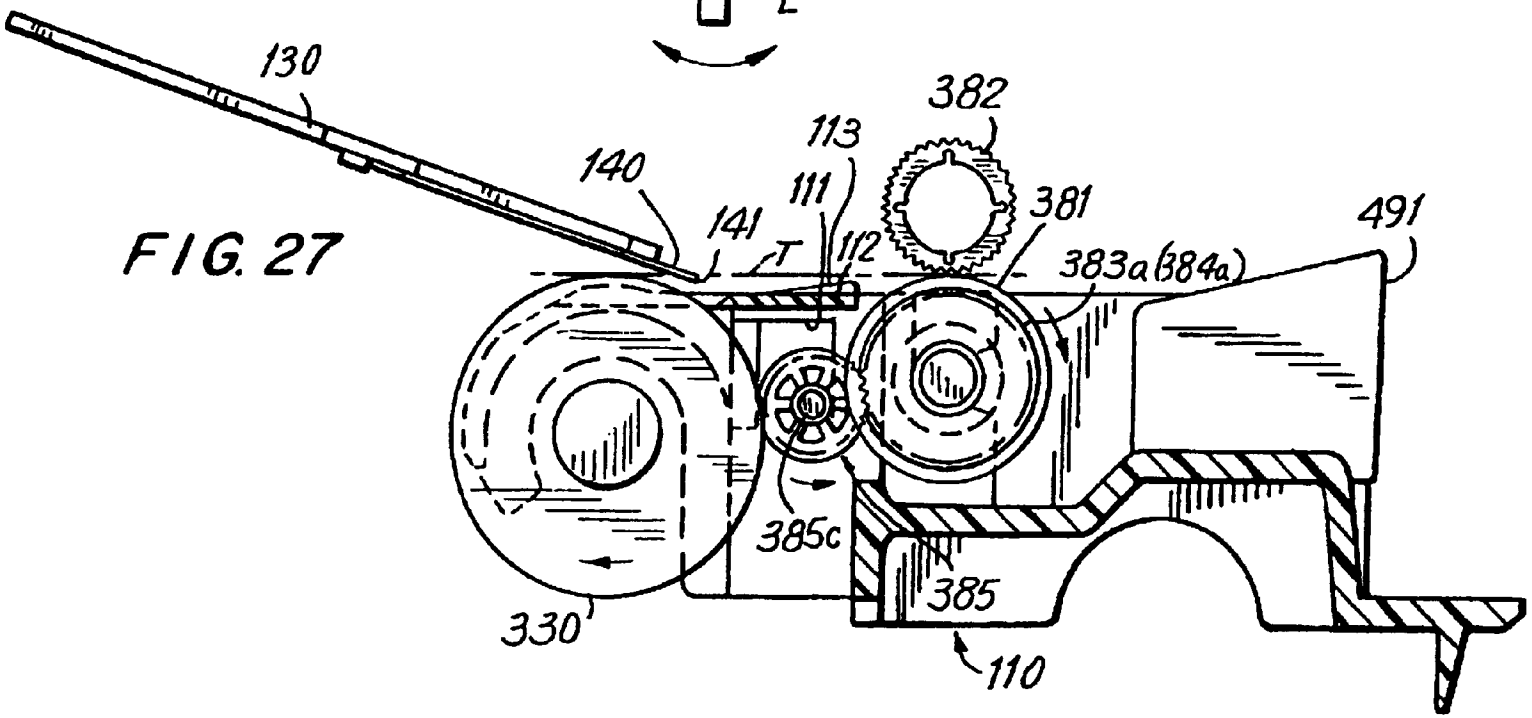
FIGS. 27 and 28 are partial enlarged sectional side elevational views of the print area of the printer showing the operation thereof.
Figure 31:
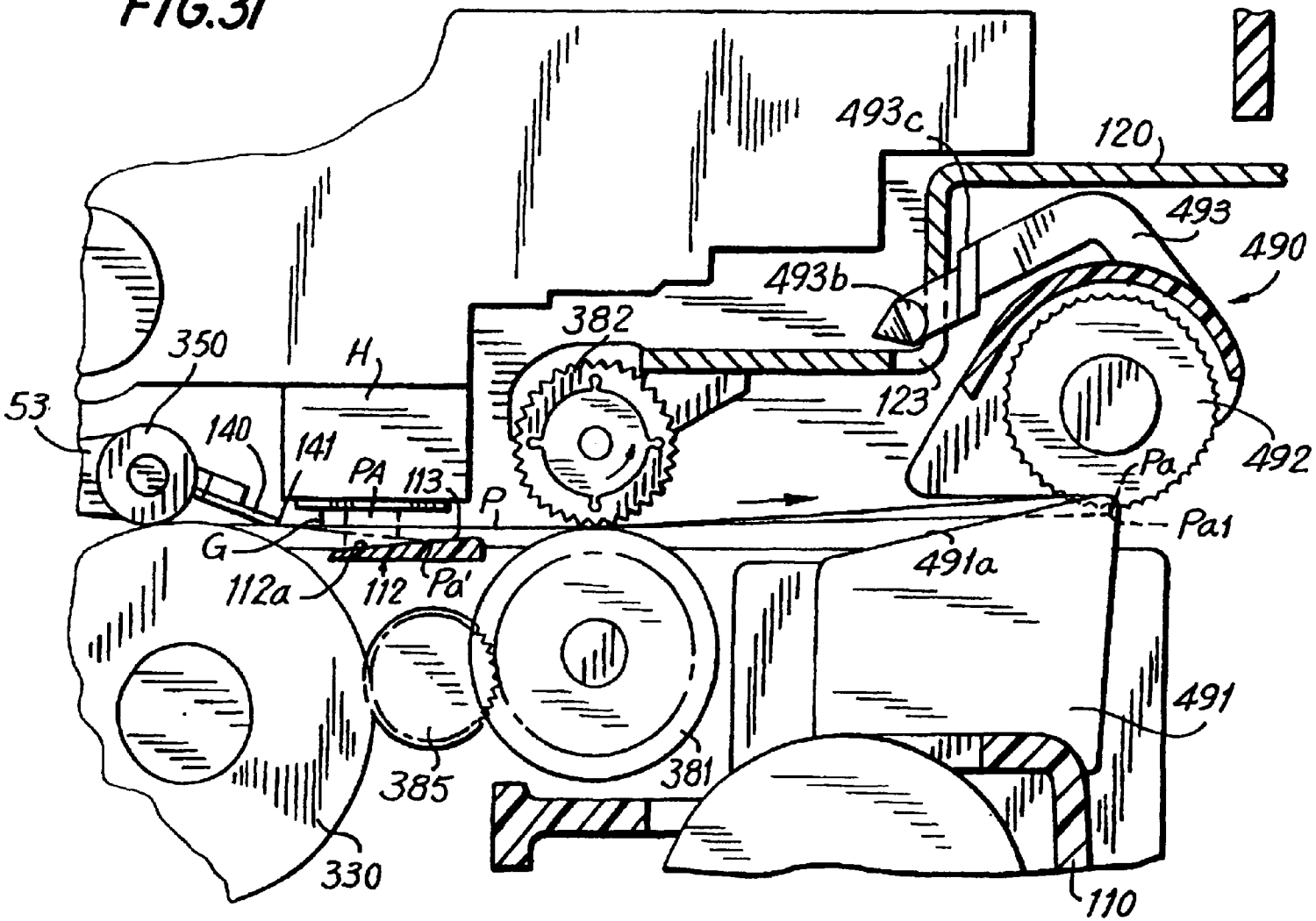
FIG. 31 is a partial enlarged sectional side elevational view of the paper discharge section of the printer.

As shown in FIGS. 27 and 31, pressing member 140 is formed in the shape of a thin plate, and is attached to the underside of a lower end of rear frame 130. The distal end of pressing member 140 extends linearly in a direction perpendicular to the plane of each of these drawings, and includes a pressing portion 141 for pressing paper P over the entire width thereof. Pressing portion 141 is disposed at a position between feed rollers 330 and transport rollers 381. Pressing portion 141 does not contact either of the two rollers 330 or 381. As shown in FIG. 27, the distal end of pressing portion 141 is located at a slightly lower position from a tangent T to both feed roller 330 and transport roller 381, and is arranged to press paper P downward.

For this reason, the paper is guided slightly downward when the paper is fed by feed rollers 330 and the leading end of the paper enters print area PA. However, the position of pressing portion 141 is set such that a leading end Pa' (dotted-dash line in FIG. 31) of the paper passes above portion 112a, opposing the print area, of ink shielding portion 112 without coming into contact with portion 112a, and is brought into contact with paper guides 113.

Next, a description will be given of the printing operation in the above-described print area.

The paper fed to automatic feeding path 202 by the operation of automatic paper feeder 210 is detected by paper detection switch 923. The detected paper is subjected to deskewing, and is then wound around feed rollers 330, and its leading edge enters print area PA.

After the paper is detected by detection switch 923, the paper may fail to reach print area PA due to a failure in paper feed or the like. However, even if the ink is ejected blindly by ink jet head H the ink will strike ink shielding portion 112, so that the ink does not adhere to feed rollers 330 or damage any other components.

In addition, as shown in FIG. 3A, since the paper set in automatic paper feeder 210 is located below ink shield 112, this paper does not become stained.

Furthermore, as noted above, leading edge Pa' of the paper that subsequently enters print area PA is guided so that it passes above portion 112a, opposing the print area, of ink shielding portion 112 without contacting portion 112a, and abuts against paper guides 113, as shown in FIG. 31. Therefore, the paper is not stained by any ink that may be adhering to ink shielding portion 112.

The leading edge of the paper which has entered print area PA is reliably guided to paper discharge rollers 381 by paper guides 113, and printing is performed in a state in which the paper floats in the air by being pulled by transport rollers 381 and star wheels 382, as shown in FIG. 31.

Paper P is pressed over its entire width by pressing portion 141 so as to position the printing surface. Pressing portion 141 is not affected by the processing accuracy of the surface of feed rollers 330, and maintains a gap G between the printing surface of paper P and ink jet head H constant. In this embodiment, and as illustrated in FIG. 17, only three feed rollers 330 are provided at set intervals. Even in such a case, gap G remains constant between the printing surface of paper P and ink jet head H.

Figure 33:
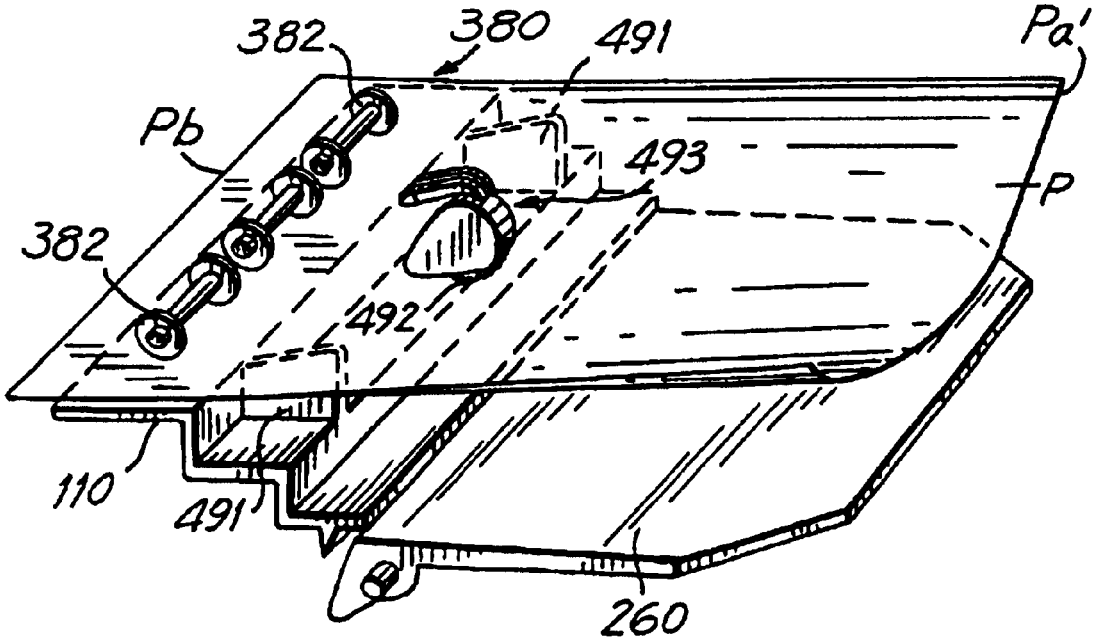
FIGS. 33–36 are perspective views of the discharge section illustrating the operation of the printer.

FIG. 33 shows the paper printed in print area PA being discharged onto discharged-paper tray 260 via transport section 380 and discharge section 90.

Figure 1:
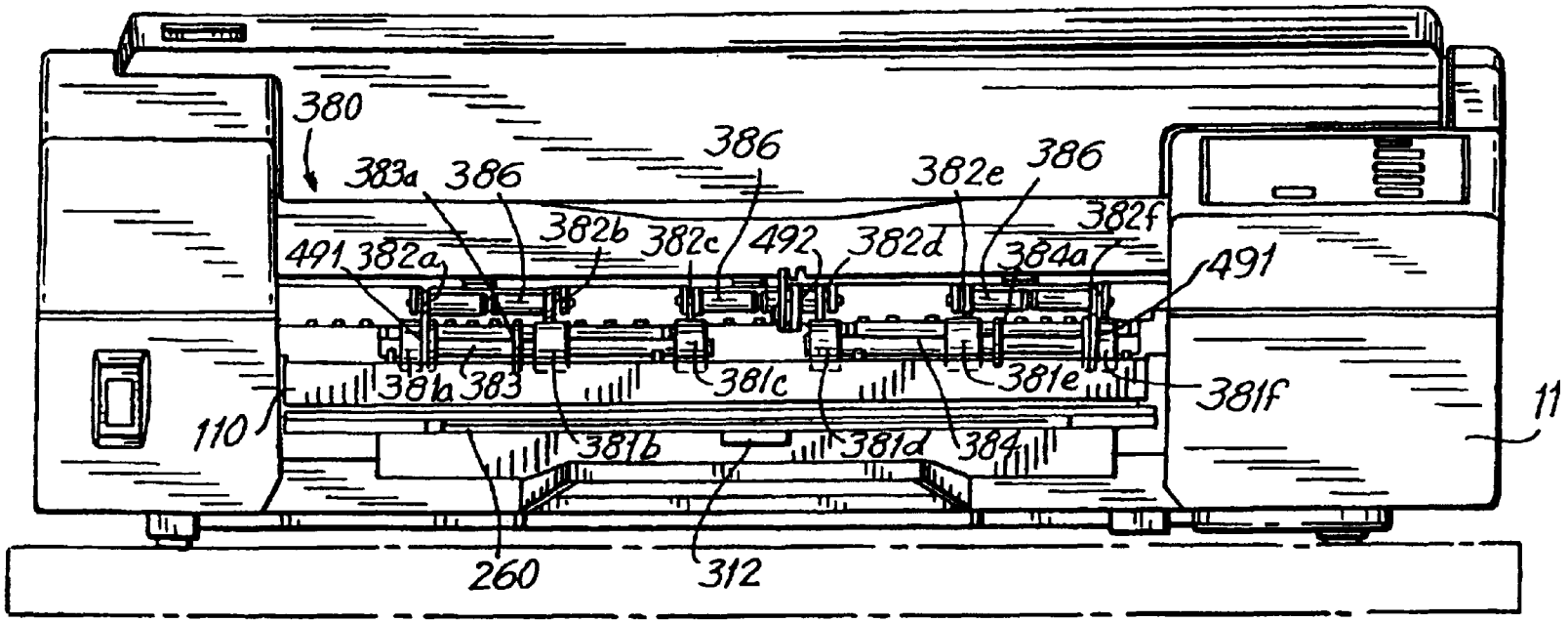
FIG. 1 is a front elevational view illustrating a first embodiment of a printer in accordance with the present invention.
Figure 2:
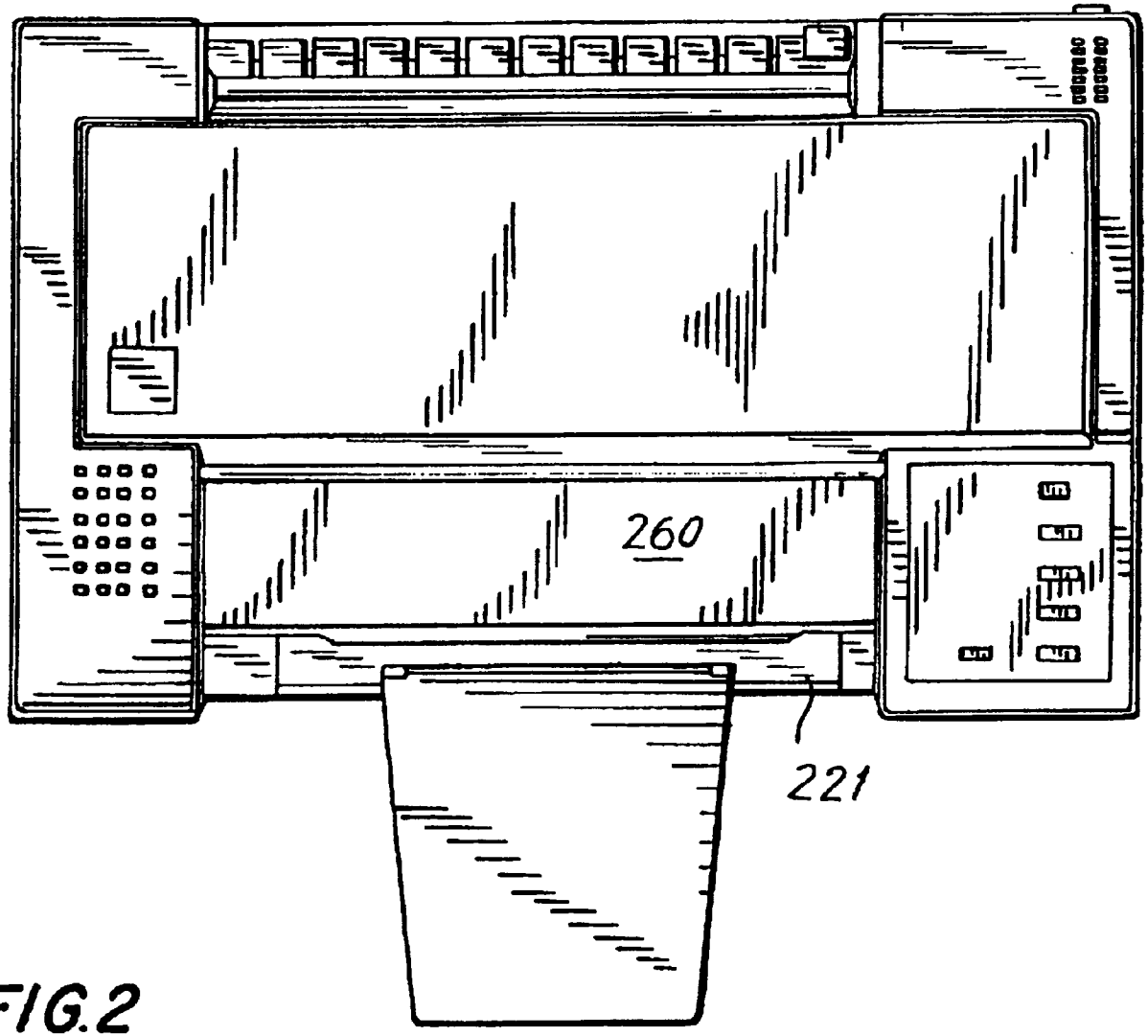
FIG. 2 is a top plan view of the printer of FIG. 1 in accordance with a first embodiment of the invention.

FIG. 1 depicts transport section 380, which includes six paper discharge rollers 381 (specifically, 381a to 381f) formed of a resilient material, such as rubber, and six star wheels 382 (specifically, 382a to 382f) disposed in face-to-face relation with paper discharge rollers 381a to 381f, respectively.

Paper discharge rollers 381 are fixed in units of three rollers to two rotating shafts 383 and 384, respectively, which are supported by intermediate frame 110. As shown in FIG. 17, paper discharge rollers 381 are rotated as gears 383a, 384a fixed to rotating shafts 383, 384 are rotatably driven by left and right feed rollers 330 via two transmitting gears, generally indicated at 385.

Transmitting gear 385 is constructed and arranged so that a gear portion 385a (meshing with either gear 383a or 384a fixed to rotating shaft 383 or 384, respectively), a roller portion 385b held in rolling contact with feed roller 330 and a common shaft 385c are integrally formed. Both ends of common shaft 385c are movably supported in rectangular holes 111 formed in intermediate frame 110, as shown in FIGS. 27 and 28. In this configuration, transmitting gear 385 acts as a one-way clutch. That is, as shown in FIG. 27, when each feed roller 330 rotates in the paper feeding direction, transmitting gear 385 moves downward (in the engaging direction) along rectangular holes 111, and transmits the power of each feed roller 330 to three paper discharge rollers 381. FIG. 28 illustrates that if feed roller 330 rotates in a direction opposite to the paper feeding direction, transmitting gear 385 moves upward (in the escaping direction) along rectangular holes 111, and does not transmit the power of feed rollers 330 to paper discharge rollers 381. Accordingly, paper discharge rollers 381 rotate only when feed rollers 330 rotate in the paper feeding direction, and they do not rotate when feed rollers 330 rotates in the reverse direction.

Figure 29:
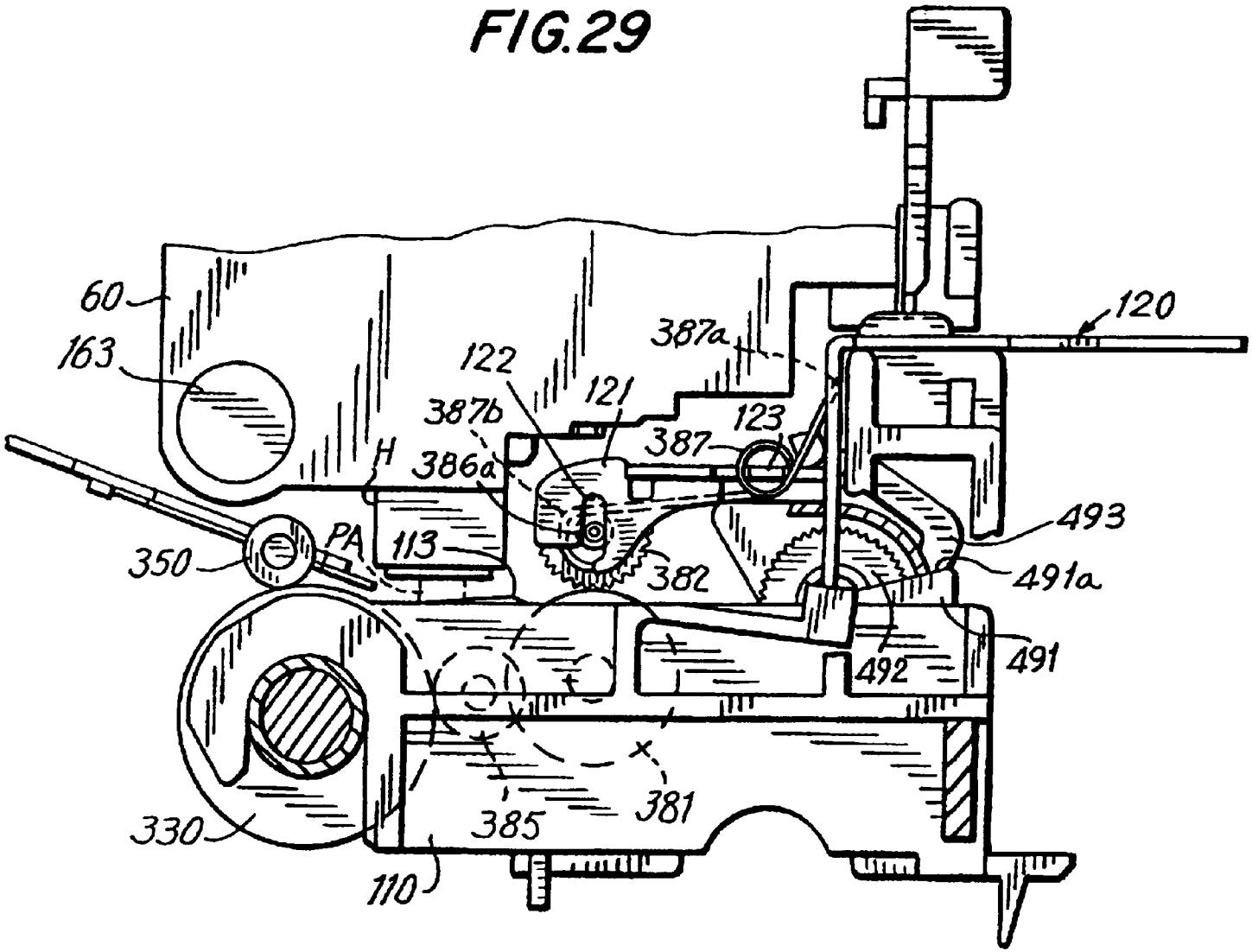
FIG. 29 is a fragmentary enlarged sectional side elevational view of the print area.

In FIGS. 1 and 17, star wheels 382 are fixed in units of two star wheels at opposite ends of three shafts 386, respectively. Opposite ends 386a of the shaft 386 are supported on upper frame 120 (FIGS. 29 and 30). Referring further to FIGS. 29 and 30, a support portion 121 is formed by bending a portion of upper frame 120 downward. Opposite ends 386a of shaft 386 are supported in elongated holes 122 respectively formed in support portions 121, and can move in a vertical direction. A spring 387 constituting an urging member is fitted over a tongue 123 of upper frame 120. One end 387a of spring 387 is engaged with frame 120, while the other end 387b thereof is engaged with a central portion 386b (see FIG. 17) of the aforementioned shaft 386, thereby urging the set of two star wheels 382 toward paper discharge rollers 381. Thus, since the central portion of shaft 386 is urged toward paper discharge rollers 381 by spring 387, even if there are variations in the urging forces of springs 387, these variations in force applied are distributed to the respective two star wheels 382 via shafts 386, so that the variations of the pressing forces of each star wheel 382 against each paper discharge roller 381 is reduced in half. In this embodiment, the force applied by shaft 386 by means of spring 387 is set to 40 g. Therefore, the force of each star wheel against each paper discharge roller 381 is 20 g.

Star wheels 382 rotate by being driven by paper discharge rollers 381, and when transporting the paper, star wheels 382 rotate by nipping the paper between them and paper discharge rollers 381.

The diameter or the number of teeth of each feed rollers 330, transmitting gear 385, and paper discharge rollers 381 is set so that the peripheral speed of paper discharge roller 381 is approximately 12% faster than the peripheral speed of feed roller 330. Therefore, as depicted in FIG. 31, paper P is printed upon while in print area PA while the paper floats in the air by being pulled by transport rollers 381 and star wheels 382.

In FIGS. 1 and 3, discharge section 490 includes supporting portions 491, 491. Supporting portions 491, 491 support, from below, both sides of the paper which has been printed upon in print area PA and is now being discharged. Discharge section 490 also includes pushing-down portion 492 for pushing down a central portion of the paper.

Supporting portions 491 and 491 are defined by fixed ribs formed integrally with intermediate frame 110. As shown in FIG. 1, supporting portions 491, 491 are disposed at positions aligned with star wheels 382a and 382f, respectively, located on opposite sides of the aforementioned star wheels 382, as viewed in the direction of travel of the paper. FIG. 31 illustrates that an upper surface 491a of each supporting portions 491, 491 is inclined in the discharging direction of the paper.

Figure 32:
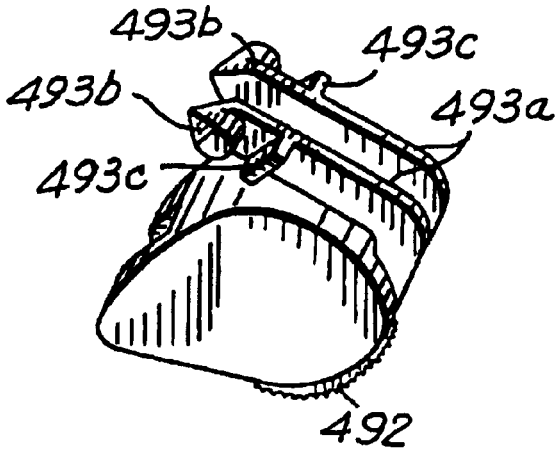
FIG. 32 is a perspective view of a pushing-down portion.

Pushing-down portion 492 is defined by a knurled roller, and is rotatably supported on an arm 493 rotatably attached on upper frame 120. As shown in FIG. 32, arm 493 is in the shape of bifurcated portions 493a, 493a, and first stoppers 493b, 493b are formed on distal ends thereof in such a manner as to project therefrom. In addition, second stoppers 493c, 493c are formed in slightly spaced-apart relation with the respective first stoppers. A rectangular hole 123 (see FIG. 31) is provided at a bent portion of upper frame 120. First stoppers 493b, 493b are inserted into this rectangular hole 123 by reducing the distance between bifurcated portions 493a, 493a and subsequently increasing the distance between bifurcated portions 493a, 493a, thereby securing arm 493 in upper frame 120. With discharge section 490 secured to upper frame 120, upper frame 120 is sandwiched by first stoppers 493b and second stoppers 493c with gaps that do not hinder the rotation of the arm, nor does arm 493 come off rectangular hole 123.

A description will now be given of the paper discharging operation in the above-described discharge section.

In FIG. 31, paper P printed in print area PA is transported by being nipped and pulled by paper discharge rollers 381 and star wheels 382. Since the central portion of each shaft 386 of the star wheels is urged toward paper discharge rollers 381 by spring 387, even if there are variations in the urging forces of springs 387, these variations are distributed to the respective two star wheels 382 via shafts 386. Hence, the variations of the force applied by each star wheel 382 against each paper discharge rollers 381 are reduced by half.

Accordingly, the pressing forces of star wheels 382 against paper discharge rollers 381 (and ultimately the force upon paper P) are stabilized and proportionately reduced, resulting in paper P being transported reliably without any smearing thereon. Moreover, before the leading edge of the paper enters discharging section 490, pushing-down portion 492 is located below upper surfaces 491a of supporting portions 491, 491.

When leading edge Pa' of the paper enters discharging section 490, both side portions of leading edge Pa are guided gradually upward by upper surfaces 491a of both-side supporting portions 491. At the same time, a central portion Pa1 of leading edge Pa gradually pushes up pushing-down portion 492 while rotating arm 493 counterclockwise, but central portion Pal of leading edge Pa then gradually falls below pushing-down portion 492 and is pushed down in comparison with the both side portions due to the weight of pushing-down portion 492 and arm 493 upon central portion Pa1.

Thus, paper P is discharged, starting with its leading edge, while being forcibly urged into a concave shape in which the printed surface is concaved as seen in the discharging direction. Since pushing-down portion 492 is supported by rotatable arm 493, paper P enters below pushing-down portion 492 smoothly because of the rotating motion of arm 493 when the leading edge of paper P is brought into contact with pushing-down portion 492.

FIG. 33 shows paper P discharged up to the midway position.

Figure 34:
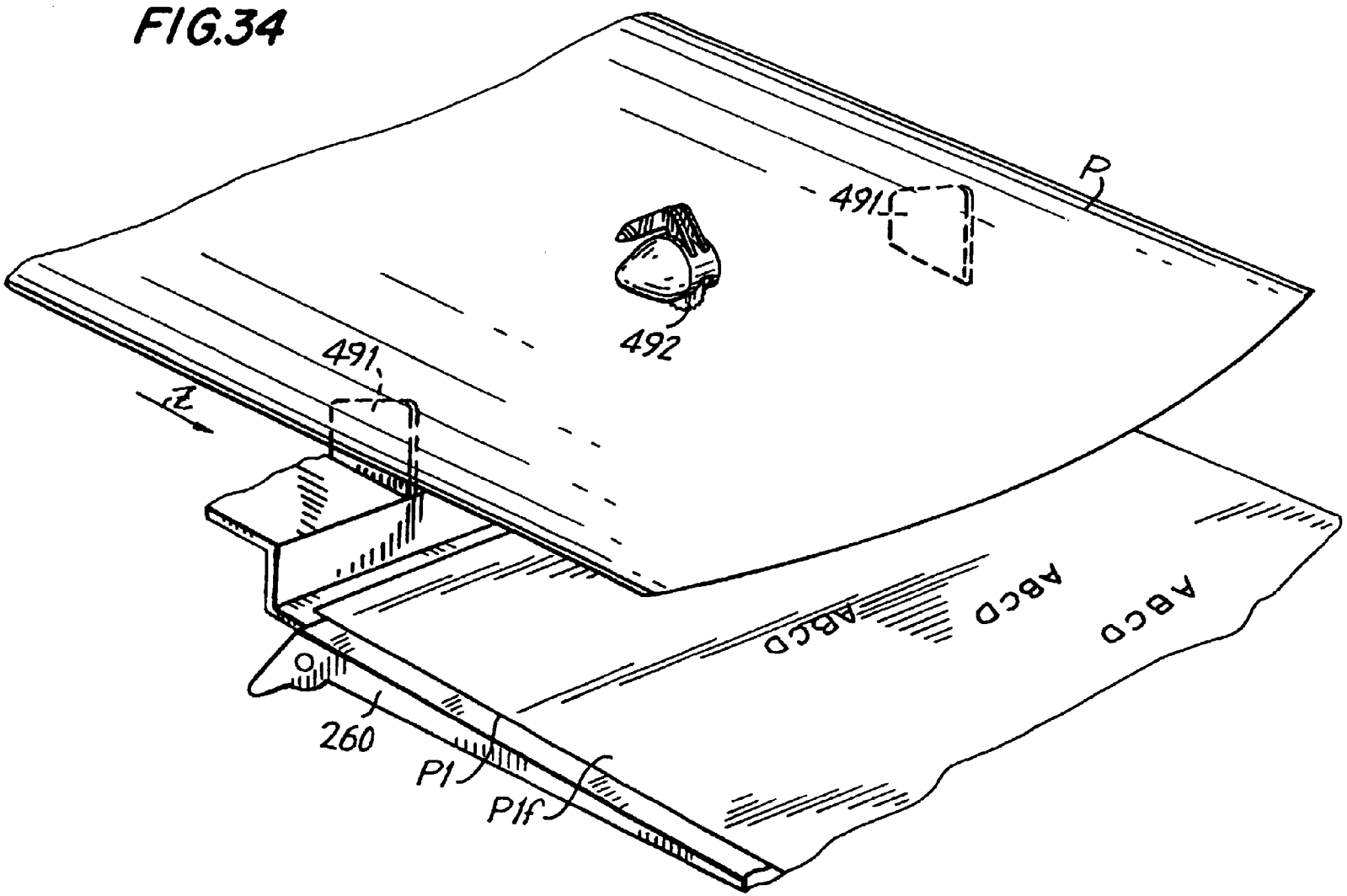

FIG. 34 depicts paper P forcibly urged into a concave shape and being discharged in the discharging direction. Paper P, in this concave configuration, can be discharged further in a direction indicated by arrow Z before the weight of the paper itself forces the leading edge to fall, thereby contacting printed surface P1f of paper P1. Paper P appears to be stiff, and appears to discharge as if it was floating. Because the time until discharged paper P slidably contacts a printed surface P1f of stacked paper P1 is delayed, the time for the ink on the printed paper P1 to dry is increased and the risk of any ink smearing on surface P1f decreases.

FIG. 33 shows transport section 380, and that paper P is transported in a flat state as seen in the discharging direction prior to contacting discharge section 490. Therefore, when paper P is in print area PA and shortly thereafter, paper P is flat. Accordingly, satisfactory print quality is ensured.

Figure 35:
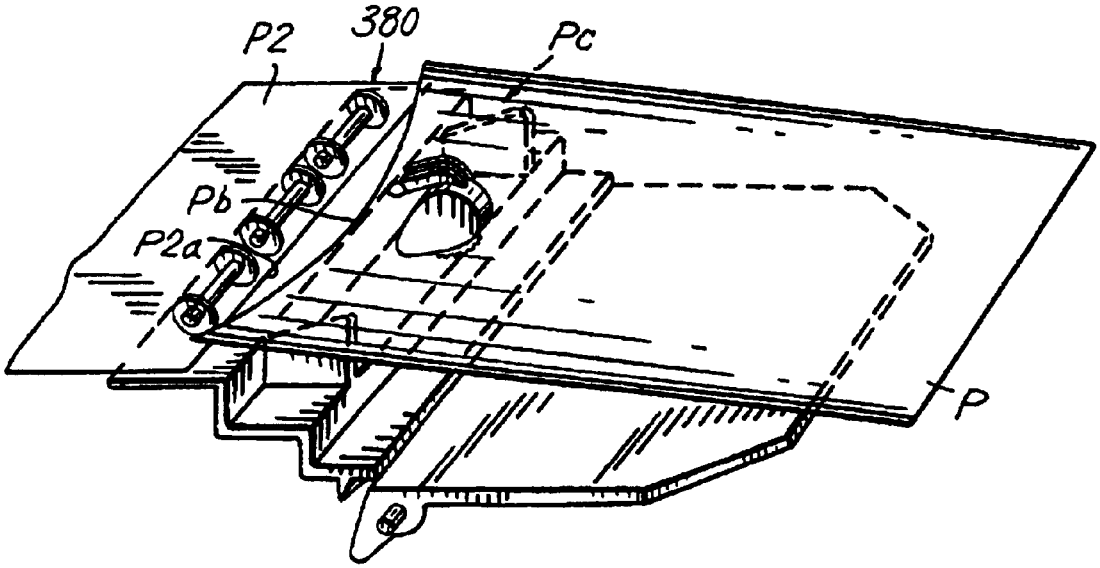
Figure 36:
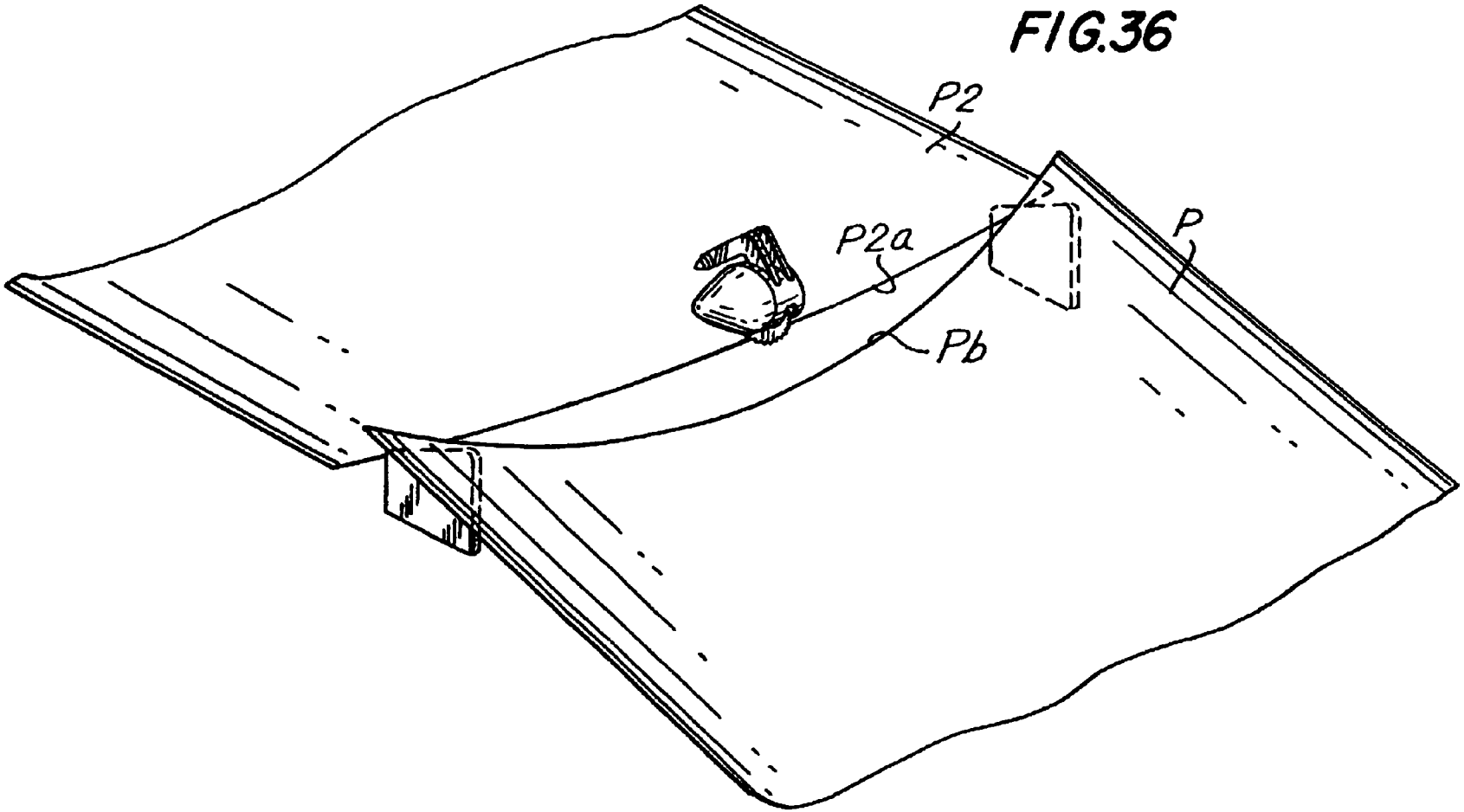

FIG. 35 shows paper P, after being further transported and having its trailing edge Pb pass transport section 380, loses its transporting force. A rear end portion PC of paper P is maintained in its concave state by discharge section 490. When a subsequent sheet of paper P2 enters transport section 380, its leading edge P2a passes transport section 380. When leading edge P2a contacts trailing edge Pb of a preceding paper P, discharge section 490 does not press against preceding paper P as illustrated in FIG. 36. The force applied by discharging section 490 against preceding paper P ceases by the time it contacts subsequent paper P2. Preceding paper P is stacked on the earlier printed paper P1 (FIG. 34), and therefore the time until paper P2 contacts printed paper P1 is further delayed.

FIG. 36 shows the point in time when the holding of paper P by discharge section 490 ceases. After the leading edge P2a of subsequent paper P2 contacts trailing edge Pb of preceding paper P, the support of preceding paper P ceases and the transport of subsequent paper P2 is temporarily stopped. This stopping operation can be performed by determining the number of pulses of feed motor M1 is in advance, and stopping the driving of motor M1 when the number of pulses reaches a predetermined number.

If preceding paper P is pushed out by bringing the leading edge P2a of subsequent paper P2 into contact with the trailing edge Pb of preceding paper P, the stacking operation of preceding paper P on earlier printed paper P1 will be unreliable (see FIG. 34). However, by temporarily stopping the transport of subsequent paper P2, any contact between leading edge P2a of the subsequent sheets of paper and trailing edge Pb of the preceding paper is eliminated by making use of the inertia of preceding paper P1. In this way, the operation of stacking preceding paper P on the earlier printed paper P1 becomes very reliable.

Ink jet printers constructed and arranged in accordance with the present invention have any fluctuation in the pressing forces of each star wheel 382 against each paper discharge roller 381 reduced in half. The central portion of each shaft 386 has two star wheels 382 at opposite ends thereof. When the star wheels 386 are urged toward paper discharge rollers 381 by spring 387, even if there are variations in the urging forces of springs 387, these variations are distributed to the respective two star wheels 382 via shafts 386.

Accordingly, the pressing forces of the star wheels 382 upon paper discharge rollers 381, and, therefore, upon paper P are stabilized and proportionately reduced, resulting in the discharge of paper without damaging the printing surface.

In addition, the paper is discharged in a floating state because the printed paper is discharged while forced into a concave shape in which the printed surface is concave as seen in the discharging direction. And, if the paper discharged is very stiff, it also will not slidably contact with the printed paper since the stiff paper will remain in the air longer making it possible to prevent the printed surface of the printed paper from becoming smeared.

Postcards and envelopes, for example, have very small widths and may contact only one pushing-up portion 491. Therefore, the concave shape may not be formed. However, because of their inherent stiffness, they will not bend when held in a cantilever fashion and will remain in the air a sufficient time even though only one pushing-up portion 491 may be acting upon the postcards or envelopes.

The above construction and arrangement yield many advantages.

First, the discharged-paper tray for stacking the printed sheets of paper does not need to be formed in a concave shape, it is possible to reduce the space occupied by the discharged-paper tray.

Second, since the cancellation of the holding of the preceding paper, i.e., the final discharging operation, is effected by the ensuing paper, it is possible to make unnecessary the transporting/driving means for the preceding paper in the holding section for holding the paper in a concave shape.

Third, since the supporting portions are formed by fixed ribs, and the pushing-down portion is a knurled roller, the paper can be forcibly urged into a concave shape with a simple arrangement. Moreover, since the knurled roller is brought into contact with the printed surface, the printed surface is prevented from becoming stained.

Fourth, since the upper surfaces of the fixed ribs are inclined upward in correspondence with the paper discharging direction, the placing of the paper into a concave shape can be made smooth. Since the knurled roller is supported by the rotatable arm, the changing motion of the paper into a concave shape is effected more smoothly in conjunction with the aforementioned rotating motion.

Fifth, since the weight of the knurled roller forces the paper downward, an urging means such as a spring becomes unnecessary, and the paper can be forcibly urged into a concave shape with at least one less component, resulting in a much simpler construction.

Next, a description will be given of the construction and arrangement of ink cartridge 90 which is mounted on carriage 60.

Figure 37:
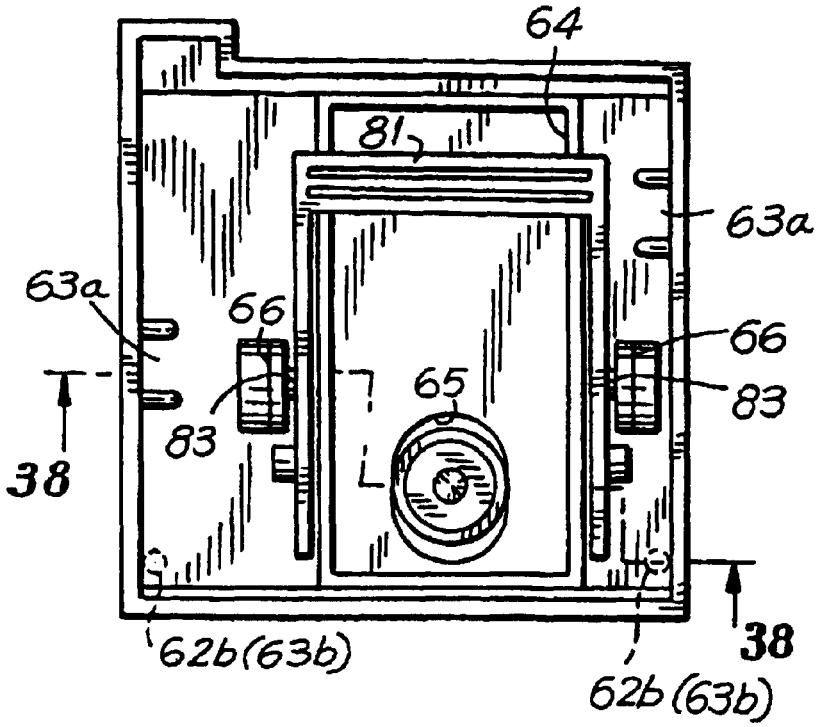
FIG. 37 is a plan view illustrating the carriage in a state in which the ink cartridge is not mounted.

FIG. 23 is a plan view illustrating carriage 60. Carriage 60 includes a carriage body 62 and a carriage cover 63, with ink cartridge 90 mounted thereon. FIG. 37 is a plan view, with certain parts omitted, of carriage 60 with ink cartridge 90 not mounted thereon.

A head substrate 71, to which head H is fixed in advance, is incorporated in carriage body 62. A connecting portion 75 for connection with ink cartridge 90 is formed integrally with head substrate 71. A connecting portion, generally indicated at 75, is formed in a hollow cylindrical shape, and a needle 75a for breaking the seal of the ink cartridge is formed in a central portion thereof. An ink channel 75c, connected to an ink channel 70b in a head H, are both formed in a central portion of needle 75a.

Figure 38:
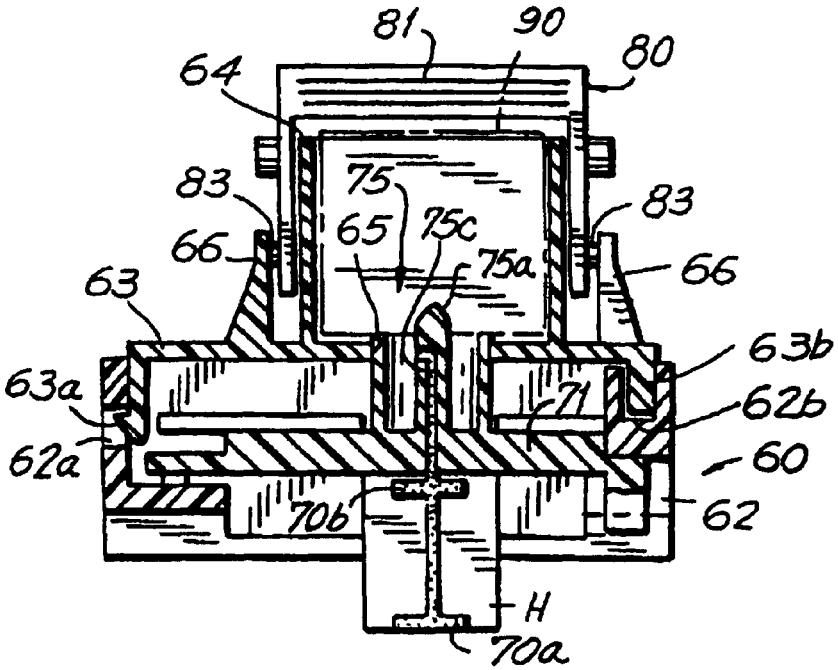
FIG. 38 is a cross-sectional view taken along line 38—38 in FIG. 37.

Carriage cover 63 includes pins 63b, 63b that fit in round holes 62b, 62b placed in the corners on a lower side of carriage body 62. A pair of claws 63a, 63a engage with square holes 62a, 62a (FIG. 38) formed in side walls of carriage body 62. Carriage cover 63 is secured to carriage body 62 by placing pins 63b in round holes 62b, and by the engagement of claws 63a with square holes 62a.

A mounting portion 64 is formed in a box shape and integral with carriage cover 63. Ink cartridge 90 is mounted on mounting portion 64. Connecting portion 75 of the head substrate is fitted in an elongated hole 65. Slits 67, having relatively large widths, are formed in left and right side walls of mounting portion 64 and serve as paths for pins 94 of the ink cartridge. (See FIGS. 23 and 39). Supporting portions 66 are formed on the upper surface of the carriage cover 63.

Figure 39:
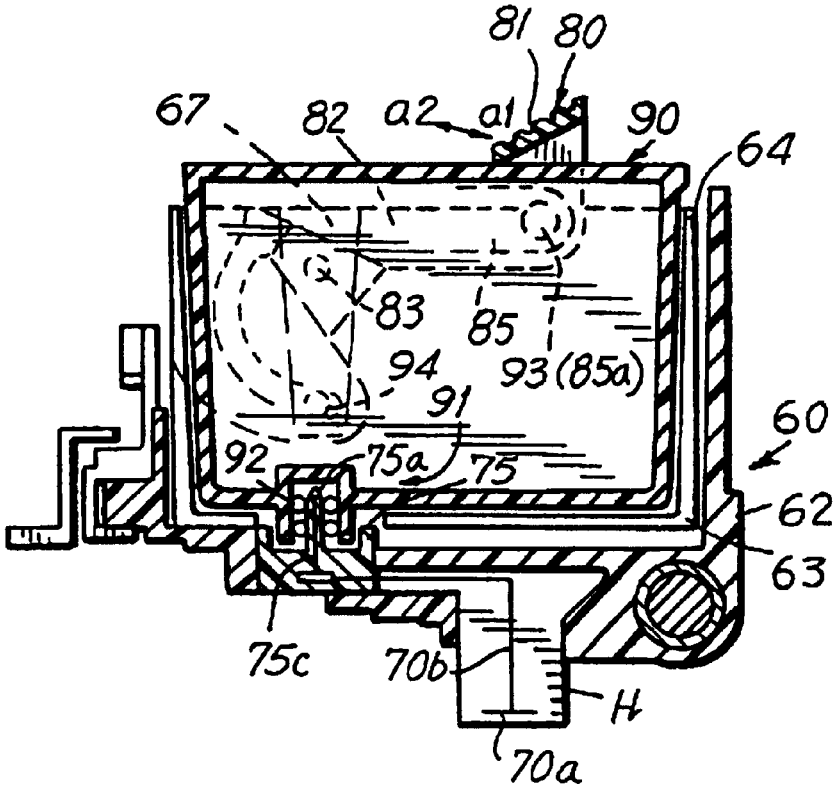
FIG. 39 is a cross-sectional view illustrating the carriage in a state in which the ink cartridge is mounted.

As shown in FIG. 39, ink cartridge 90 has, in its bottom, a connecting portion, generally indicated at 91, for engagement with head substrate 71. Connecting portion 91 engages connecting portion 75 of head substrate 71 when ink cartridge 90 is mounted in mounting portion 64. Essentially simultaneously, needle 75a breaks a seal 92 of connecting portion 91. When seal 92 is broken, ink is supplied to a nozzle 70a of the head through ink channel 70b and ink channel 75c.

As shown in FIGS. 23 and 39, semispherical convex portions 93 and pins 94 are formed integrally with both side surfaces of ink cartridge 90.

Figure 40:
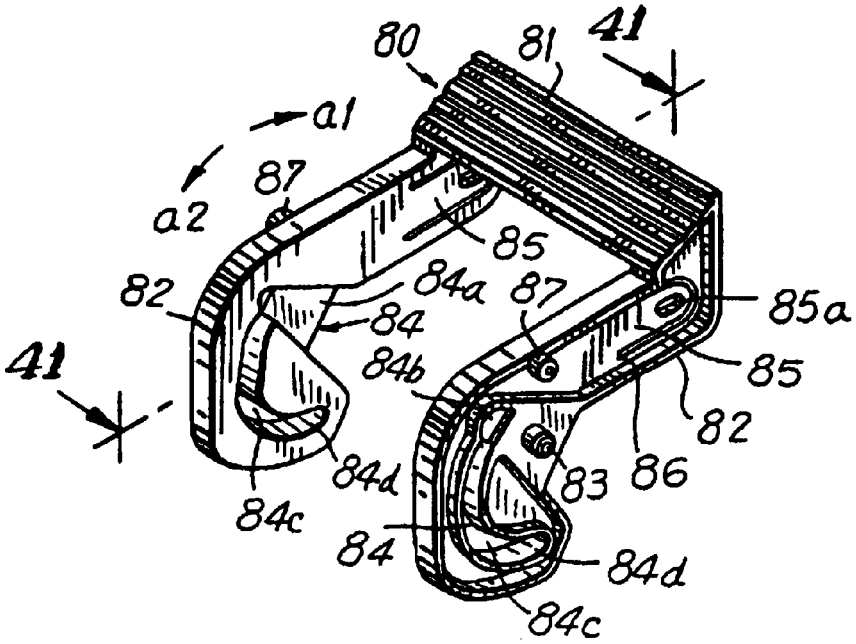
FIG. 40 is a perspective view of a lever.
Figure 41:
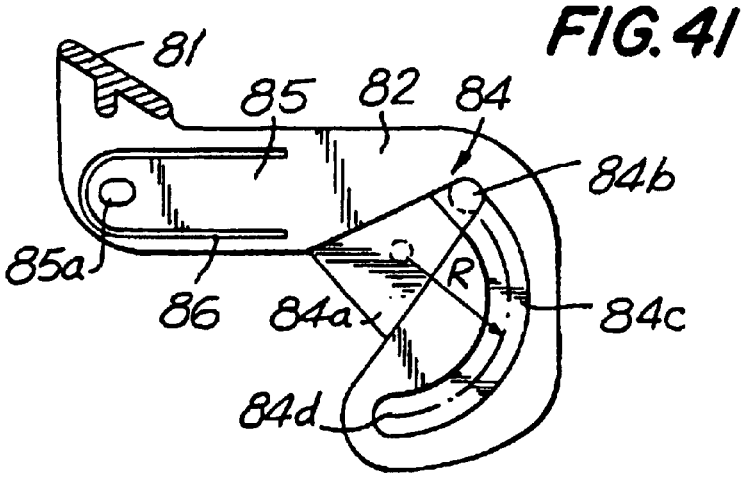
FIG. 41 is a cross-sectional view taken along line C—C in FIG. 40.

FIGS. 39–41 depict a lever, generally indicated at 80, which is used to mount or demount ink cartridge 90 on carriage 60. Lever 80 includes a tab 81 and a pair of arms 82, 82. Arms 82, 82 are formed integrally with tab 81. Shafts 83, 83 are formed integrally on the outer sides of arms 82. Shafts 83, 83 are rotatably supported by supporting portions 66 so lever 80 is rotatably supported in the directions of arrows a1 and a2 in FIG. 39.

A cam groove, generally indicated at 84, is formed on the inner side of each arm 82. Cam groove 84 includes an introducing groove 84a that introduces pin 94 of the cartridge into cam groove 84. Cam groove 84 has three sections in addition to 84a. These sections are starting portion 84b, curved groove 84c and terminating portions 84d. Starting portion 84b communicates with introducing groove 84a. Terminating portion 84d communicates with the starting portion 84b via a curved groove 84c. Using shaft 83 as a center, radius R (FIG. 41) gradually increases as radius R moves from starting portion 84b to curved groove 84c to terminating portion 84d. FIG. 40 clearly shows portions 84b, 84d, and curved groove 84c as a continuous slot that extends through the surface of each arm 82. Introducing groove 84a does not extend through arm 82.

A tongue 85 is a resilient member. Tongue 85 is formed integrally in arm 82 by means of a U-shaped slit 86. An elongated hole 85a is formed at a distal end of tongue 85.

As shown in FIGS. 23 and 39, with ink cartridge 90 mounted, tongues 85 and 85 can flex, and semispherical convex portions 93 engages in elongated holes 85a, respectively, allowing tongues 85 to resiliently hold the upper portion of ink cartridge 90 in the direction of movement of the carriage as indicated by arrows A and B in FIG. 23.

A stopper pin 87 will contact supporting portion 66 of carriage cover 63 to restrict any excess rotation of lever 80 when lever 80 rotates in the direction of arrow a2 (FIG. 40).

Figure 42:
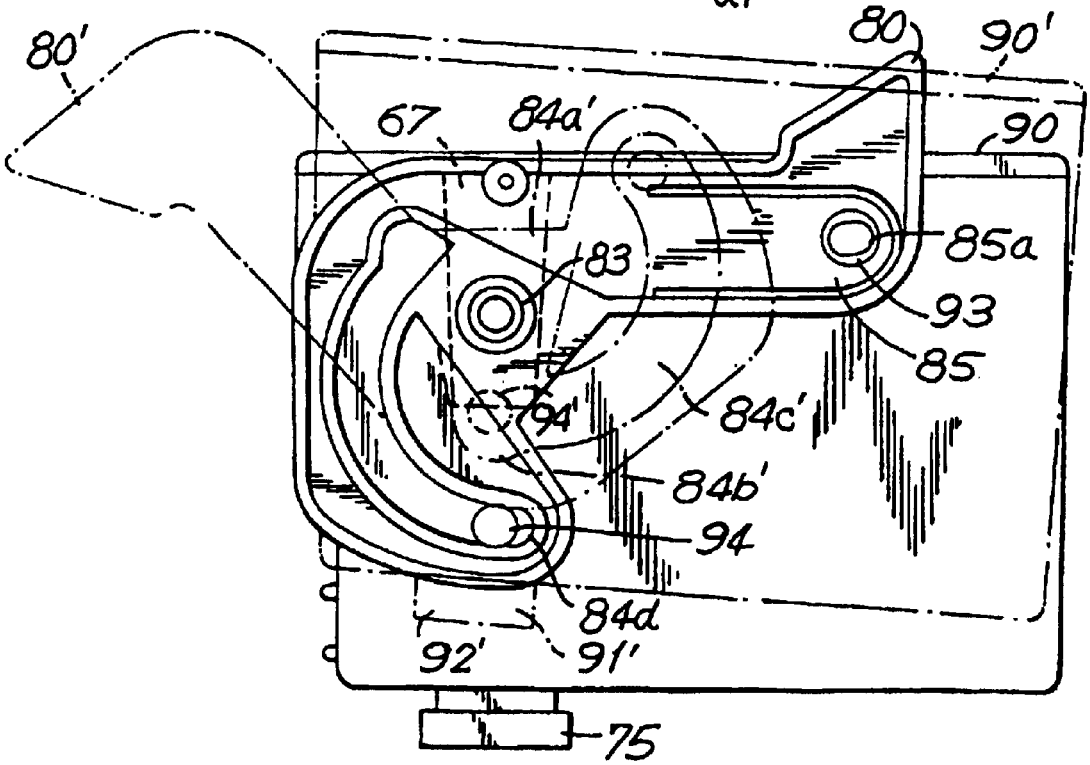
FIG. 42 is a diagram illustrating the operation of the lever.

FIG. 42 illustrates the mounting and demounting operation of ink cartridge 90 using lever 80.

First, lever 80 is rotated in the direction of arrow a2, and the empty ink cartridge is removed. A new ink cartridge 90 is then placed lightly into mounting portion 64 (see FIGS. 23 and 39) from above (this state is shown by the phantom line, and corresponding reference numerals indicated by adding "'" thereto). Each pin 94' of the cartridge passes through the slit 67 in mounting portion 64, and is then guided by an introducing groove 84a' of the cam groove in a lever 80', and reaches a starting portion 84b' of the cam groove.

Therefore, if lever 80' rotates in the direction of arrow a1, each pin 94' enters curved groove 84c. Since radius R increases as described heretofore, pin 94' is forced downward in slit 67 as lever 80' rotates in the clockwise direction. Therefore, a cartridge 90' is gradually forced downward. As cartridge 90' moves downward, a connection portion 91' of the cartridge connects to connecting portion 75 of the head substrate, and a seal 92' is broken.

When lever 80' fully rotates in the direction of arrow a1 and reaches the position indicated by the solid lines (FIG. 42), each pin 94 reaches terminating portion 84d of the cam groove, and the cartridge is completely mounted. Moreover, the user is easily able to confirm that a complete fitting state has been obtained since each convex portion 93 of the cartridge is fitted with a click in elongated hole 85a in each tongue 85 of the lever.

When ink cartridge 90 is empty, ink cartridge 90 can be easily removed simply by rotating lever 80 in the direction of arrow a2 and lifting up the cartridge.

Figure 43:
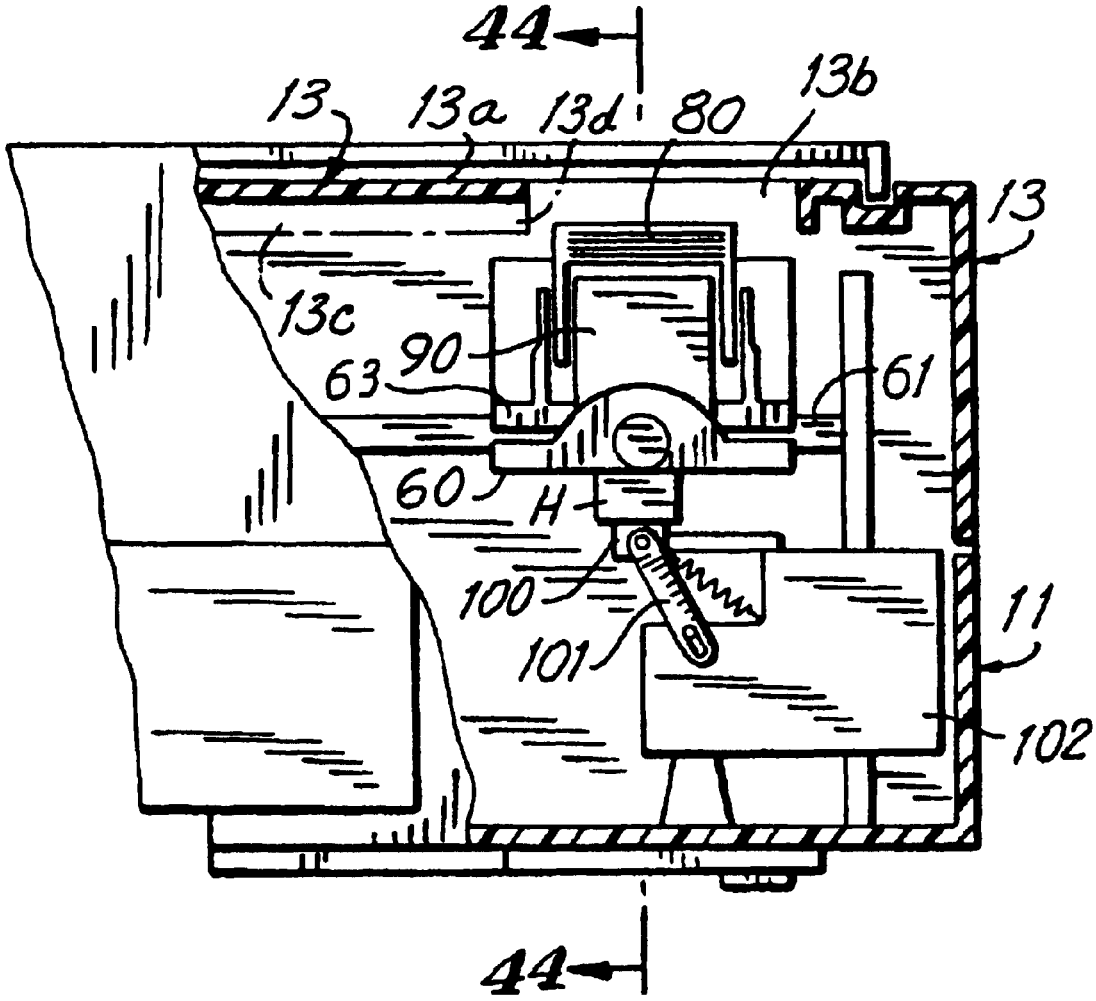
FIG. 43 is a fragmentary front elevational view, partly in section, of the printer at a carriage stop position.

FIG. 43 depicts the carriage stop position for performing the above-described operation.

This carriage stop position serves as a capping position in which a cap 100 is fitted to head H. Cap 100 is fitted to head H when the carriage is stopped. Cap 100 prevents the ink from drying in the nozzle of the head. Cap 100 can also remove any clogging of the ink by sucking the ink from the nozzle. A lever 101 moves cap 100 vertically. A pump unit 102 performs the sucking operation.

Figure 44:
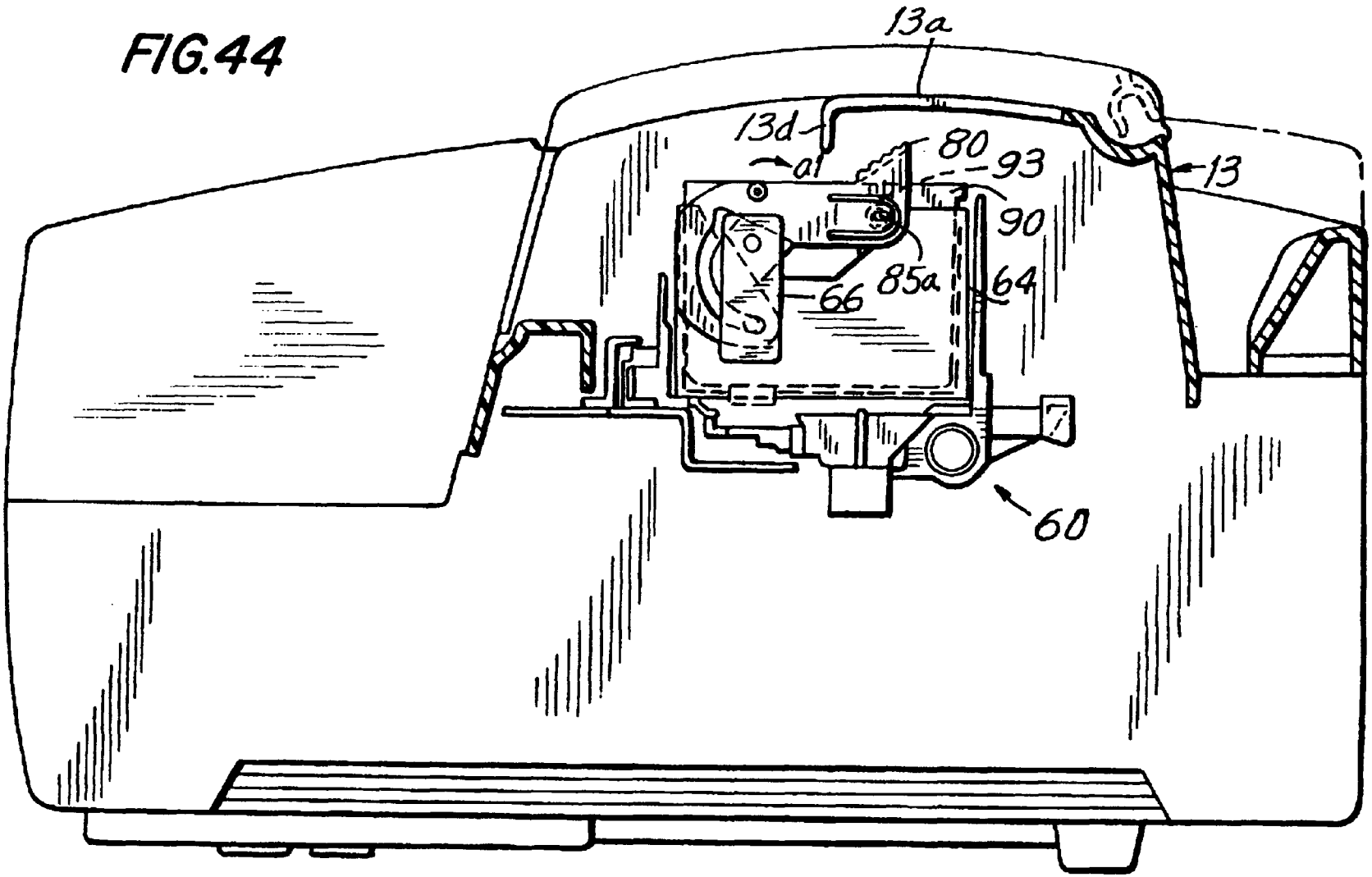
FIGS. 44–45 are partial cross-sectional views of a right-hand side of the printer and illustrating the operation of a stopper.

FIGS. 43 and 44 depict an upper case of the printer, generally indicated at 13, and an upper portion (a portion corresponding to the aforementioned carriage stop position) 13b of its ceiling portion 13a is notched and an opening is provided, whereby the rotating operation of the aforementioned lever 80 is made possible.

A forward end of ceiling portion 13a is formed as a suspended portion 13c extending downward, and a right end face 13d thereof is formed as a stopper.

Figure 45:
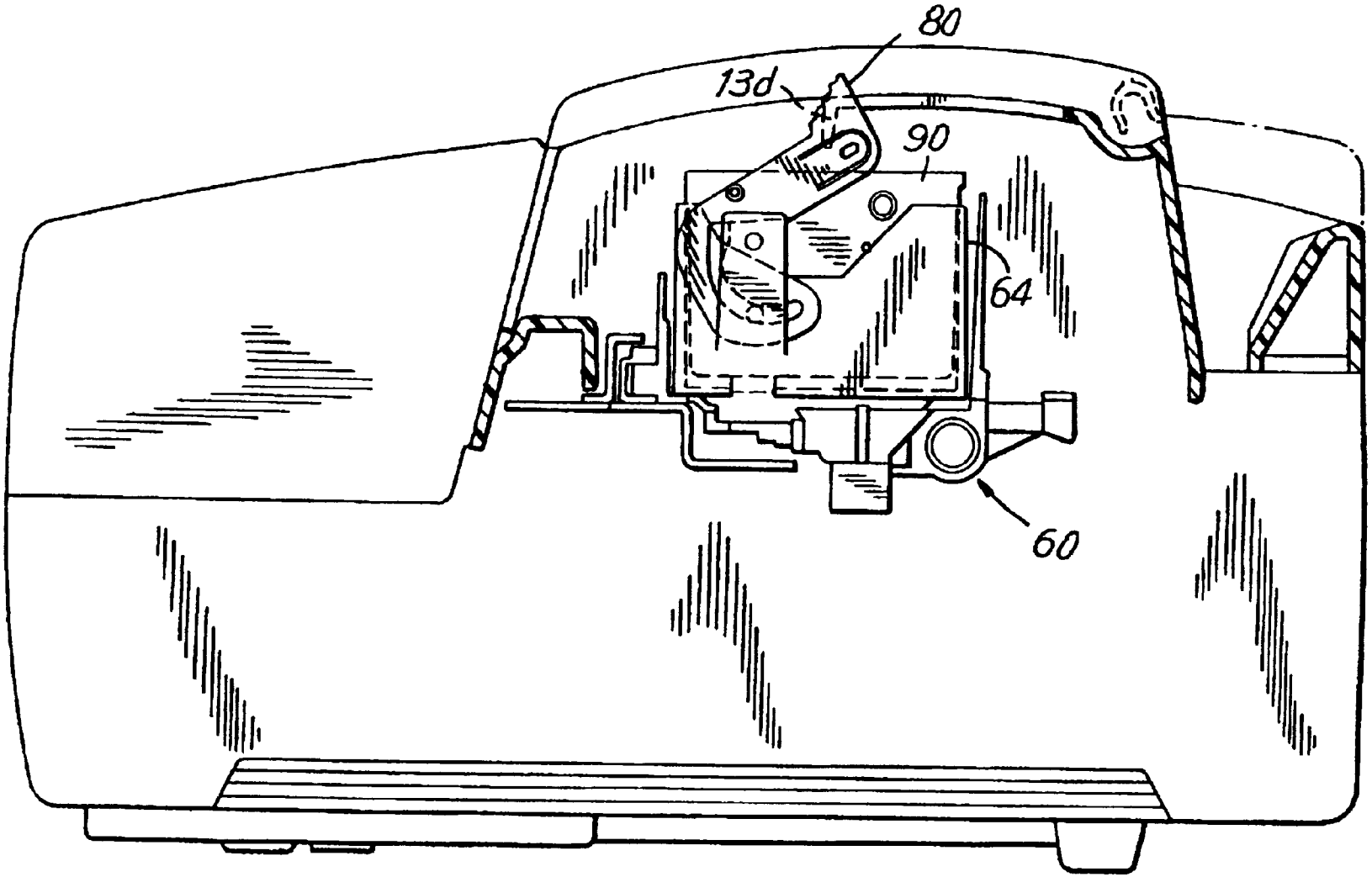

Therefore, if lever 80 fully rotates in the direction of arrow a1, i.e., if ink cartridge 90 is completely mounted in mounting portion 64, lever 80 can extend below ceiling portion 13a, and carriage 60 can move in the direction of arrow z (FIG. 43). However, as illustrated in FIG. 45, if lever 80 is not fully rotated in the clockwise direction, ink cartridge 90 will not be fully mounted and lever 80 will abut against stopper 13d. This will hinder the movement of carriage 60. The above-described construction and arrangement has the following advantages.

First, in the event of an incomplete mounting of the ink cartridge, any damage to the structure by the movement of the carriage will only be to the lever 80 and not to the ink cartridge itself. This is because the lever will contact the stopper, not the ink cartridge. Specifically, referring to FIG. 45, if the lever 80 is not fully rotated clockwise, ink cartridge 90 will not be fully installed. When carriage 60 moves in the direction as shown by arrow z (FIG. 43), lever 80 will abut against the stopper 13d and the movement of carriage 60 will stop. However, carriage 60 is stopped because lever 80 abuts against stopper 13d, not because ink cartridge 90 abuts against stopper 13d. Hence, ink cartridge 90 will not be disengaged with carriage 60 and the ink cartridge will not break.

Second, if the carriage begins to move without the ink cartridge being fully installed, the lever will very shortly thereafter abut the stopper, preventing any further movement of the carriage. Specifically referring to FIG. 45, the carriage stop position is provided for mounting or demounting ink cartridge 90 in/on carriage 60. Stopper 13d is placed in the vicinity of this carriage stop position. Therefore, if carriage 60 begins to move before lever 80 has been fully rotated clockwise and ink cartridge 90 is not fully mounted, the lever 80 will abut against stopper 13d, thereby stopping the movement of carriage 60. Accordingly, a partially mounted ink cartridge is prevented 90 from coming off carriage 60.

Third, the interior of the printer is prevented from becoming stained. The carriage stop position serves as the capping position where cap 100 is fitted to head H. If there is an increase in pressure in the ink channel when ink cartridge 90 is mounted on cartridge 60, the ink is captured by cap 100.

Fourth, the stopper construction, specifically stopper 13d, is very simple. Stopper 13d is integral with case 13 of the printer.

Fifth, the construction and arrangement of tongues 85 aid in reducing the vibrations, and any ancillary noise due to the vibrations, of carriage 60 when carriage 60 reverses direction. Tongues 85 of lever 80 resiliently support ink cartridge 90 in carriage 60. When carriage 60 moves, the inertial force and vibrations of ink cartridge 90, when carriage 60 reverses direction, is transmitted to carriage 60 through the tongues 85. Therefore, because of the construction of tongues 85, the inertial force of ink cartridge 90 is transmitted to carriage 60 in a dampened state, and any vibrations and noise are reduced.

Reference will now be made of the ink jet printer constructed in accordance with a second embodiment of the present invention.

A major difference between the second embodiment and the first embodiment is in the carriage and the structure for supporting the carriage. All other features of the second embodiment are similar in construction and arrangement to those of the first embodiment.

Figure 46:
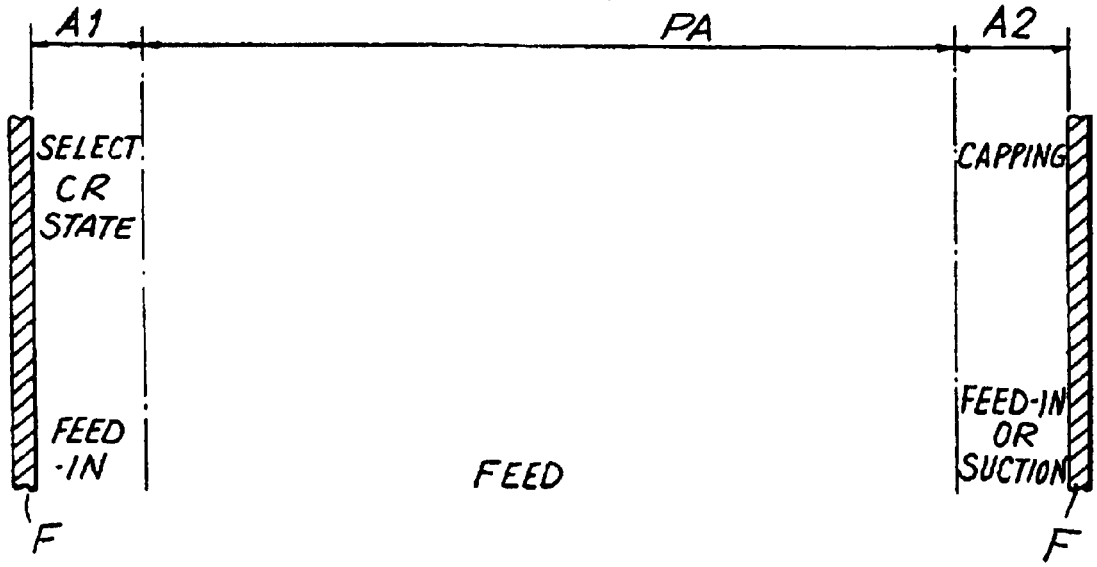
FIG. 46 is a schematic diagram illustrating the print area and nonprint areas in accordance with a second embodiment of the ink jet printer in accordance with the present invention.

FIG. 46 is a schematic diagram illustrating the print area and the nonprint area in this second embodiment, with a print area PA, and a nonprint area A1 and A2 located on both sides of print area PA. A frame F is also shown.

In this embodiment, the carriage selectively effect the paper feeding operation or the suction operation by being first allowed to enter first nonprint area A1 to select the state of a changeover means provided on the carriage. Then the carriage enters second nonprint area A2 to change over the position of a drive gear by using the changeover means.

Figure 48:
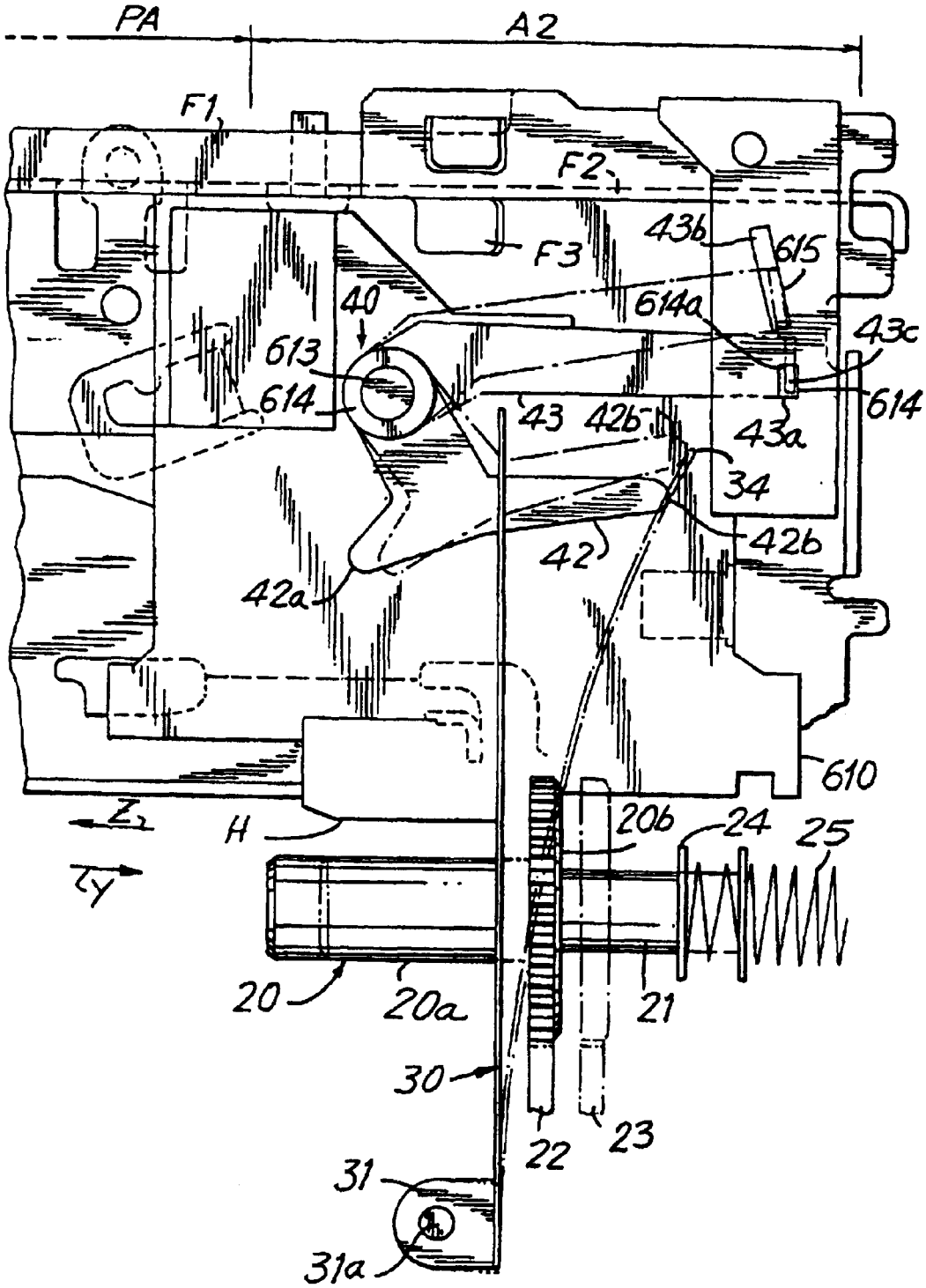
FIG. 48 is an enlarged front elevational view of a second nonprint area A2.
Figure 49:
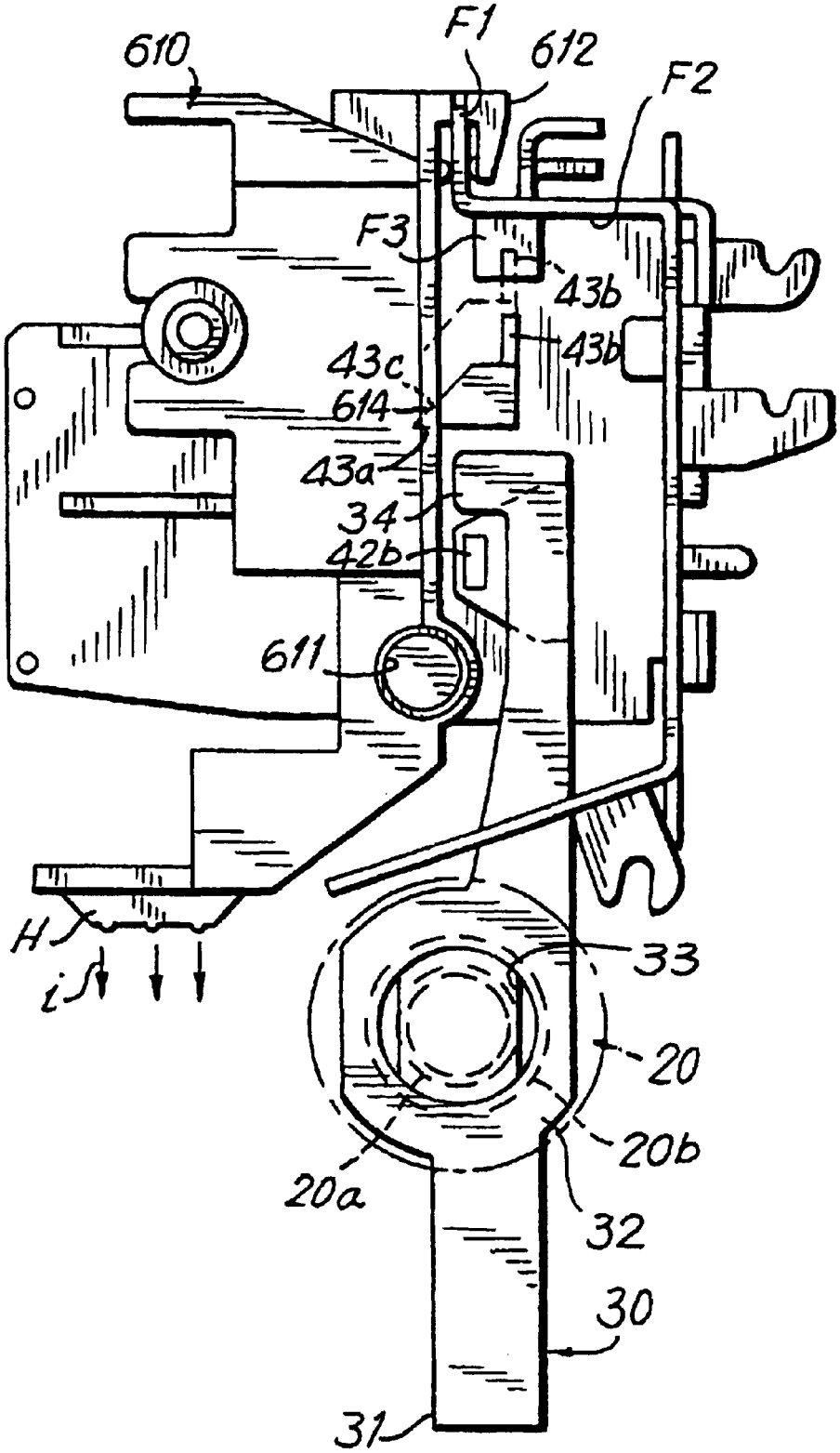
FIG. 49 is a right-hand side elevational view thereof.

Referring to FIG. 48, a carriage 610 will reciprocate in the direction of arrows z and y while guided by a rod 619 (see FIG. 51) and an upper end F1 of frame F. FIG. 49 shows a bearing 611 for rod 619 and an engaging portion 612 for engagement with upper end F1 of the frame. Engaging portion 612 is constructed and arranged to loosely mount and slide along upper end F1 of frame F.

An ink jet head H is mounted on carriage 610, and printing takes place by injecting ink i toward a sheet of recording paper (not shown) located below head H, as shown in FIG. 49.

Figure 47:
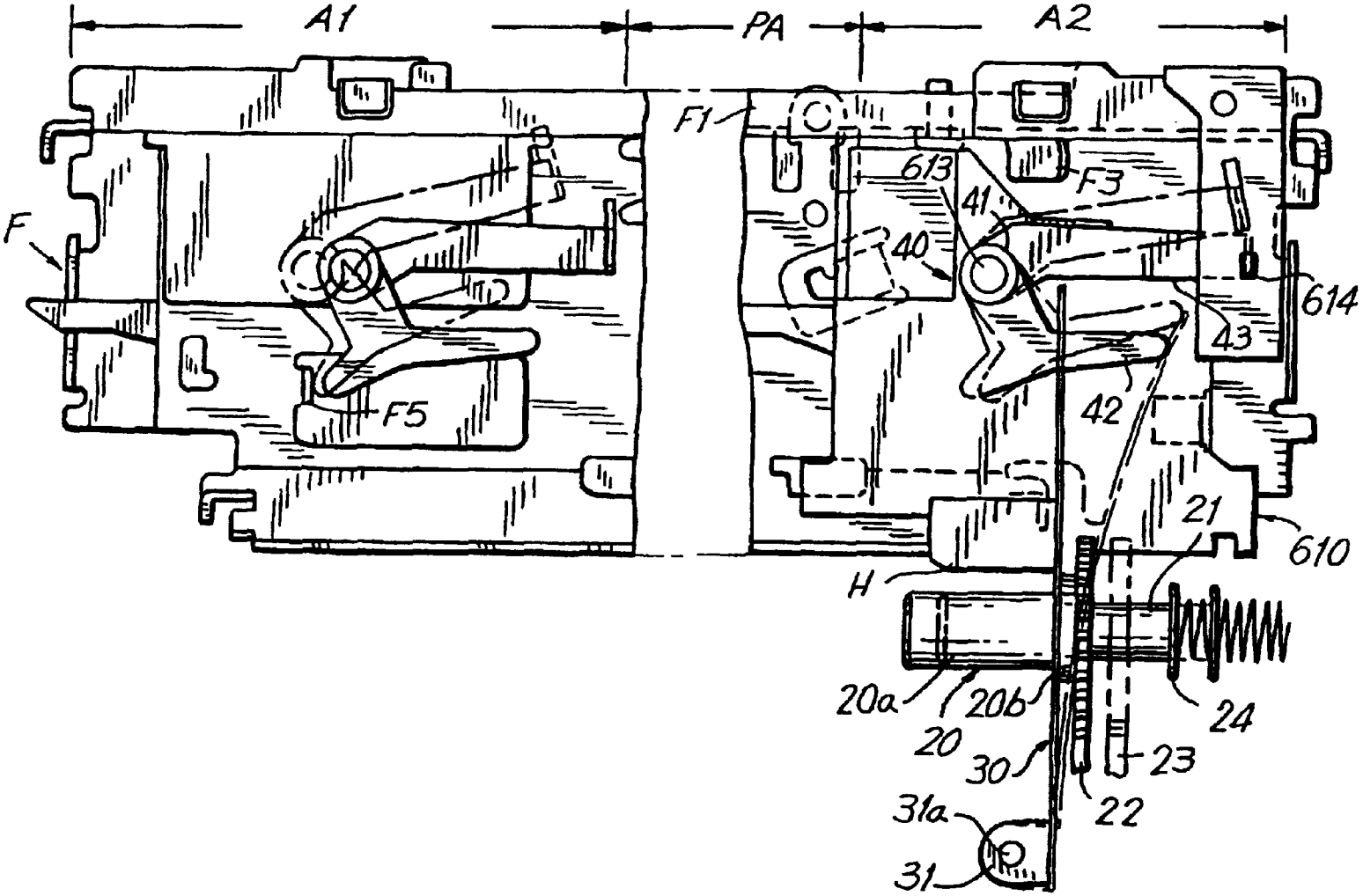
FIG. 47 is a fragmentary front elevational view illustrating a portion of the internal structure of the embodiment.

In FIGS. 47 to 49, a drive gear, generally indicated at 20, is connected to a rotating shaft 21 slidably supported by frame F. Drive gear 20 achieves a paper-feed driving position for driving a paper feeding mechanism (see FIG. 17) by engaging a paper-feeding-mechanism driving gear 22. Drive gear 20 can also achieve a suction driving position for driving a suction mechanism which includes pump unit 102 (see FIG. 43) and the like, by engaging a suction-mechanism driving gear 23. A flange 24 is rotatably attached to a rotating shaft 21, and a compression spring 25 is interposed between flange 24 and the frame. Drive gear 20 normally engages the paper-feeding-mechanism driving gear 22 because compression spring 25 forces rotating shaft 21 in the direction indicated by arrow z as shown in FIG. 48.

Figure 51:
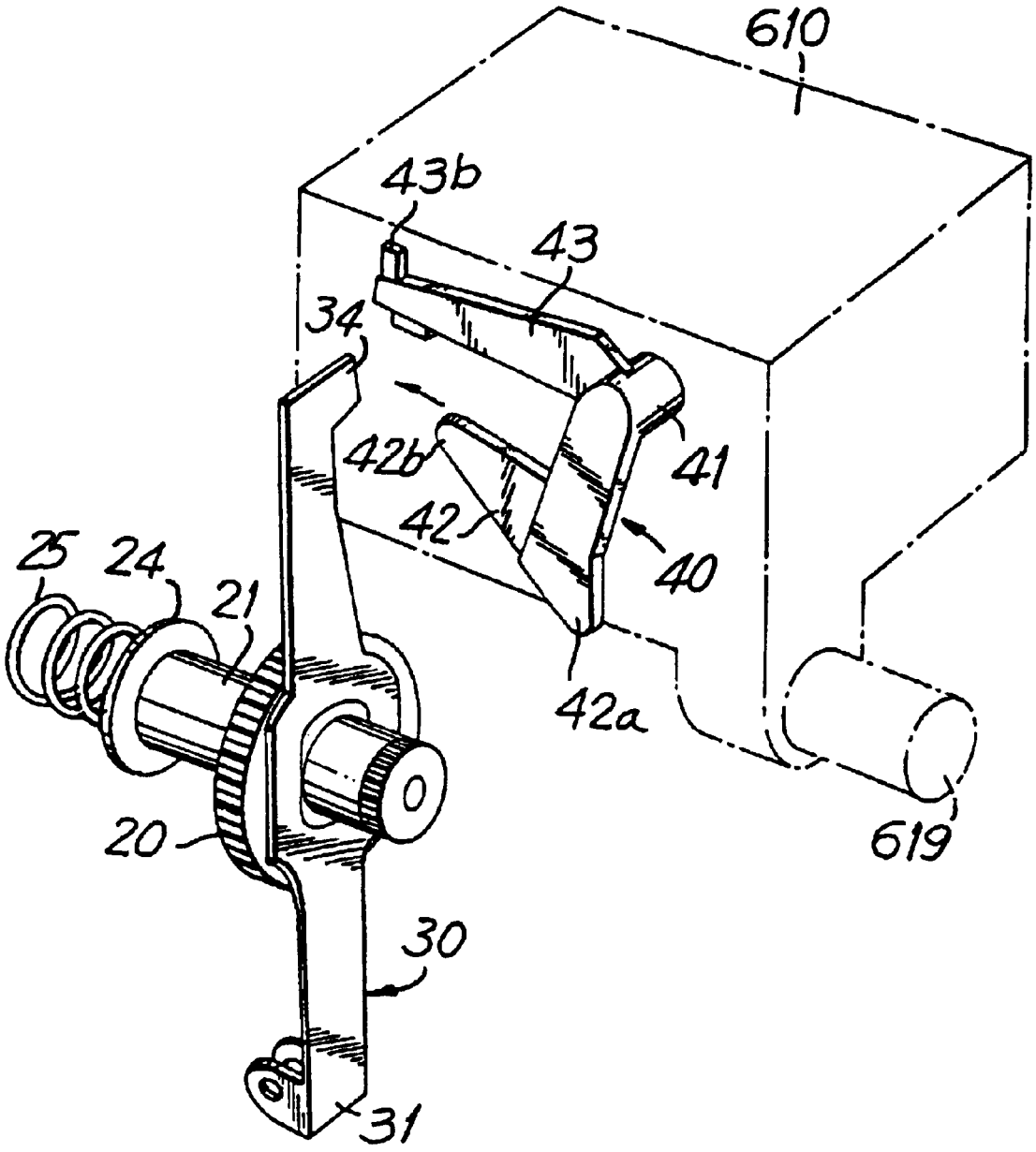
FIG. 51 is a perspective view thereof, as seen from the rear side, with the frame omitted.

An actuating piece, generally indicated at 30, is formed of a resilient member (e.g. a leaf spring), and includes a proximal portion 31 rotatably supported on the frame by a shaft 31a. As shown in FIG. 49, actuating piece 30 has a ring portion 32 with a hole 33 formed therein. A small-diameter portion 20a of drive gear 20 is loosely fitted in hole 33. The diameter of hole 33 is smaller than an intermediate-diameter portion 20b of drive gear 20. As shown in FIG. 51, a distal end of actuating piece 30 is formed in a substantially L-shaped configuration and has a projection 34 located in a rear portion of carriage 610.

Referring primarily to FIGS. 48 and 51, a changeover lever, generally indicated at 40, serves as the changeover means and is disposed in the rear portion of carriage 610 in such a manner as to be rotatable on a shaft 613. Changeover lever 40 is formed of a synthetic resin, and includes a boss 41 attached to shaft 613, an actuating lever 42 formed integrally with boss 41, and a locking lever 43 also formed integrally with boss 41. Locking lever 43 sets the rotation of the actuating lever 42.

Actuating lever 42 has a substantially Y-shaped configuration and includes first and second distal end portions 42a, 42b.

Figure 54:
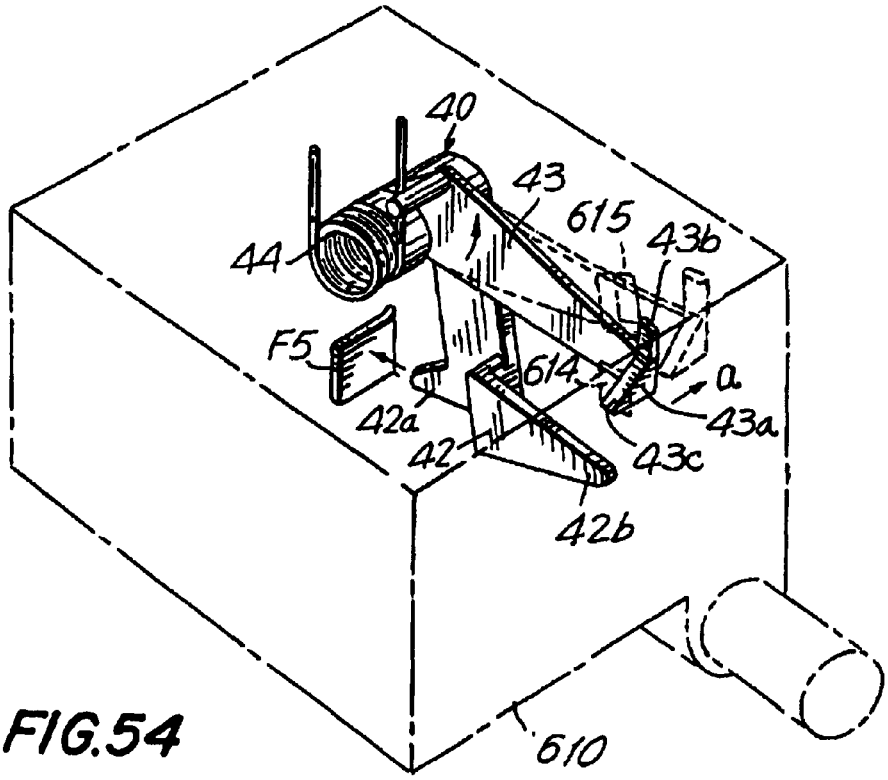
FIG. 54 is a perspective view of a portion thereof.
Figure 55:
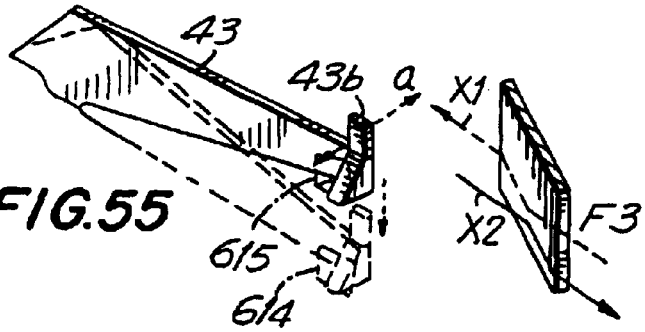
FIG. 55 is a fragmentary perspective view illustrating the operation thereof.
Figure 56:
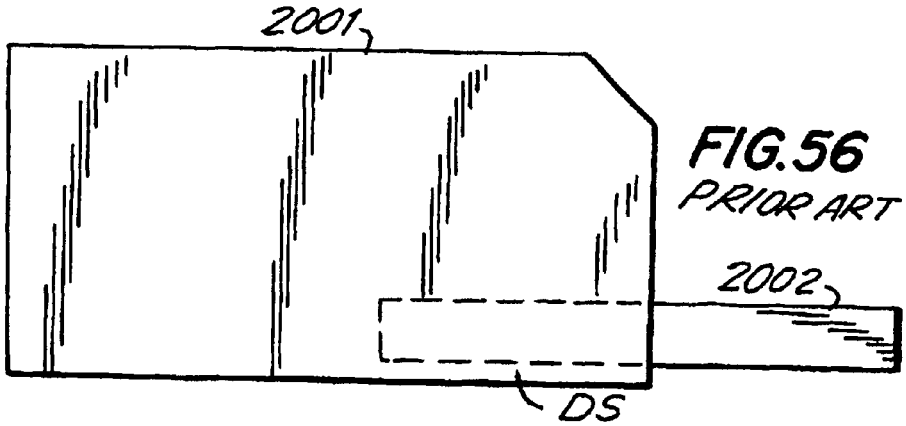
FIG.56 PRIOR ART
FIGS. 56 to 71 show printers and portions thereof in accordance with prior conventional art.
Figure 57:
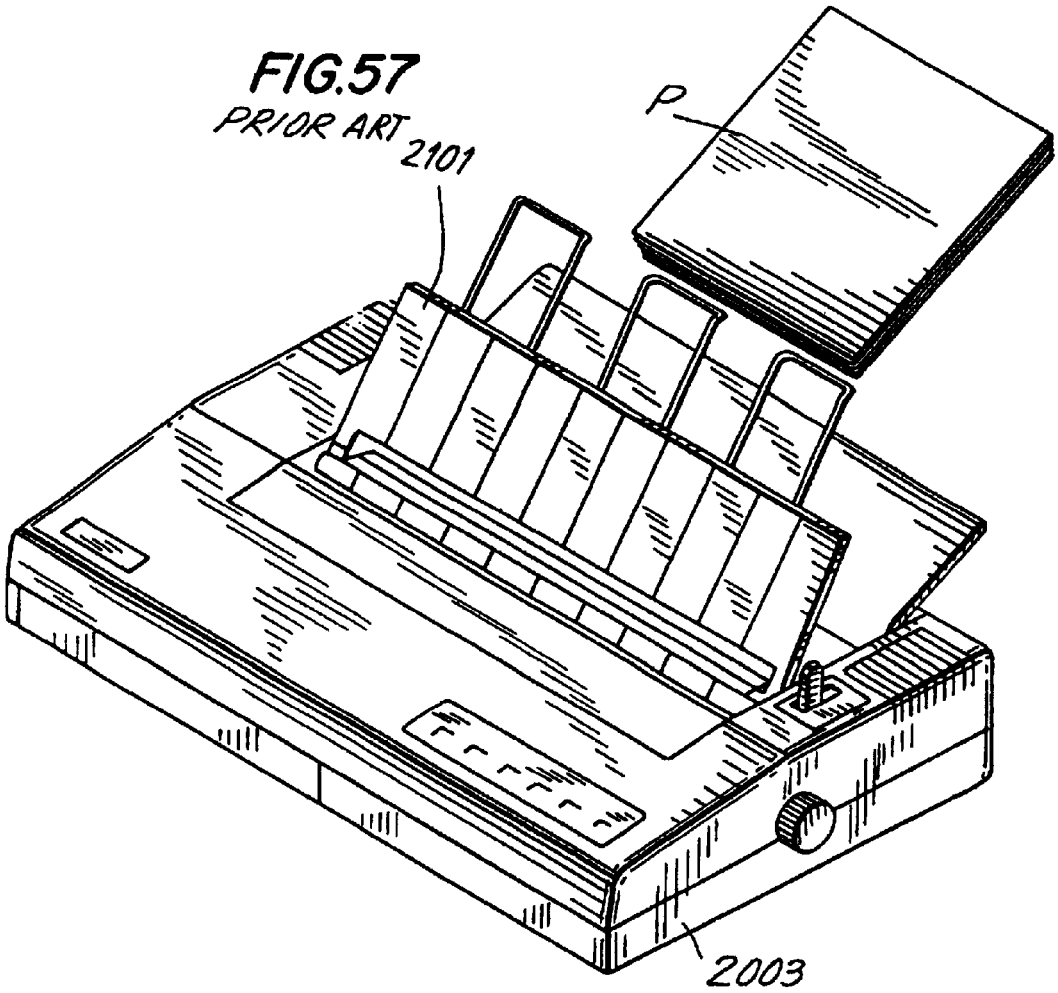
FIG.57 PRIOR ART
Figure 58:
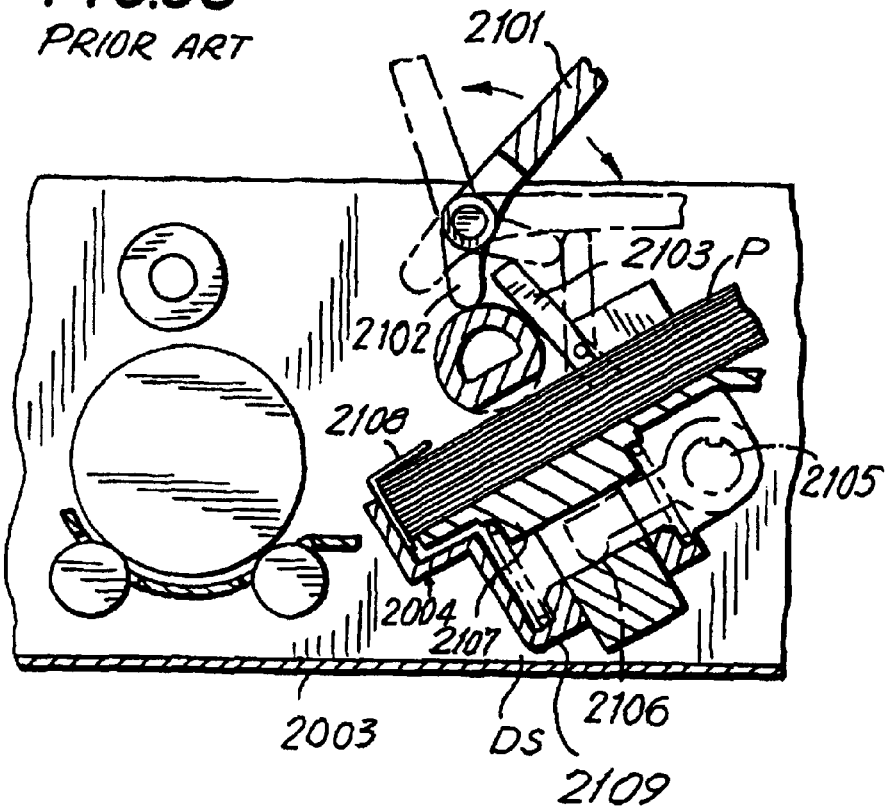
FIG.58 PRIOR ART
Figure 59:
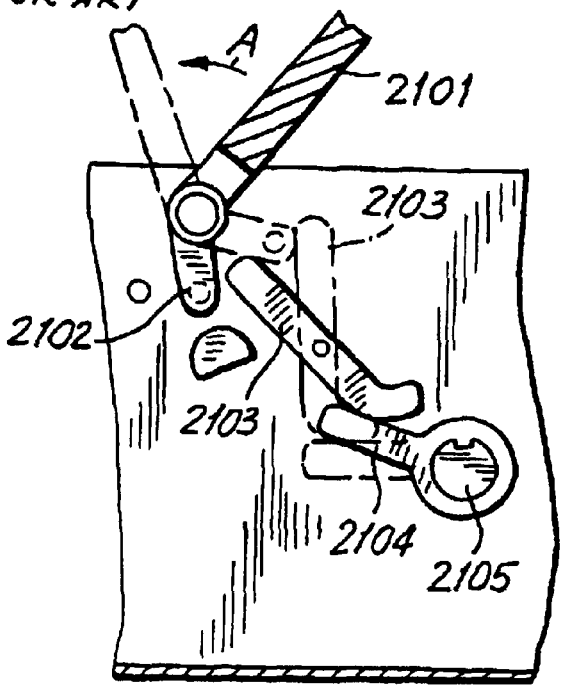
FIG.59 PRIOR ART
Figure 60:
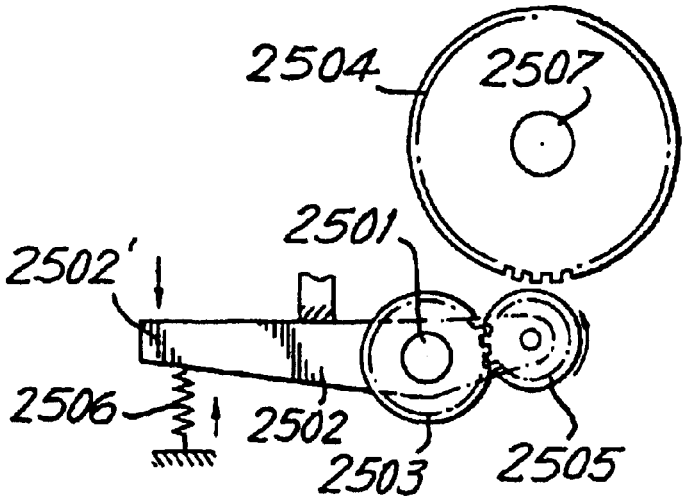
FIG.60 PRIOR ART
Figure 61:
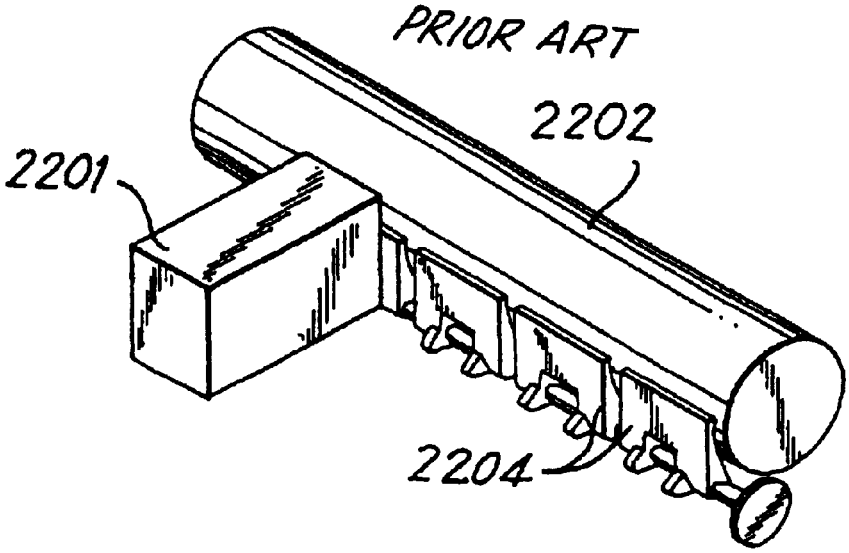
FIG.61 PRIOR ART
Figure 62:
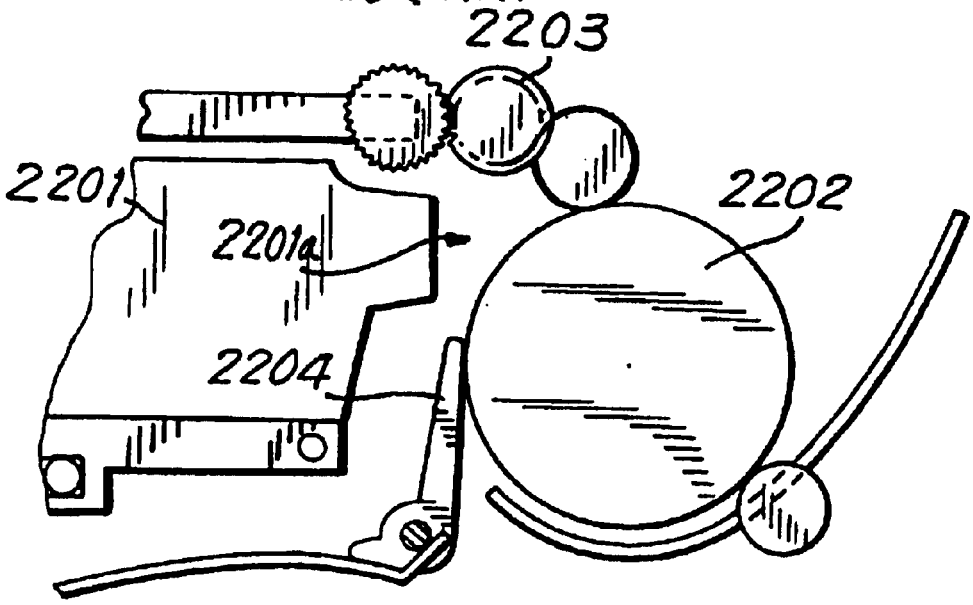
FIG.62 PRIOR ART
Figure 63:
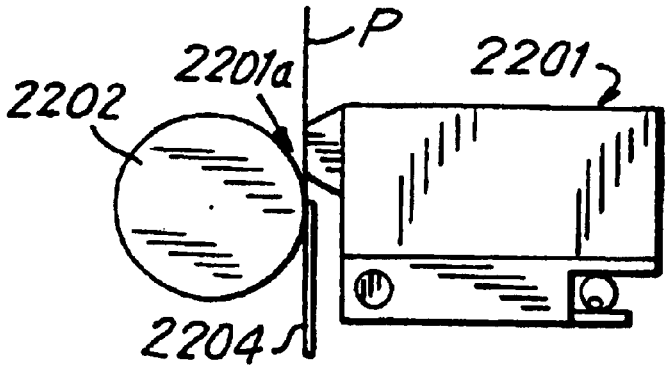
FIG.63 PRIOR ART
Figure 64:
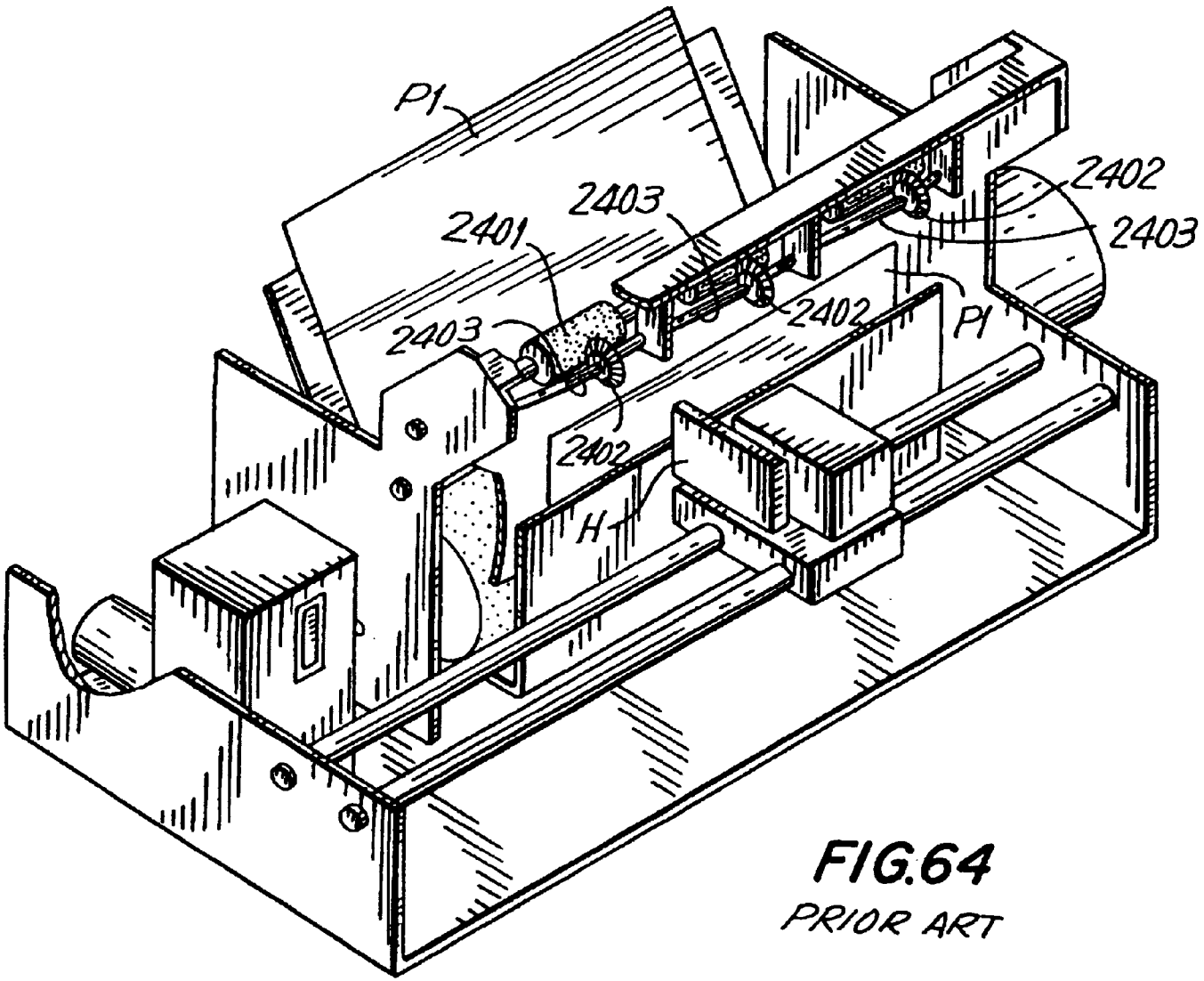
FIG.64 PRIOR ART
Figure 65:
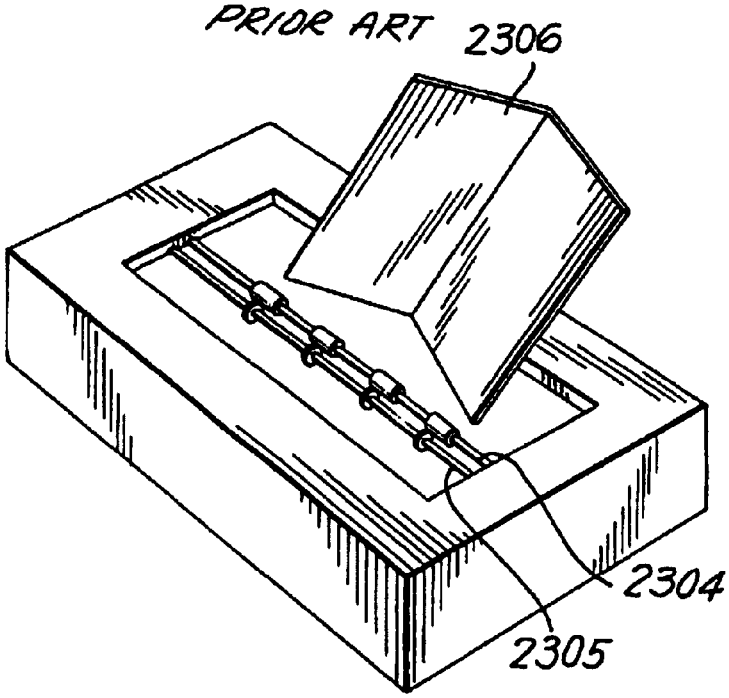
FIG.65 PRIOR ART
Figure 66:
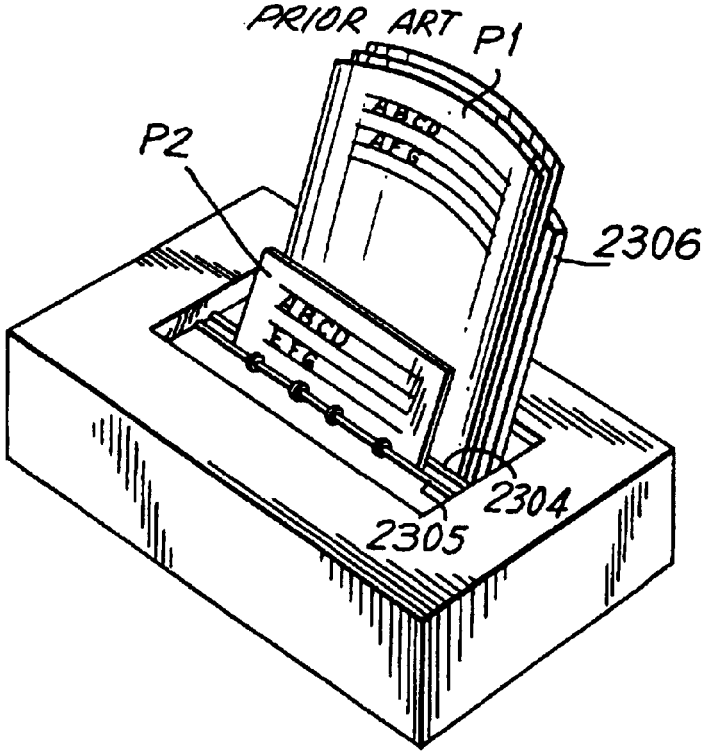
FIG.66 PRIOR ART
Figure 67:
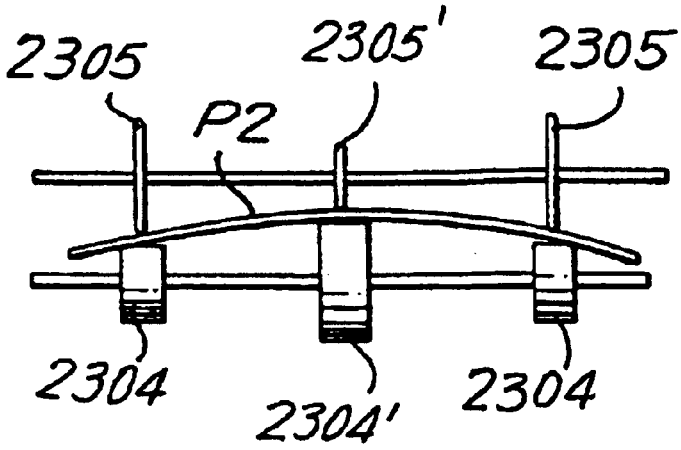
FIG. 67 PRIOR ART
Figure 68:
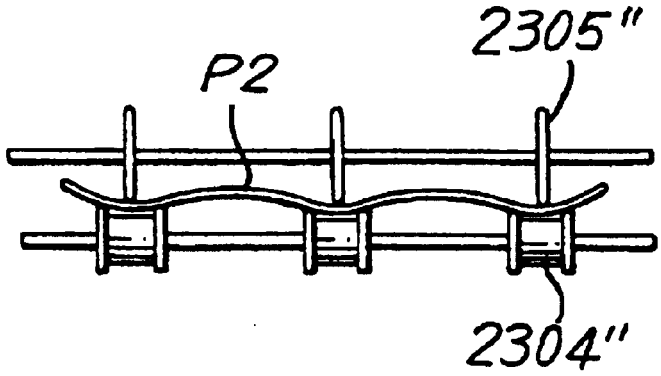
FIG. 68 PRIOR ART
Figure 69:
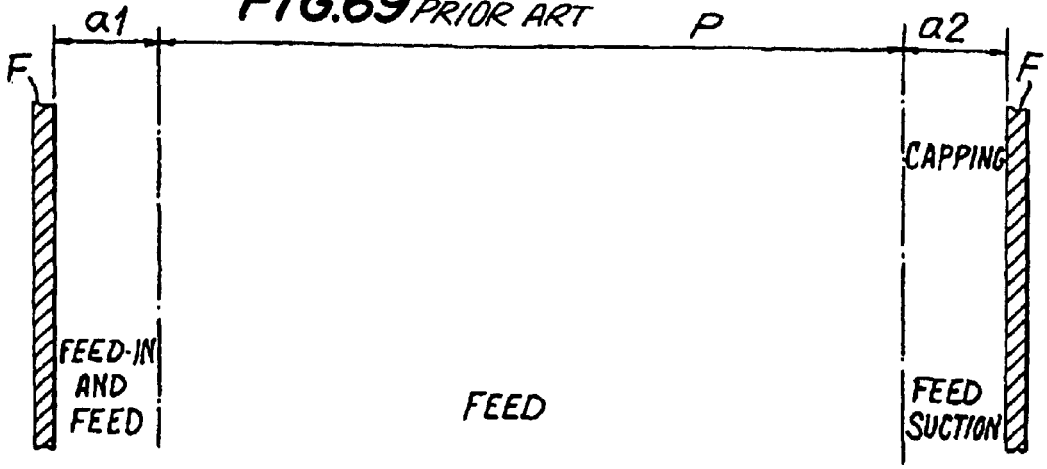
FIG.69 PRIOR ART
Figure 70:
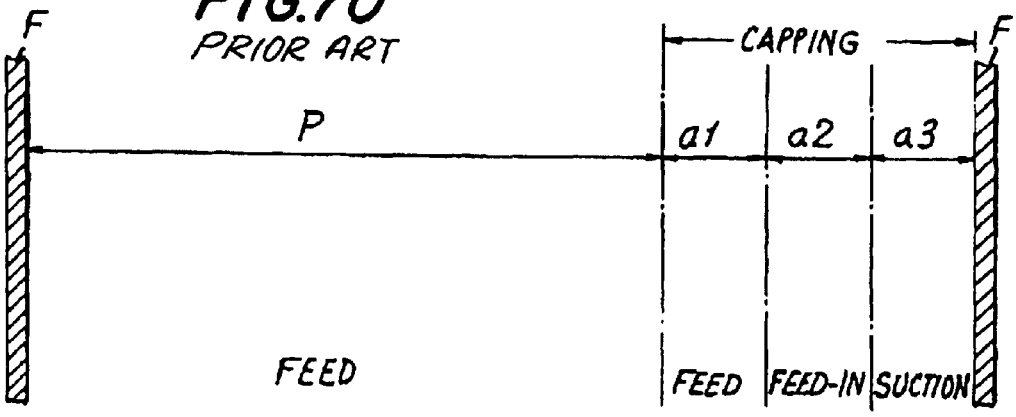
FIG.70 PRIOR ART
Figure 71:
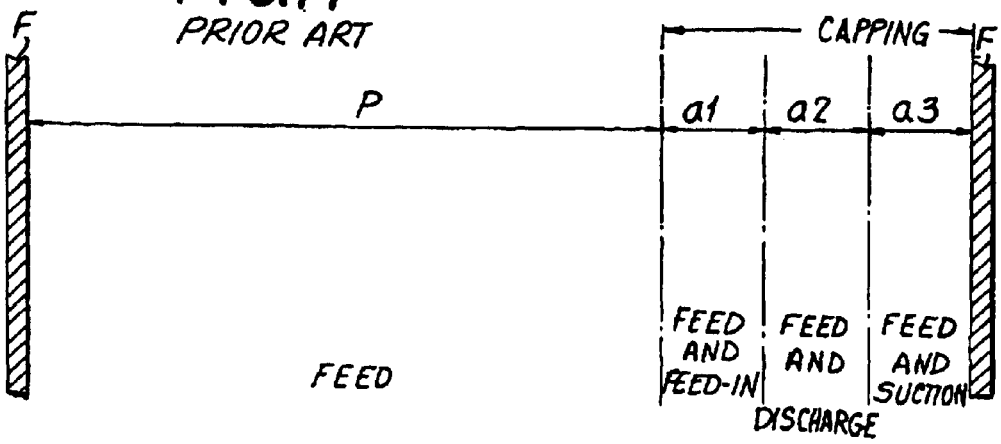
FIG.71 PRIOR ART

As shown in FIG. 54, a retainer 43a and a resetting projection 43b are formed integrally with a distal end of locking lever 43. Retainer 43a is formed by being bent substantially orthogonally toward the carriage and whose distal end is formed as an inclined surface 43c. Retainer 43a engages a capping-position hole 614 or a suction-position hole 615 formed in carriage 610. As shown in FIG. 55, when resetting projection 43b is engaged with suction-position hole 615, resetting projection 43b is capable of engaging a resetting protrusion F3 which is formed by being bent downward from a top portion F2 (see FIG. 49).

In FIG. 54, a spring 44 is disposed between changeover lever 40 and carriage 610. Spring 44 is constantly forcing changeover lever 40 to rotate in the clockwise direction.

Figure 52:
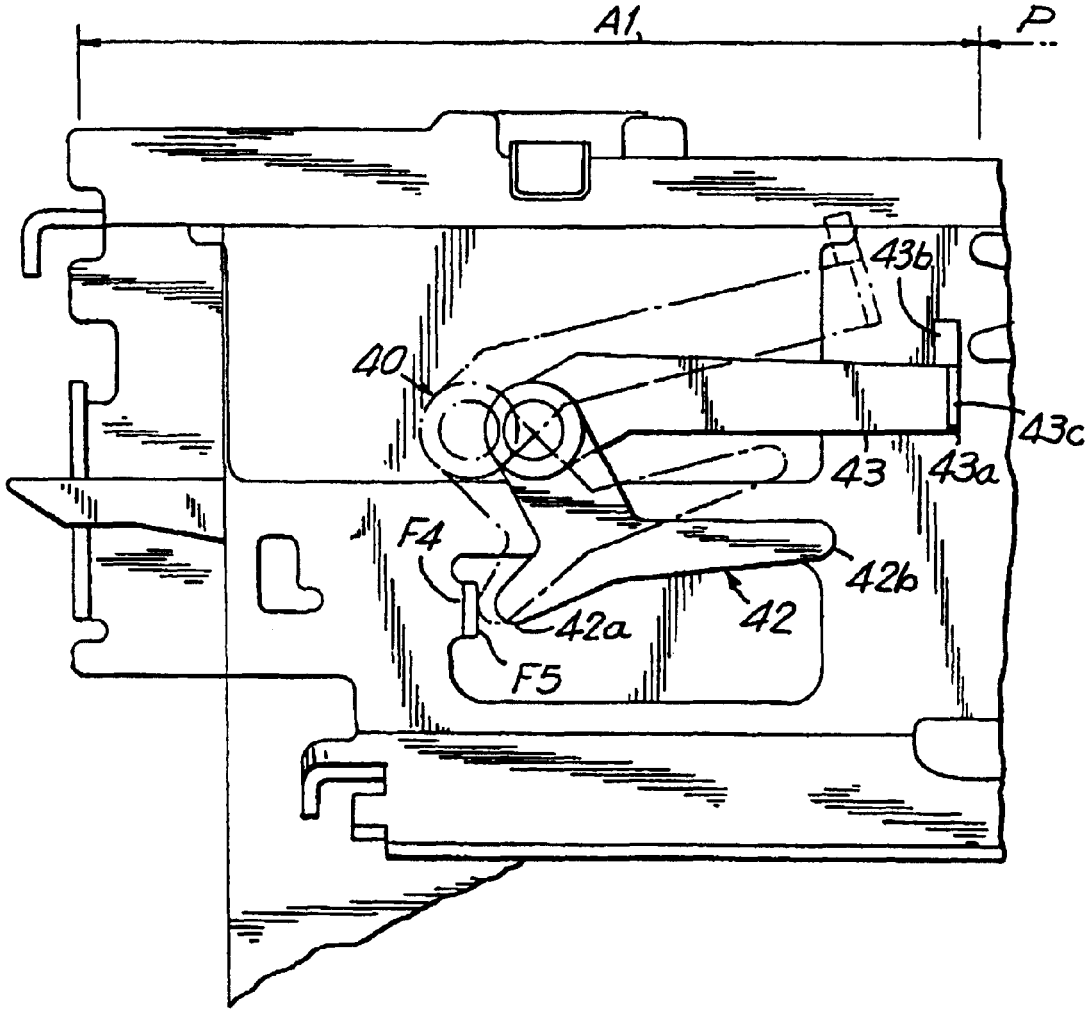
FIG. 52 is an enlarged front elevational view of a first nonprint area A1.
Figure 53:
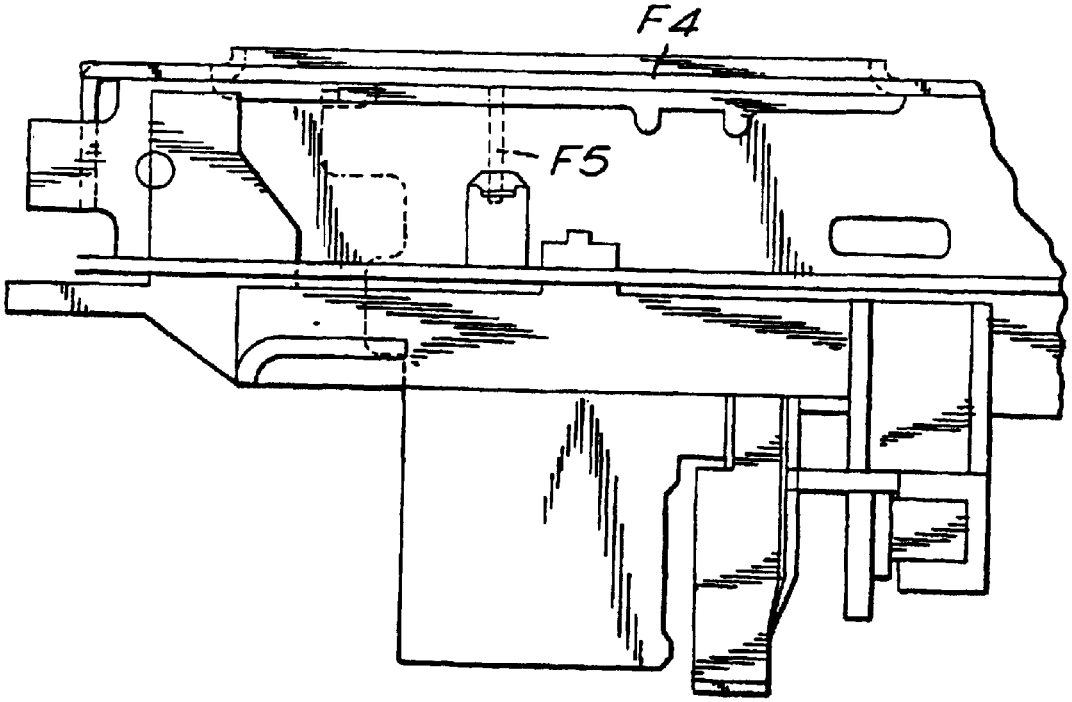
FIG. 53 is a plan view thereof.

In FIGS. 52 to 54, a selecting protrusion F5 serves as a selecting means, and is formed by being bent toward this side from a rear portion F4 of the frame. Selecting protrusion F5 is formed at a position capable of abutting against first distal end portion 42a of actuating lever 42 when carriage 610 has entered deeply into first nonprint area A1.

Next, a description will be given of the operation of the above-described mechanism.

Similarly to a conventional printer, the printing operation is performed so that carriage 610 reciprocates across print area PA, ink i is ejected from head H, the printing paper is fed for the portion of the interlinear space each time one line is printed, thereby printing one sheet of recording paper.

While printing on a sheet of paper, carriage 610 shallowly enters first nonprint area A1, and the feeding-in operation and feeding operation of a subsequent sheet of recording paper are performed. At this time, since carriage 610 only shallowly enters into first nonprint area A1, the first distal end portion 42a of actuating lever 42 does not abut against selecting protrusion F5, as indicated by the solid lines in FIG. 52. Thereafter, the carriage 610 returns to print area PA, and printing is performed on the second sheet of recording paper. The same operation is repeated until a predetermined number of sheets are printed.

The capping operation is performed when no print signal is detected for a predetermined period of time. Head H is covered with cap 100 (FIG. 43) to ensure that the ink at the nozzle tip of head H does not dry and that the nozzle does not clog.

In this case, carriage 610 enters second nonprint area A2. As shown by the solid lines in FIG. 48, retainer 43a of locking lever 43 of changeover lever 40 is engaged in capping-position hole 614 in the carriage, so that actuating lever 42 rotates clockwise. For this reason, even if carriage 610 enters second nonprint area A2, second distal end portion 42b of the actuating lever 42 does not abut against projection 34 at the tip of the actuating piece, and passes below projection 34, as shown in FIG. 49. Accordingly, actuating piece 30 maintains an upright state as indicated by the solid lines in FIG. 48, so that drive gear 20 remains engaged with paper-feeding-mechanism driving gear 22.

In this way, the capping operation is performed and drive gear 20 will rotate so the paper feeding operation is performed.

Subsequently, when a print signal is detected, the carriage returns to print area PA to perform the printing operation.

When the nozzle of head H becomes clogged, it is necessary to eliminate the clogging by forcibly sucking the ink from the nozzle by using a suction mechanism. The suction operation is performed by manually throwing a switch which may be on the operation panel or the like of the printer. When the switch is in the ON position, carriage 610 first enters deeply into the first nonprint area A1. Then, as indicated by the phantom lines in FIG. 52, first distal end portion 42a of actuating lever 42 contacts selecting protrusion F5, and changeover lever 40 rotates counterclockwise against the force of spring 44 (FIG. 54). Inclined surface 43c of retainer 43a at the distal end portion of locking lever 43 contacts with an upper side 614[a] (see FIG. 48) of capping-position hole 614, and retainer 43a disengages from capping-position hole 614 while locking lever 43 is deflected in the direction indicated by arrow a in FIGS. 50 and 54. Selecting protrusion F5 still forcing changeover lever 40 to rotate against the spring force of spring 44 causes retainer 43a to engage suction-position hole 615. When retainer 43a reaches suction-position hole 615, retainer 43a rotates in the direction of arrow b (FIG. 50) by the resiliency of locking lever 43, and engages suction-position hole 615. Changeover lever 40 is now set in the suction position.

Subsequently, carriage 610 passes print area PA and enters second nonprint area A2. Then, as indicated by phantom lines in FIG. 48 and 51, second distal end portion 42b of actuating lever 42 contacts projection 34 at the tip of actuating piece, thereby flexing actuating piece 30 clockwise (in FIG. 48). As actuating piece 30 flexes, ring portion 32 of actuating piece 30 contacts intermediate-diameter portion 20b of drive gear 20, causing drive gear 20 to slide in the direction of arrow y (as indicated by the phantom lines) and engage suction-mechanism driving gear 23. Furthermore, since actuating piece 30 is resilient (i.e. a leaf spring), the positional variation of carriage 610 is absorbed, and drive gear 20 engages smoothly with suction-mechanism driving gear 23.

The suction mechanism can now perform the suction operation.

Figure 50:
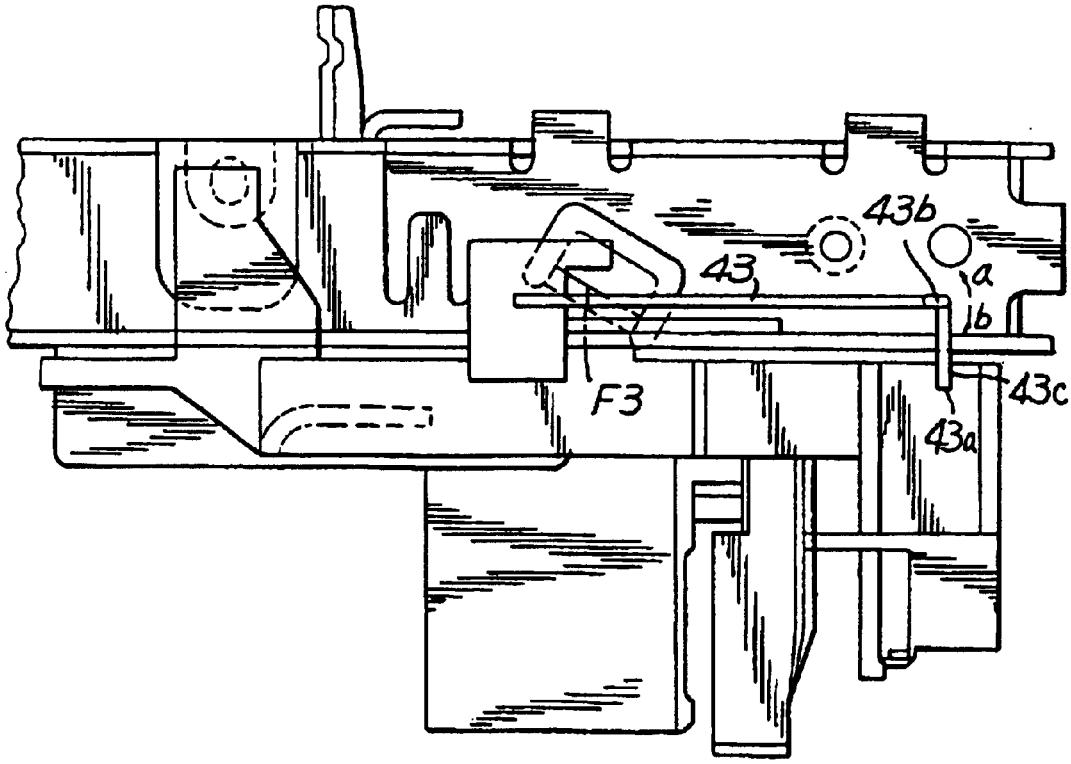
FIG. 50 is a plan view thereof.

If a print signal is subsequently detected, the carriage returns to print area PA, and changeover lever 40 is reset in the following manner. When carriage 610 moves in the direction of arrow z (FIG. 48), resetting projection 43b at the tip of locking lever 43 contacts with the rear surface of resetting protrusion F3, as indicated by the phantom lines in FIG. 49 and a broken-line arrow X1 in FIG. 55. As shown in FIGS. 50 and 55, since resetting protrusion F3 is at an angle with respect to the advancing direction of the carriage, locking lever 43 is deflected as indicated at arrow a and retainer 43a disengages from suction-position hole 615. Then, changeover lever 40 rotates clockwise in FIG. 48 by the action of spring 44, and retainer 43a enters capping-position hole 614, as indicated by the solid lines of FIG. 48. Resetting projection 43b also abuts against resetting protrusion F3 when carriage 610 enters the second nonprint area after changeover lever 40 is set in the suction position in first nonprint area A1, in this case resetting projection 43b abuts against the front surface of resetting protrusion F3, as indicated by arrow X2 in FIG. 55, and retainer 43a acts in such a manner as to enter deeply into suction-position hole 615. Hence, changeover lever 40 is prevented from becoming reset.

As described above and in accordance with the ink jet printer of this embodiment, carriage 610 is first entered into first nonprint area A1 to select the state of changeover lever 40 provided on the carriage, and carriage 610 is then entered into second nonprint area A2 to change over the position of drive gear 20 by means of changeover lever 40. Thus, the paper feeding operation or the suction operation can be effected selectively.

Therefore, since the paper feeding operation and the suction operation are selectively performed, the drawback found in conventional mechanisms of the recording paper being fed when the suction operation is performed is eliminated. Furthermore, the drawback of the suction operation being performed despite the fact that the head is not clogged is eliminated. Moreover, since only one nonprint area is provided on each side of the print area, the width of the printer in the direction of the row can be reduced.

It will thus be seen that the objects set forth above, among those made apparent from the preceding description, are efficiently attained and, since certain changes may be made in carrying out the above method and in the constructions set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

[1. An ink jet printer comprising:

a printer case having a print area where printing upon a sheet is permitted and a nonprint area where printing upon a sheet is not permitted, a carriage slideably mounted to said printer case so as to slide through said print area and said nonprint area of said printer case;

an ink cartridge mounted on said carriage;

a lever pivotably attached to said carriage for attaching and detaching the ink cartridge from said carriage, said lever being pivotable between an open position where the ink cartridge is detached from the carriage and a closed position where the ink cartridge is attached to the carriage; and a lip attached to said printer case and positioned above said lever and within said print area for preventing said lever from detachment of said ink cartridge when said carriage is positioned within said print area, and for abutting said lever to prevent said carriage from moving from said nonprint area to said print area when said lever is in the open position.]

[2. The ink jet printer as claimed in claim 1, wherein said lip extends substantially along the length of said print area and has a gap formed therein.]

[3. The ink jet printer as claimed in claim 1, wherein said lip is formed integrally with said printer case.]

[4. An ink jet printer comprising:

a carriage slideably mounted to said printer case so as to slide along a print area;

substantially U-shaped lever including a first arm having a first fixed end, a first free end and a first pivot point, a second arm having a second fixed end, a second free end and a second pivot point, and a tab connecting said first fixed end and said second fixed end, said lever being pivotably mounted to said carriage at said first pivot point and said second pivot point for pivoting about a pivoting axis defined as a line drawn between said first pivot point and said second pivot point; and an ink cartridge detachably mounted to said carriage by said lever;

wherein, said lever being pivotable about the pivot axis between a first position where the lever engages an ink cartridge and a second position where the ink cartridge is attached to the carriage, and, wherein, pivoting of said lever between said first and second positions causes rotation displacement of the ink cartridge relative to said carriage.]

[5. The ink jet printer as claimed in claim 4, wherein said lever includes at least one resilient member for engaging said carriage when said lever is in the second position.]

[6. The ink jet printer as claimed in claim 4, further comprising a head mounted on said carriage having a connecting portion and wherein said carriage includes a mating portion for matingly engaging said connecting portion when said lever is in the second position.]

[7. The ink jet printer as claimed in claim 4, further comprising a needle attached to said head, and wherein said cartridge has an ink outlet and includes a seal for sealing said ink outlet, and said needle punctures said seal when said lever is in the second position to create fluid communication between said cartridge and said needle.]

[8. The ink jet printer of claim 4, wherein a discernible signal is produced by said lever when said lever is moved to the second position thereby signaling that the cartridge is in the attached position.]

[9. The ink jet printer of claim 4, wherein the pivoting axis is substantially parallel to the direction of the carriage movement.]

[10. The ink jet printer as claimed in claim 4, wherein said first arm includes a first resilient portion and said second arm includes a second resilient portion, said cartridge includes a first convex portion and a second convex portion formed thereon, and said first resilient portion engages said first convex portion and said second resilient portion engages said second convex portion to attach said ink cartridge to said carriage.]

[11. The ink jet printer as claimed in claim 10, wherein said first resilient portion has a first hole that engages said first convex portion of said ink cartridge and second resilient portion has a second hole that engages said second convex portion of said ink cartridge when said ink cartridge is in the attached position.]

[12. The ink jet printer as claimed in claim 4, comprising a first pin and a second pin attached to said ink cartridge on opposed sides of said cartridge so as to project outwardly from said sides said first arm having a first cam groove sized and shaped to accommodate said first pin and said second arm having a second groove sized and shaped to accommodate said second pin, said first and second cam grooves for guiding said cartridge to an attached position where said cartridge is attached to said carriage.]

[13. The ink jet printer as claimed in claim 12, wherein each of said first and second cam grooves has an opening exposed to accept said first and second pins when said lever is in the first position, said cam groove being shaped to guide said first and second pins and therefore said cartridge to the attached position when said lever is pivoted from the first position to the second position.]

[14. The ink jet printer as claimed in claim 12, wherein said first and second cam grooves each have an inside edge, said first and second cam grooves are shaped relative to said pivoting axis so that the distance between the inside edges of the grooves and said pivoting axis increases as said lever pivots from the first position to the second position to displace said cartridge toward said carriage to the attached position.]

[15. An ink jet printer, comprising:

a carriage which moves along a print area;

a head mounted on said carriage;

a U-shaped lever comprising first and second arms and a tab joining a first end of each arm, said lever being pivotably mounted on said carriage at a second end of at least one of said arms for pivoting about an axis extending between said second ends of said arms;

an ink cartridge mounted on said carriage at least in part by said lever; and wherein each of said arms includes a resilient portion, said ink cartridge includes convex portions formed thereon, and each of said resilient portions engage a respective one of each of said convex portions to at least in part support said ink cartridge in said carriage moving direction.]

[16. The ink jet printer as claimed in claim 15, wherein said resilient portions have a hole that engages said convex portions of said ink cartridge when said ink cartridge is in said cartridge's mounted position.]

[17. An ink jet printer, comprising:

a carriage which moves along a print area;

a head mounted on said carriage;

a U-shaped lever comprising first and second arms and a tab joining a first end of each arm, said lever being pivotably mounted on said carriage at a second end of at least one of said arms for pivoting about an axis extending between said second ends of said arms; and at least one of said arms including a resilient portion for engagement by said ink cartridge to support said ink cartridge in said ink cartridge on said carriage in a direction of movement of said carriage;

an ink cartridge mounted on said carriage at least in part by said lever, said ink cartridge being provided with a pair of pins projecting outwardly on opposed sides in said carriage moving direction, and each of said first and second arms includes a cam groove for receiving said pins for facilitating the mounting and demounting of the ink cartridge in said carriage.]

[18. The ink jet printer as claimed in claim 17, wherein each of said cam grooves has an opening exposed when said lever is in an open position, said cam grooves being shaped to guide said pins and therefore said cartridge to its mounted position when said lever is pivoted from said open position to a closed position.]

[19. The ink jet printer as claimed in claim 18, wherein said cam grooves are shaped relative to said axis of pivoting of said lever so that the distance between a point on the grooves and said axis of pivoting of said lever increases as said lever pivots from said open to said closed position to displace said cartridge toward said carriage to said cartridge's mounted position.]

[20. An ink jet printer, comprising:

a carriage which moves along a print area;

a head mounted on said carriage;

a U-shaped lever comprising first and second arms and a tab joining a first end of each arm, said lever being pivotably mounted on said carriage at a second end of at least one of said arms for pivoting about an axis extending between said second ends of said arms;

an ink cartridge mounted on said carriage at least in part by said lever; and at least one of said arms including a resilient portion for engagement by said ink cartridge to support said ink cartridge in said ink cartridge on said carriage in a direction of movement of said carriage; said resilient portion assisting in reducing vibration of said carriage when said carriage is moving in said carriage moving direction.]

[21. An ink jet printer, comprising:

a printer case;

a carriage slideably mounted to said printer case;

an ink cartridge having a first side including a first pin extending outwardly from said first side, and a second side including a second pin extending outwardly from said second side, said ink cartridge being attached to said carriage; and a lever having a first arm, a second arm, and a tab connecting said first arm to said second arm, said first arm having a first groove sized to accept the first pin and said second arm having a second groove sized to accept the second pin when said lever is at a first position.]

[22. The ink jet printer of claim 21, wherein said first pin and said second pin move within said first and second grooves, respectively, to position said ink cartridge on said carriage as said lever pivots from the first position to a second position.]

[23. The ink jet printer of claim 21, wherein the carriage includes a supporting portion and said lever includes a stopper pin positioned to contact said supporting portion when said lever is in the first position to prevent said lever from overpivoting.]

*24. An ink jet printer for use with an ink jet head having a nose portion through which ink is ejected, comprising:*

*a paper feeding path which guides a sheet of printing paper in a direction from a paper feeding side to a paper discharging side;*

*a paper feed roller having a peripheral surface coincident with a portion of said paper feeding path;*

*a driving device operatively coupled to said paper feed roller and selectively rotating said paper feed roller;*

*a presser abutting said paper feed roller at a contact position, the contact position being located on said paper feeding path, so that when said paper feed roller is rotated by said driving device the sheet of printing paper is moved along said paper feeding path;*

*a flat paper guide surface disposed in said paper feeding path downstream of the contact position, the flat paper guide surface having a flat portion extending in a widthwise direction in opposition to substantially all of the width of the presser;*

*a printing area located between the flat paper guide surface and the ink jet head and corresponding to a region over which ink can be applied by ejection by the ink jet head; and*

*a plurality of projections disposed on said paper guide surface, at least some of which said projections being at least in part disposed inside of the printing area which is located between the contact position where said presser abuts said feed roller and a position where the nose portion of the ink jet head opposes said paper guide surface across said paper feeding path when the ink jet head ejects ink, the projections being arranged at intervals in a direction approximately transverse to and beneath said printing paper for supporting the sheet of paper moving along said paper feeding path, the projections on the flat paper guide surface being located at intervals corresponding to substantially the entire width of the presser,*

*wherein said paper feeding path extending at least from the contact position of the presser to the printing area is substantially flat.*

*25. An ink jet printer according to claim 24, wherein the presser comprises a pinch roller.*

*26. An ink jet printer according to claim 24, further comprising a deflector located downstream of and apart from the contact position and which deflects the sheet of paper toward the projections.*

*27. An ink jet printer according to claim 26, wherein at least one of the presser, the deflector and the plurality of projections extends across a full width of the sheet of paper.*

*28. An ink jet printer according to claim 24, wherein at least one of said projections extends from within the printing area to a point downstream and outside of the printing area.*

*29. An ink jet printer for use with an ink jet head having a nose portion through which ink is ejected, comprising:*

*a paper feeding path which guides a sheet of printing paper in a direction from a paper feeding side to a paper discharging side;*

*a paper feed roller having a peripheral surface coincident with a portion of said paper feeding path;*

*a driving device operatively coupled to said paper feed roller and selectively rotating said paper feed roller;*

*a presser abutting said paper feed roller at a contact position, the contact position being located on said paper feeding path, so that when said paper feed roller is rotated by said driving device the sheet of printing paper is moved along said paper feeding path;*

*a flat paper guide surface disposed in said paper feeding path downstream of the contact position, the flat paper guide surface having a flat portion extending in a widthwise direction in opposition to substantially all of the width of the presser; and*

*a plurality of projections disposed on said paper guide surface, at least some of which said projections are at least in part disposed inside of the printing area which is located between the contact position where said presser abuts said feed roller and the point where the nose portion of the ink jet head opposes said paper guide surface, the projections being arranged at intervals in a direction approximately transverse to and beneath said printing paper for supporting the sheet of paper moving along said paper feeding path, the projections on the flat paper guide surface being located at intervals corresponding to substantially the entire width of the presser,*

*wherein said paper feeding path extending at least from the contact position of the presser to the printing area is substantially flat.*

*30. An ink jet printer according to claim 29, wherein the presser comprises a pinch roller.*

*31. An ink jet printer according to claim 29, further comprising a deflector located downstream of and apart from the contact position and which deflects the sheet of paper toward the projections.*

*32. An ink jet printer according to claim 31, wherein at least one of the presser, the deflector and the plurality of projections extends across a full width of the sheet of paper.*

*33. An ink jet printer for use with an ink jet head having a nose portion through which ink is ejected, comprising:*

*a paper feeding path which guides a sheet of printing paper in a direction from a paper source to a paper exhaust;*

*a paper feed roller having a peripheral surface coincident with a portion of said paper feeding path;*

*a driving device operatively coupled to said paper feed roller and selectively rotating said paper feed roller;*

*a presser abutting said paper feed roller at a contact position, the contact position being located on said paper feeding path, so that when said paper feed roller is rotated by said driving device the sheet of printing paper is moved toward said paper exhaust; and*

*a flat paper guide surface disposed in said paper feeding path downstream of the contact position, the flat paper guide surface having a flat portion extending in a widthwise direction in opposition to substantially all of the width of the presser, the flat paper guide surface having a plurality of projections between the contact position and the paper exhaust beneath said paper feeding path for supporting the sheet of paper moving along said paper feeding path, the projections on the flat paper guide surface being located at intervals corresponding to substantially the entire width of the presser,*

*wherein said paper feeding path extending at least from the contact position of the presser to the printing area is substantially flat.*

*34. An ink jet printer according to claim 33, wherein the presser comprises a pinch roller.*

*35. An ink jet printer according to claim 33, further comprising a deflector located downstream of and apart from the contact position and which deflects the sheet of paper toward the projections.*

*36. An ink jet printer according to claim 35, wherein at least one of the presser, the deflector and the plurality of projections extends across a full width of the sheet of paper.*

*37. An ink jet printer for use with an ink jet head having a nose portion through which ink is ejected, comprising:*

*a paper feeding path which guides a sheet of printing paper in a direction from a paper feeding side to a paper discharging side;*

*a paper feed roller having a peripheral surface coincident with a portion of said paper feeding path;*

*a driving device operatively coupled to said paper feed roller and selectively rotating said paper feed roller;*

*a presser abutting said paper feed roller at a contact position, the contact position being located on said paper feeding path, so that when said paper feed roller is rotated by said driving device the sheet of printing paper is moved along said paper feeding path;*

*a flat paper guide surface disposed in said paper feeding path downstream of the contact position, the flat paper guide surface having a flat portion extending in a widthwise direction in opposition to substantially all of the width of the presser;*

*a printing area located between the flat paper guide surface and the ink jet head and corresponding to a region over which ink can be applied by ejection by the ink jet head; and*

*a plurality of projections disposed on said paper guide surface, at least one of which said projections is at least in part disposed within the printing area, at least some of the projections being arranged at intervals in a direction approximately transverse to said printing paper and beneath the sheet of paper moving along said paper feeding path, the projections on the flat paper guide surface being located at intervals corresponding to substantially the entire width of the presser,*

*wherein said paper feeding path extending at least from the contact position of the presser to the printing area is substantially flat.*

*38. An ink jet printer for use with an ink jet head having a nose portion through which ink is ejected, comprising:*

*a paper feeding path which guides a sheet of printing paper in a direction from a paper feeding side to a paper discharging side;*

*a paper feed roller having a peripheral surface coincident with a portion of said paper feeding path;*

*a driving device operatively coupled to said paper feed roller and selectively rotating said paper feed roller;*

*a presser abutting said paper feed roller at a contact position, the contact position being located on said paper feeding path, so that when said paper feed roller is rotated by said driving device the sheet of printing paper is moved along said paper feeding path;*

*a flat paper guide surface disposed in said paper feeding path downstream of the contact position, the flat paper guide surface having a flat portion extending in a widthwise direction in opposition to substantially all of the width of the presser; and*

*a plurality of projections disposed on said paper guide surface, wherein at least a part of at least one of said projection is disposed outside of a region which is defined by the contact position where said presser abuts said feed roller and a point where the nose portion of the ink jet head opposes said paper guide surface when the ink jet head ejects ink, at least some of the projections being arranged at intervals in a direction approximately transverse to said printing paper and beneath the sheet of paper moving along said paper feeding path, the projections on the flat paper guide surface being located at intervals corresponding to substantially the entire width of the presser,*

*wherein said paper feeding path extending at least from the contact position of the presser to the printing area is substantially flat.*

*39. An ink jet printer for use with an ink jet head having a nose portion through which ink is ejected, comprising:*

*a paper feeding path which guides a sheet of printing paper in a direction from a paper source to a paper exhaust;*

*a paper feed roller having a peripheral surface coincident with a portion of said paper feeding path;*

*a driving device operatively coupled to said paper feed roller and selectively rotating said paper feed roller;*

*a presser abutting said paper feed roller at a contact position, the contact position being located on said paper feeding path, so that when said paper feed roller is rotated by said driving device the sheet of printing paper is moved toward said paper exhaust; and*

*a flat paper guide surface disposed in said paper feeding path downstream of the contact position, the flat paper guide surface having a flat portion extending in a widthwise direction in opposition to substantially all of the width of the presser, the flat paper guide surface having a plurality of projections at least some of which are disposed at least in part between the contact position and the paper exhaust and beneath the sheet of paper moving along said paper feeding path, the projections on the flat paper guide surface being located at intervals corresponding to substantially the entire width of the presser,*

*wherein said paper feeding path extending at least from the contact position of the presser to the printing area is substantially flat.*

* * * * *